United States Patent
Sakai

(10) Patent No.: US 10,198,099 B2
(45) Date of Patent: Feb. 5, 2019

(54) INFORMATION PROCESSING APPARATUS, INFORMATION PROCESSING METHOD, AND COMPUTER PROGRAM

(71) Applicant: Saturn Licensing LLC, New York, NY (US)

(72) Inventor: Yusuke Sakai, Kanagawa (JP)

(73) Assignee: Saturn Licensing LLC, New York, NY (US)

(*) Notice: Subject to any disclaimer, the term of this patent is extended or adjusted under 35 U.S.C. 154(b) by 0 days.

(21) Appl. No.: 14/369,856

(22) PCT Filed: Jan. 9, 2013

(86) PCT No.: PCT/JP2013/000033
§ 371 (c)(1),
(2) Date: Jun. 30, 2014

(87) PCT Pub. No.: WO2013/105492
PCT Pub. Date: Jul. 18, 2013

(65) Prior Publication Data
US 2014/0368456 A1 Dec. 18, 2014

(30) Foreign Application Priority Data
Jan. 13, 2012 (JP) .................. 2012-005258

(51) Int. Cl.
*G06F 3/041* (2006.01)
*G06F 3/0488* (2013.01)
*G06F 3/0481* (2013.01)

(52) U.S. Cl.
CPC ............ *G06F 3/041* (2013.01); *G06F 3/0481* (2013.01); *G06F 3/0488* (2013.01)

(58) Field of Classification Search
CPC ....... G06F 3/041; G06F 3/0481; G06F 3/0488
See application file for complete search history.

(56) References Cited

U.S. PATENT DOCUMENTS

2005/0140696 A1* 6/2005 Buxton ............... G06F 3/04845
345/660
2005/0285845 A1* 12/2005 Dehlin .................. G06F 3/0481
345/173

(Continued)

FOREIGN PATENT DOCUMENTS

| JP | 2000047788 A | 2/2000 |
| JP | 2000222133 A | 8/2000 |

(Continued)

OTHER PUBLICATIONS

Walther-Franks et al., User Detection for a Multi-touch Table via Proximity Sensors, Jan. 2008, Conference Paper, Digital Media Group, TZI, University of Bremen, pp. 2-3, sections 3-5.*

(Continued)

*Primary Examiner* — Kent W Chang
*Assistant Examiner* — Nathaniel P Brittingham
(74) *Attorney, Agent, or Firm* — Lerner, David, Littenberg, Krumholz & Mentlik, LLP

(57) ABSTRACT

An information processing apparatus may include a control unit to control processing on an operation object, where an operation right of the operation object is given to a user, displayed on a display unit based on detection of a user from at least one information signal input to the apparatus from outside of the apparatus.

28 Claims, 55 Drawing Sheets

(56) References Cited

U.S. PATENT DOCUMENTS

| | | | |
|---|---|---|---|
| 2006/0146765 A1 | 7/2006 | Van De Sluis et al. | |
| 2006/0274046 A1* | 12/2006 | Hillis | G06F 3/04883 345/173 |
| 2007/0064004 A1* | 3/2007 | Bonner | G06F 3/04883 345/442 |
| 2007/0220444 A1* | 9/2007 | Sunday | G06F 3/0488 715/788 |
| 2007/0266185 A1 | 11/2007 | Goddi et al. | |
| 2009/0085881 A1* | 4/2009 | Keam | G06F 3/0416 345/173 |
| 2009/0106667 A1* | 4/2009 | Lyle | G06F 3/0488 715/750 |
| 2009/0109180 A1* | 4/2009 | Do | G06F 3/0416 345/173 |
| 2009/0181719 A1* | 7/2009 | Cho | H04M 1/72522 455/556.1 |
| 2010/0066667 A1 | 3/2010 | MacDougall et al. | |
| 2010/0123928 A1* | 5/2010 | Morimoto | G06K 9/3208 358/1.15 |
| 2010/0257472 A1* | 10/2010 | Zhang | G06F 3/0486 715/769 |
| 2011/0074794 A1* | 3/2011 | Felt | H04N 21/4122 345/520 |
| 2011/0105192 A1* | 5/2011 | Jung | G06F 3/04845 455/566 |
| 2011/0187664 A1* | 8/2011 | Rinehart | G06F 3/041 345/173 |
| 2011/0231795 A1* | 9/2011 | Cheon | G06F 1/3231 715/810 |
| 2011/0242277 A1* | 10/2011 | Do | H04N 5/272 348/43 |
| 2011/0298722 A1* | 12/2011 | Tse | G06F 3/041 345/173 |
| 2012/0162351 A1* | 6/2012 | Feldman | G09G 5/006 348/14.03 |
| 2012/0249463 A1* | 10/2012 | Leung | G06F 3/017 345/173 |
| 2013/0083074 A1* | 4/2013 | Nurmi | G06F 3/0488 345/650 |
| 2013/0155009 A1* | 6/2013 | Sevigny | G06F 3/044 345/174 |

FOREIGN PATENT DOCUMENTS

| | | |
|---|---|---|
| JP | 2005227487 A | 8/2005 |
| JP | 2005346353 A | 12/2005 |
| JP | 2005346354 A | 12/2005 |
| JP | 2005352579 A | 12/2005 |
| JP | 2006048139 A | 2/2006 |
| JP | 2006-518507 A | 8/2006 |
| JP | 2008269044 A | 11/2008 |
| JP | 2008293419 A | 12/2008 |
| JP | 2010-170573 A | 8/2010 |
| JP | 2011054069 A | 3/2011 |
| JP | 2012529099 A | 11/2012 |
| JP | 05100809 B2 | 12/2012 |
| WO | 2010140849 A2 | 12/2010 |

OTHER PUBLICATIONS

Annett et al., Medusa: A Proximity-Aware Multi-touch Tabletop, Oct. 19, 2011, UIST'11, User Interface Group, University of Alberta, University of Toronto, p. 341, section titled, "Different Sides/Different Functions.".*

International Search Report from International Publication PCT/JP2013/000033 dated Mar. 21, 2013.

http://www.autodeskresearch.com/publications/medusa (as of Dec. 15, 2011).

Japanese Office Action for JP Application No. 2013213850, dated Oct. 20, 2015.

Japanese Office Action for JP Application No. 2013213850, dated Feb. 23, 2016.

Japanese Office Action for JP Application No. 2012005258, dated Feb. 2, 2016.

Japanese Office Action for Application No. 2012-005258 dated Jun. 28, 2016.

Japanese Office Action for Application No. 2013-213850 dated Jun. 28, 2016.

European Examination Report for Application No. 13701299.3 dated Jul. 20, 2016.

Japanese Office Action for Application No. 20125258 dated Feb. 7, 2017.

Ayatsuka, Yuji, et al. HyperPalette: Multi-computer environment using PDA, Lecture note/software studies 23 Interactive system and software VII, modern science corporation, published on Dec. 20, 1999, pp. 109-118.

Japanese Office Action (English translation) for Application No. 2012-5258 dated Feb. 7, 2017.

Japanese Office Action (English translation) for Application No. 2013-213850 dated Feb. 7, 2017.

Japanese Office Action for Application No. 2012005258 dated Oct. 18, 2016.

European Summons to attend oral proceedings pursuant to Rule 115(1) ERC for Application No. 13701299.3, dated Jul. 11, 2017.

* cited by examiner

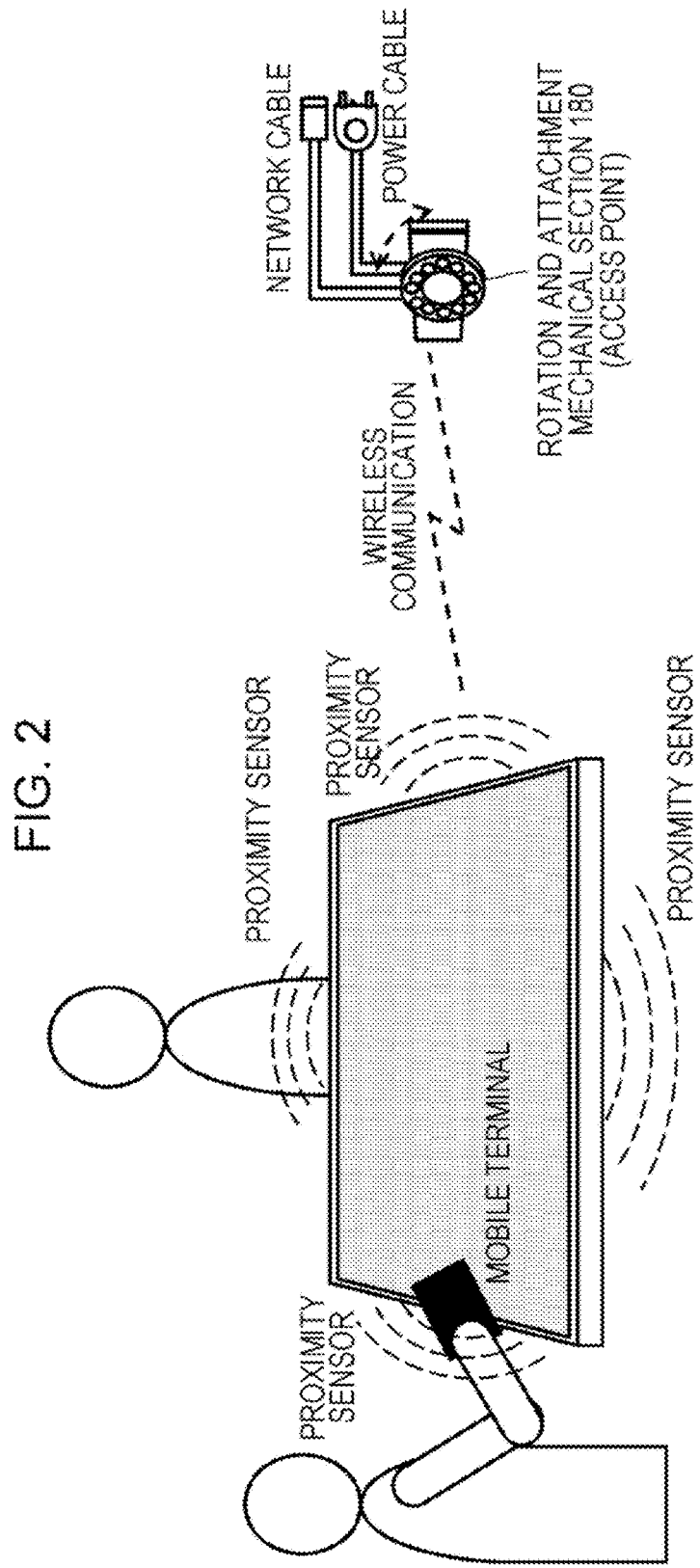

INFORMATION PROCESSING APPARATUS 100
(DISPLAY SCREEN/TOUCH PANEL)

INFORMATION PROCESSING APPARATUS 100
(DISPLAY SCREEN/TOUCH PANEL)

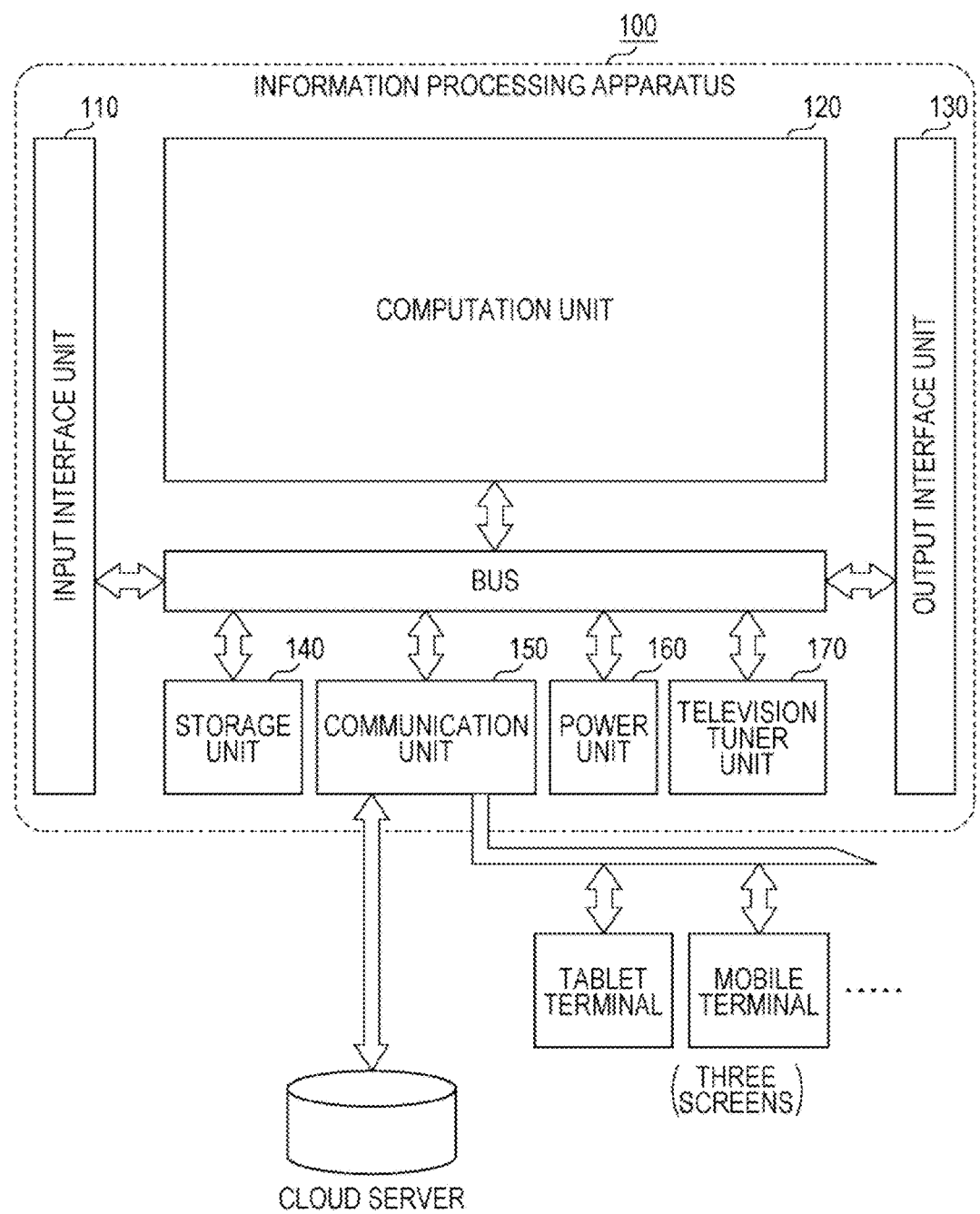

FIG. 9A
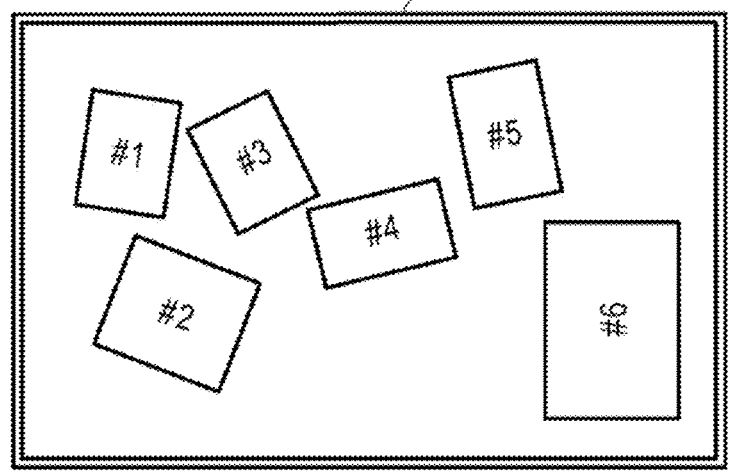
FIG. 9B
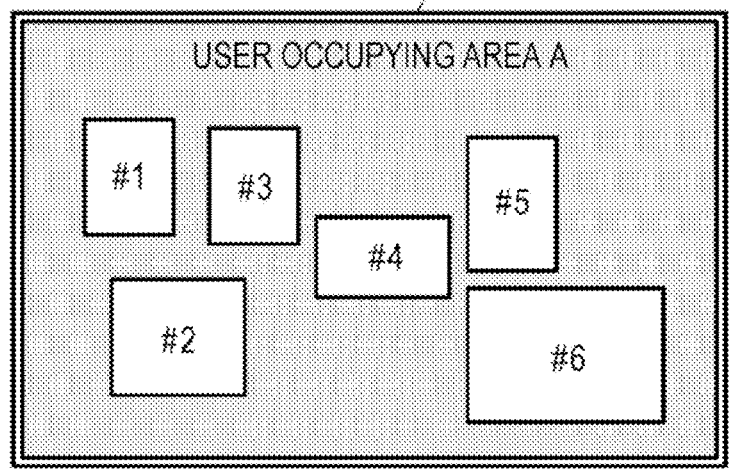

FIG. 24A

| USER STATE | USER POSITION | 0 cm | 50 cm | 1 m | 3 m | 5 m | 10 m |
|---|---|---|---|---|---|---|---|
| NOT PRESENT | | STANDBY (STOP SCREEN DISPLAY) | | | | | |
| PRESENT | NOT VIEWING | | | | | | |
| | VIEWING / NO OPERATION | AUTOMATIC ZAPPING OPTIMIZATION BASED ON (PERSONAL AUTHENTICATION) | | | AUTOMATIC ZAPPING (WITH NO OPTIMIZATION) | | |
| | VIEWING / OPERATING | COLUMN FORMAT AUTOMATIC ZAPPING OPTIMIZATION BASED ON (PERSONAL AUTHENTICATION) | | | COLUMN FORMAT AUTOMATIC ZAPPING (WITH NO OPTIMIZATION) | | |
| | | COLUMN FORMAT DISPLAY OF OPERATION TARGET OBJECT (SCROLL AND SELECT OF OBJECT IN ACCORDANCE WITH USER OPERATION) | | | | | |

FIG. 24B
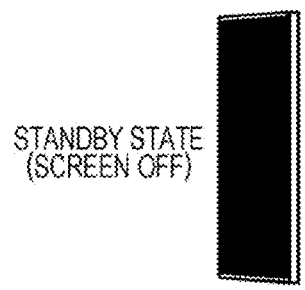
STANDBY STATE
(SCREEN OFF)
FIG. 24C
APPEARANCE OF USER
(NOT VIEWING)
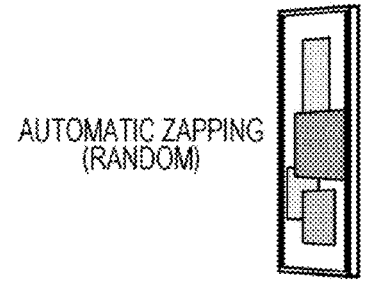
AUTOMATIC ZAPPING
(RANDOM)
FIG. 24D
BEING VIEWED BY USER
(WITH NO OPERATION)
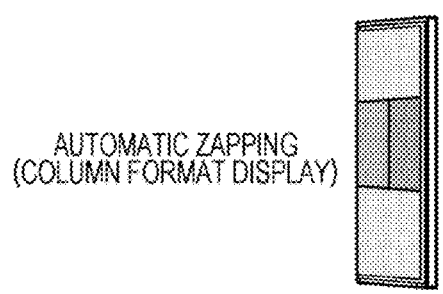
AUTOMATIC ZAPPING
(COLUMN FORMAT DISPLAY)
FIG. 24E
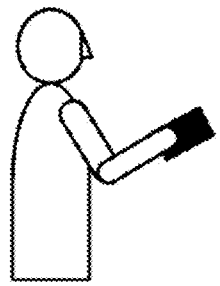
BEING VIEWED BY USER
(OPERATED WITH REMOTE CONTROLLER)
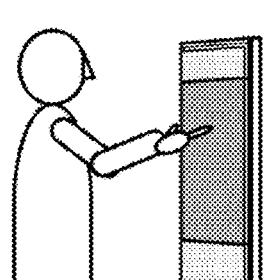
BEING VIEWED BY USER
(TOUCH OPERATION)

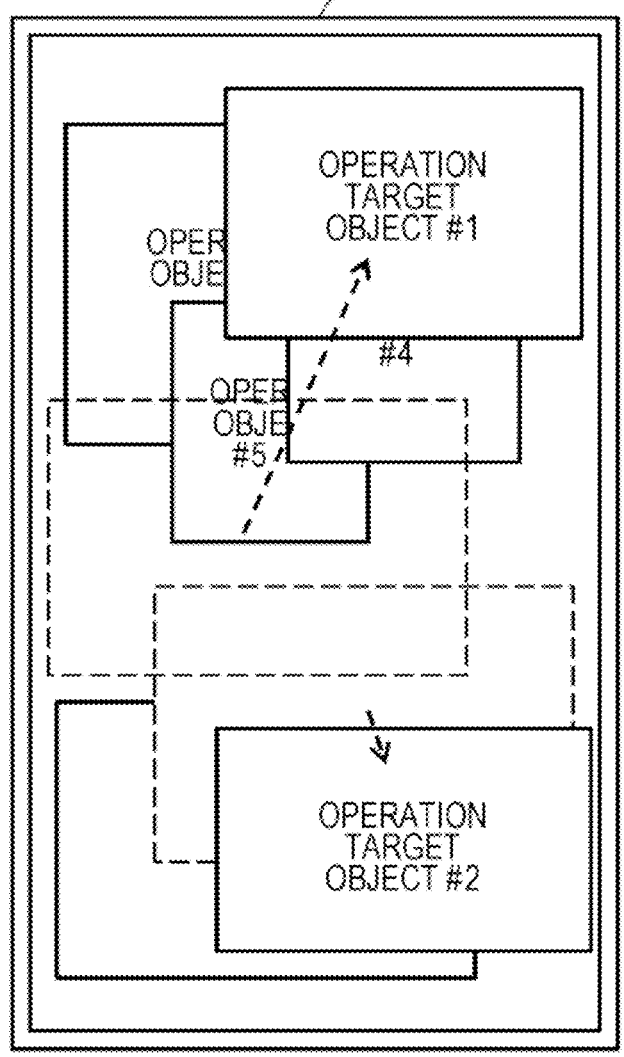

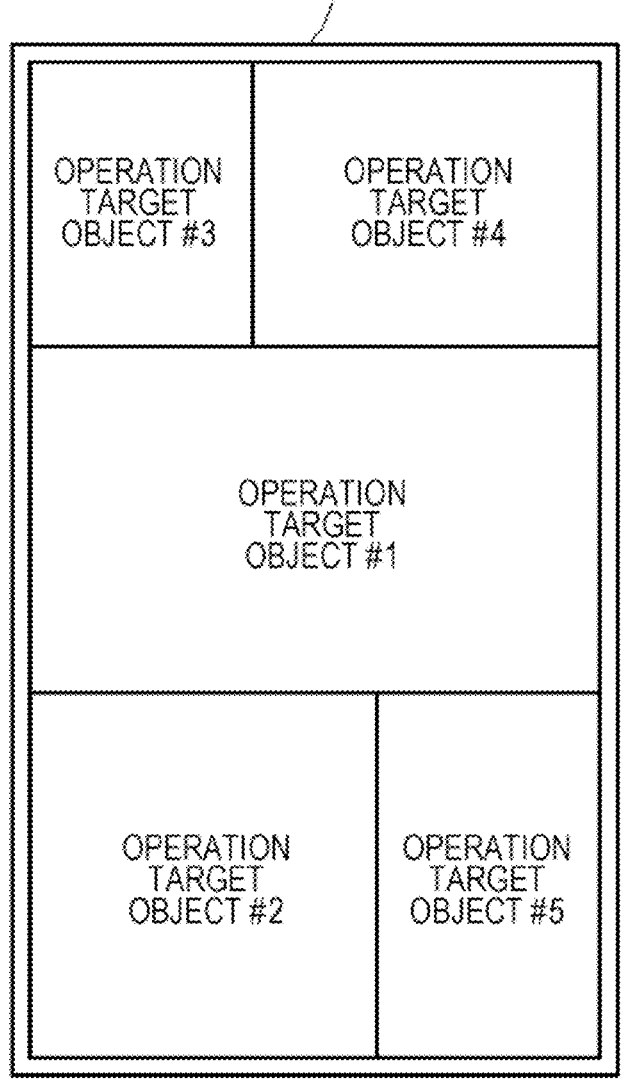

FIG. 29

| USER POSITION<br>DETECTION METHOD | 0 cm | 50 cm | 1 m | 3 m | 5 m | 10 m |
|---|---|---|---|---|---|---|
| DISTANCE SENSOR<br>(SIMPLE OPTICAL ELEMENT) | USER IS PRESENT | | | | | NOT<br>PRESENT |
| MONOCULAR CAMERA<br>RECOGNITION | | | | | | |
| CAMERA RECOGNITION<br>(TWIN-LENS SCHEME,<br>ACTIVE TYPE) | | | | | | |
| PROXIMITY SENSOR | | | | | | |
| TOUCH PANEL | | | | | | |

FIG. 31
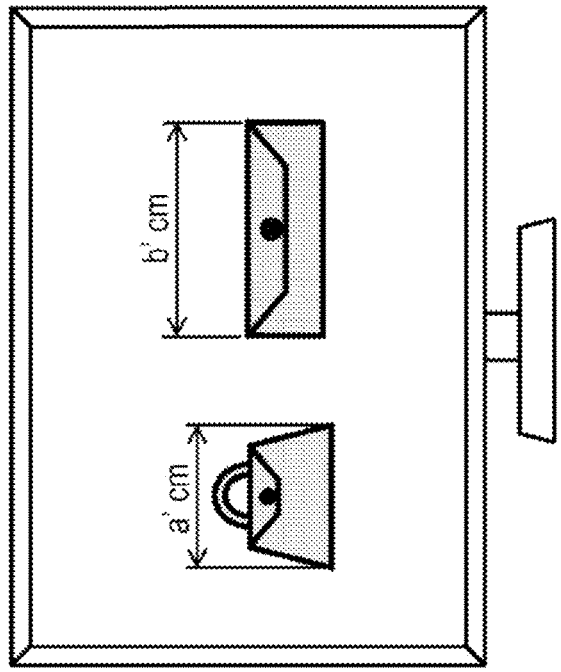
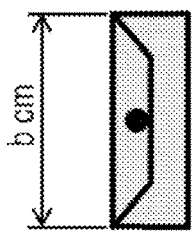
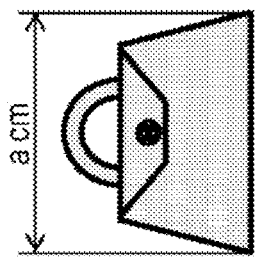

FIG. 34
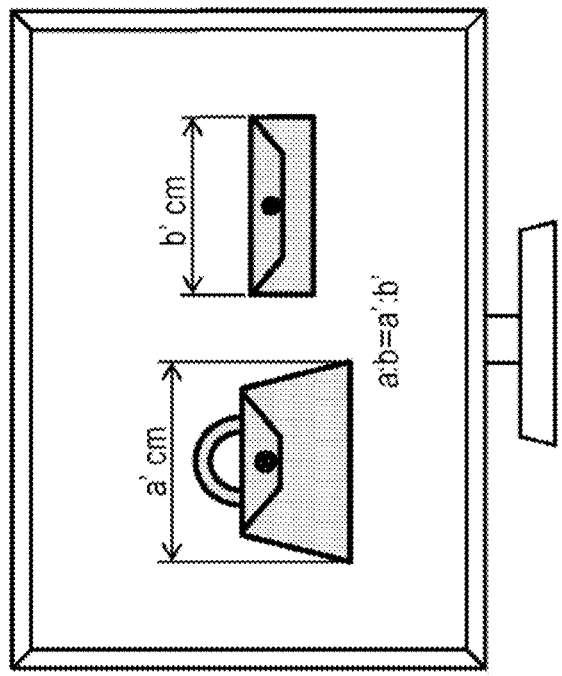
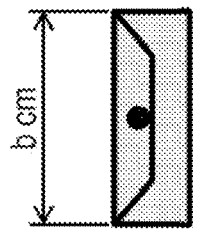
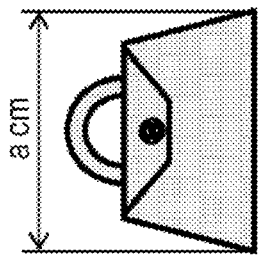

FIG. 35
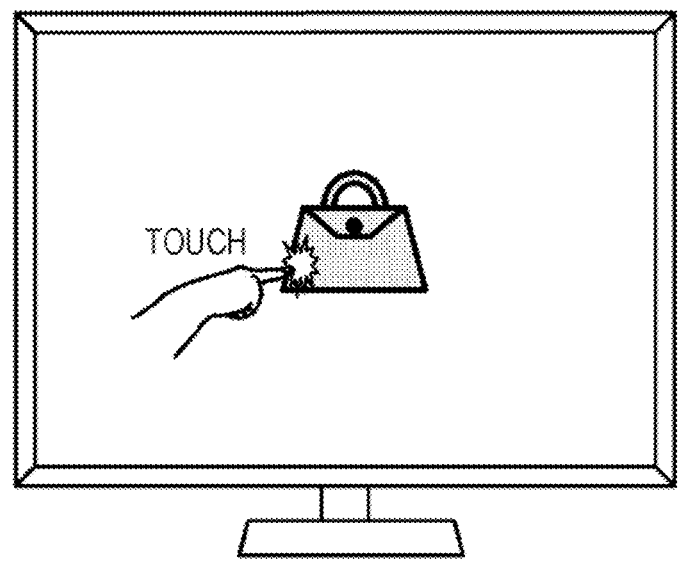
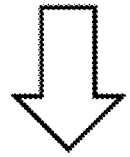
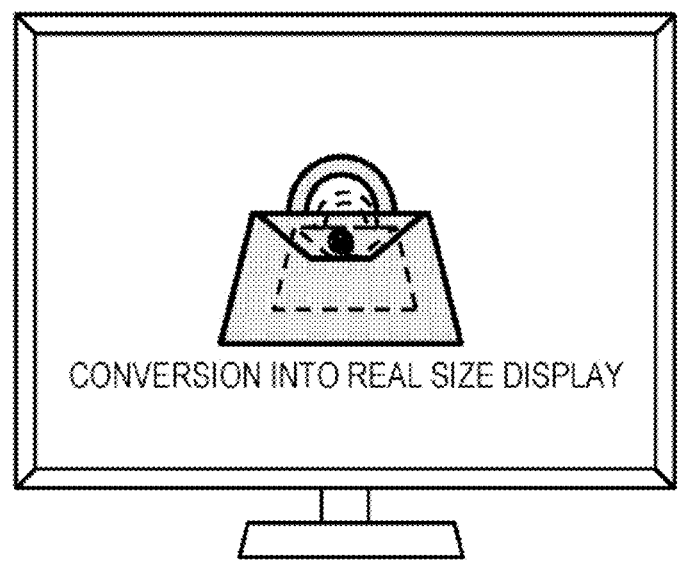

FIG. 36
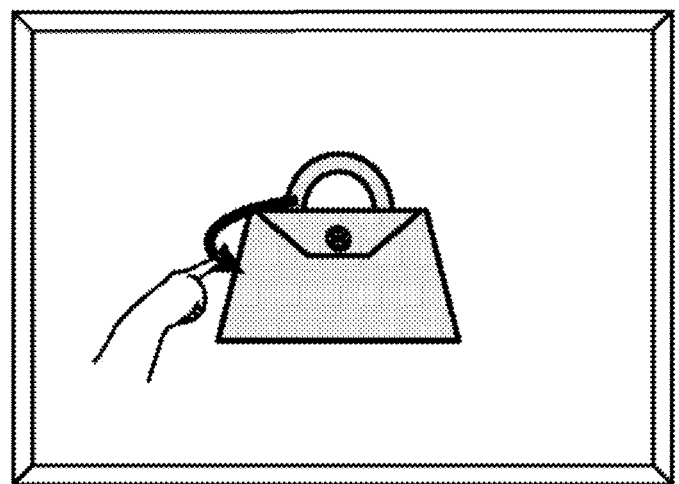
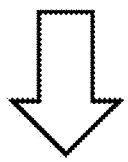
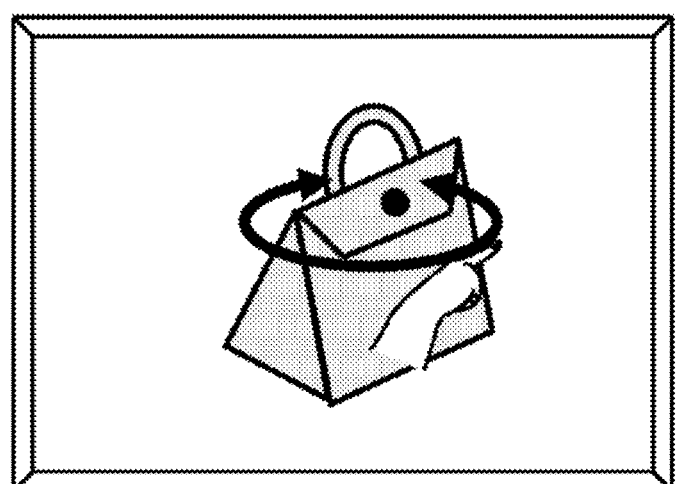

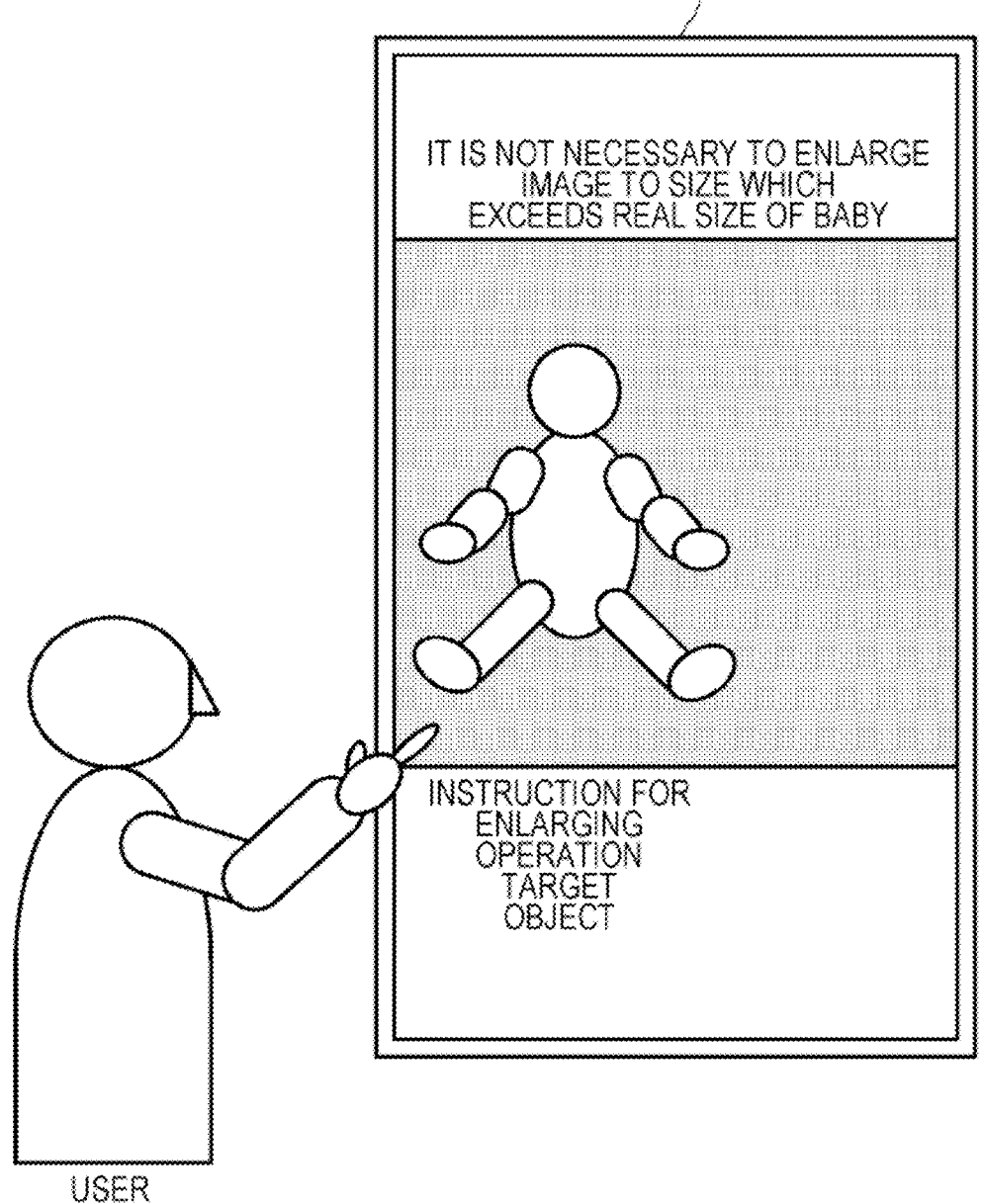

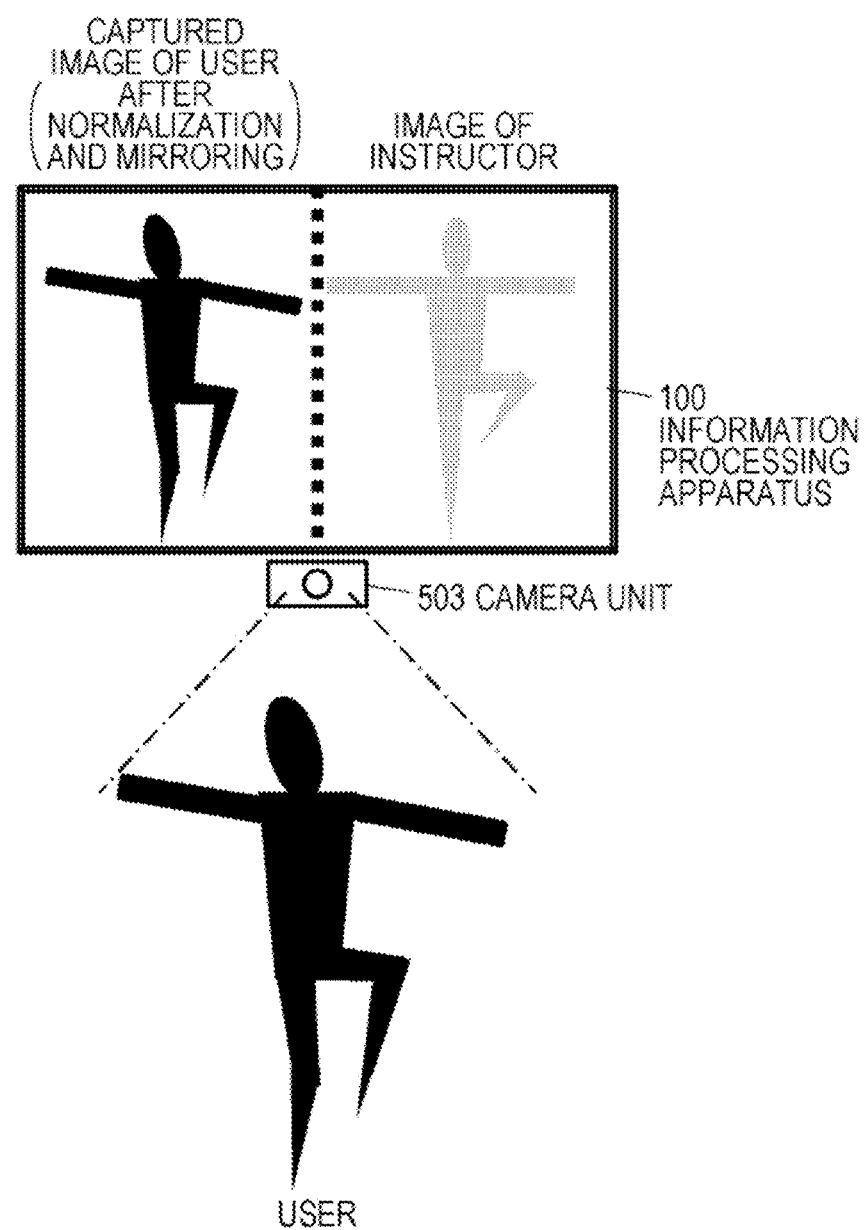

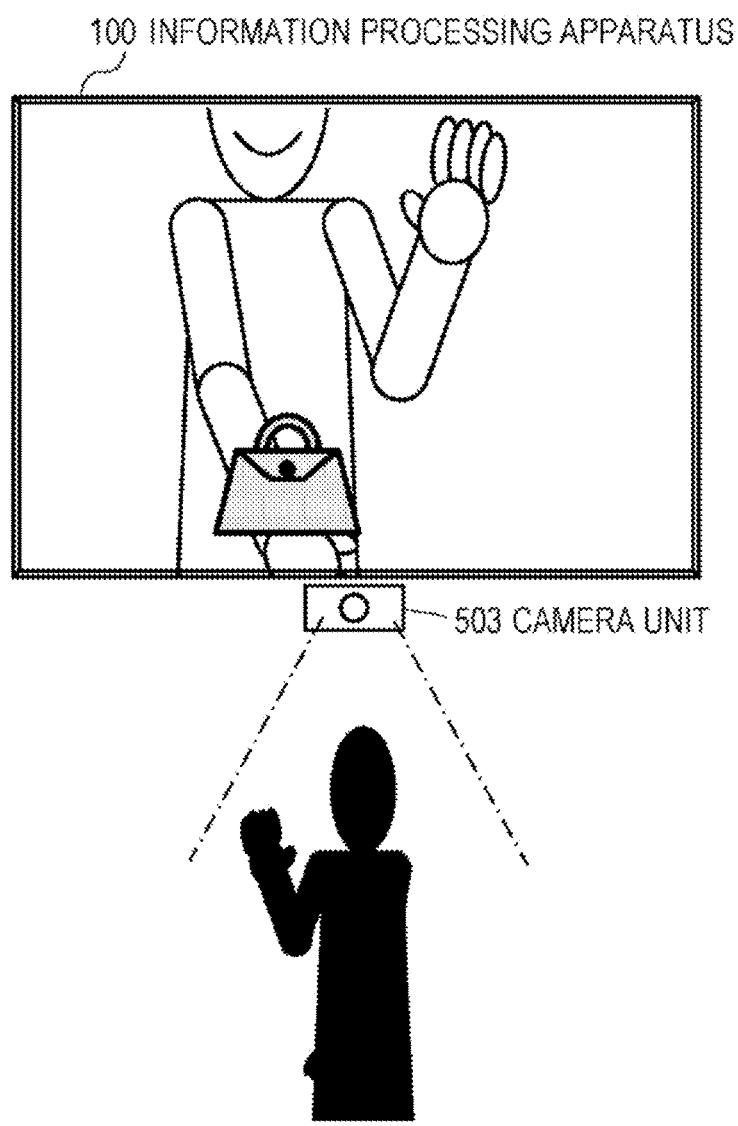

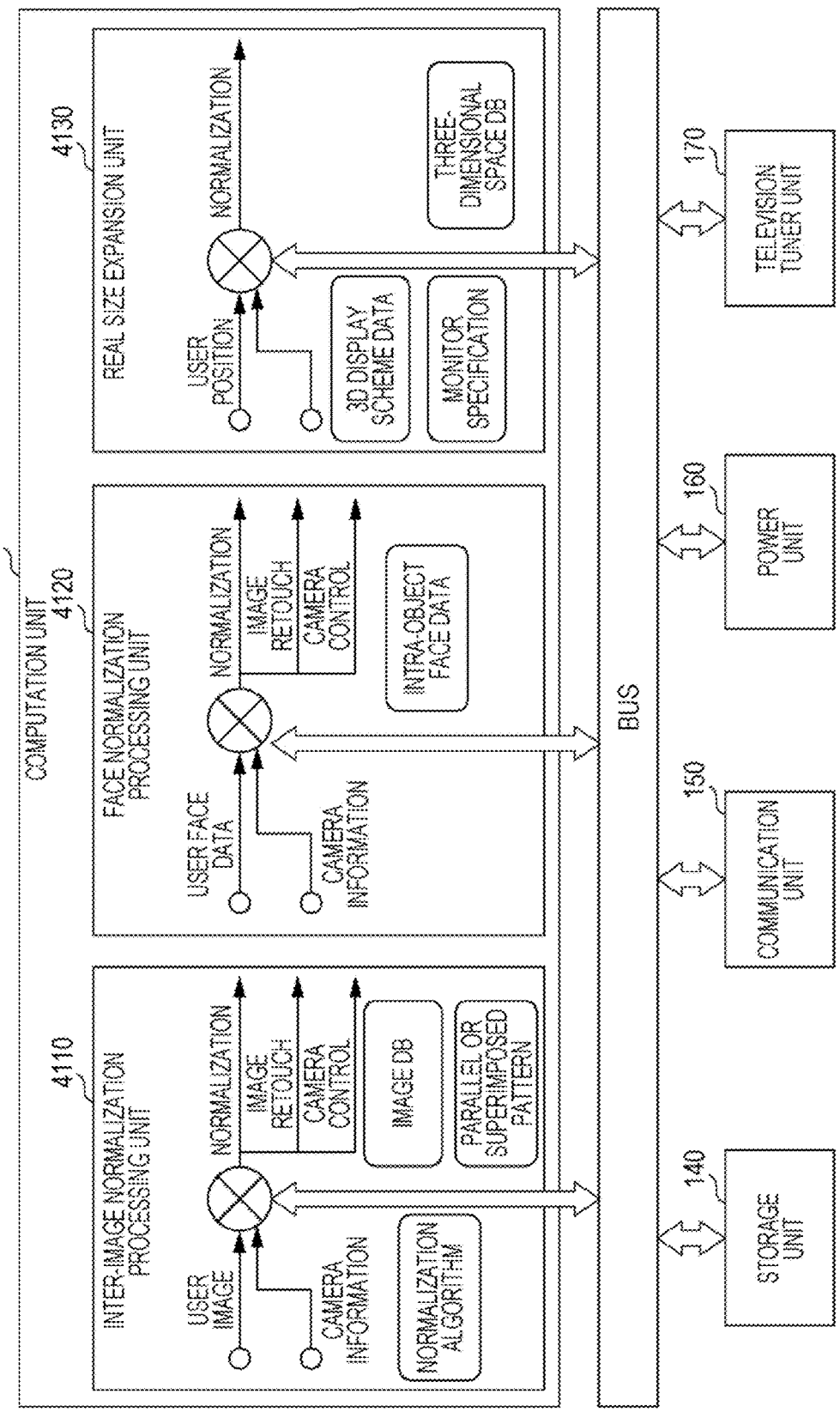

INFORMATION PROCESSING APPARATUS, INFORMATION PROCESSING METHOD, AND COMPUTER PROGRAM

CROSS-REFERENCE TO RELATED APPLICATIONS

The present application claims priority from Japanese Patent Application JP 2012-005258 filed in the Japan Patent Office on Jan. 13, 2012, the entire contents of which is hereby incorporated by reference.

TECHNICAL FIELD

The technique disclosed in this specification relates to an information processing apparatus provided with a display screen which is also used as an input unit based on a touch panel scheme or the like, an information processing method, and a computer program, and particularly to an information processing apparatus, which includes a large screen and is commonly used by a plurality of users, on which the users perform cooperative work through operations on the touch panel, an information processing method, and a computer program.

BACKGROUND ART

Recently, a tablet terminal provided with a display screen which is also used as an input unit based on a touch panel scheme or the like has been rapidly distributed. Since the tablet terminal has a widget or a desktop as an interface, and it is easy to visually understand an operation method, users can readily use the tablet terminal as compared with a personal computer on which an input operation is performed via a keyboard or a mouse.

For example, a touch sensitive device which reads data belonging to a touch input relating to a multi-point sensing device from the multi-point sensing device such as a multi-point touch screen and identifies a multi-point gesture based on the data from the multi-point sensing device has been proposed (see Patent Literature 1, for example).

Generally, multiple operation target objects to be operated by a user are arranged in various orientations on a screen of the tablet terminal. The individual operation target objects are reproduced content such as a video image and a stationary image, e-mails and messages received from other users, and the like. It is necessary for the user to individually perform a rotation operation on a tablet terminal main body in order to display a desired operation target object so as to face the user. In the case of a tablet terminal with an A4 or A5 size, it is easy to perform the rotation operation. In the case of a large screen of about several tens of inches, however, performing the rotation operation on the tablet terminal every time a single user operates the operation target object is a nuisance for the user.

In addition, a use state in which a plurality of users individually perform operations on operation target objects in a tablet terminal with a large screen at the same time can be also considered.

For example, a tablet terminal which identifies an area between a right arm and a left arm when a proximity sensor detects a position, at which a user is present, at a side edge of the terminal and performs mapping in a touch point area of the user has been proposed (see Non Patent Literature 1, for example). The tablet terminal can be designed such that another user cannot perform certain operations such as an operation for rotating an operation target object, which is being operated by a certain user, in a direction in which the operation target object faces the user themselves by setting an operation right of each user for each operation target object or inhibiting additional user participation in advance when the tablet terminal detects a plurality of users.

As the use state in which a plurality of users commonly use the tablet terminal with the large screen, however, there may also be a case in which the users exchange operation target objects to perform cooperative work as well as the aforementioned case in which the users individually perform operations on the operation target objects. It is difficult to realize cooperative work if a touch point area occupied by each user is set and each user performs operations on the operation target objects, operation rights for which have been provided, in the individual area.

In addition, if a GUI displayed on the screen of the terminal is constant regardless of a distance from a user to the screen or a user state, there is a problem in that the size of information shown on the screen is excessively small and cannot be well understood by a user who is located at a distant position, or a problem in that an amount of information shown on the screen is small even though the user is positioned at a nearby position. Similarly, if input means for allowing the user to operate the terminal is constant regardless of the distance from the user to the screen or the user state, the user cannot perform any operations since there is no remote controller even though the user is positioned at a nearby position to the terminal, or the user is required to approach the terminal in order to operate the touch panel, which is inconvenient.

In addition, according to a conventional subject display system, an image of an actual object is displayed on the screen without consideration of real size information thereof. For this reason, there is a problem in that the size of the object displayed varies in accordance with a size or resolution (dpi) of the screen.

In addition, when movie content of a plurality of sources is simultaneously displayed on the screen in a display system in a parallel manner or in a superimposed manner, a magnitude relationship between the simultaneously displayed images is not correctly displayed, sizes and positions of corresponding areas for the images are not adjusted, and therefore, an image which cannot be easily viewed by the user is obtained.

In addition, since the user cannot easily view the screen if a direction of the screen of the terminal or the like which is provided with a rotation mechanism is changed, it is necessary to rotate the display screen.

CITATION LIST

Patent Literature

PTL 1: Japanese Unexamined Patent Application Publication No. 2010-170573

Non Patent Literature

NPL 1: http://www.autodeskresearch.com/publications/medusa (as of Dec. 15, 2011)

SUMMARY OF INVENTION

Technical Problem

An object of the technique disclosed in this specification is to provide an excellent information processing apparatus which includes a large screen and is commonly used by a plurality of users, on which the users can preferably perform cooperative work through operations on the touch panel, an information processing method, and a computer program.

In addition, an object of the technique disclosed in this specification is to provide an excellent information processing apparatus which is constantly and conveniently operated by a user regardless of a user position or a user state; an information processing method, and a computer program.

In addition, an object of the technique disclosed in this specification is to provide an excellent information processing apparatus which can constantly display an image of an object in an appropriate size on the screen regardless of a size of an actual object and or a size or resolution of the screen, an information processing method, and a computer program.

In addition, an object of the technique disclosed in this specification is to provide an excellent information processing apparatus which can preferably display movie content of a plurality of sources at the same time on the screen in a parallel manner or in a superimposed manner, an information processing method, and a computer program.

In addition, an object of the technique disclosed in this specification is to provide an excellent information processing apparatus which can optimally adjust a display mode of movie content at an arbitrary rotation angle in a shifting process thereof when a main body is rotated, an information processing method, and a computer program.

Solution to Problem

The present application was made in consideration of the above problems.

According to an embodiment of the present disclosure, there is provided an information processing apparatus that may include a control unit to control processing on an operation object, where an operation right of the operation object is given to a user, displayed on a display unit based on detection of a user from at least one information signal input to the apparatus from outside of the apparatus.

According to an embodiment of the present disclosure, there is provided an information processing method that may include controlling, by a processor, of processing on an operation object, where an operation right of the operation object is given to a user, displayed on a display unit based on detection of a user from at least one information signal input to an information processing apparatus from outside of the apparatus.

According to an embodiment of the present disclosure, there is provided a non-transitory recording medium recorded with a program executable by a computer, where the program may include controlling processing on an operation object, where an operation right of the operation object is given to a user, displayed on a display unit based on detection of a user from at least one information signal input to an information processing apparatus from outside of the apparatus.

Advantageous Effects of Invention

According to the technique disclosed in this specification, it is possible to provide an excellent information processing apparatus which includes a large screen and is commonly used by a plurality of users, on which the users can preferably perform cooperative work through operations on the touch panel, an information processing method, and a computer program.

In addition, according to the technique disclosed in this specification, it is possible to provide an excellent information processing apparatus which is conveniently used by a user by optimizing the display GUI or the input means in accordance with a user position or a user state, an information processing method, and a computer program.

In addition, according to the technique disclosed in this specification, it is possible to provide an excellent information processing apparatus which can constantly display an image of an object at the appropriate size on the screen regardless of a size of an actual object and or a size or resolution of the screen, an information processing method, and a computer program.

In addition, according to the technique disclosed in this specification, it is possible to provide an excellent information processing apparatus which can show the user an easily viewable screen with adjusted sizes and positions of corresponding areas for the images by performing normalization processing on the images when movie content of a plurality of sources is simultaneously displayed on the screen in the parallel manner or in the superimposed manner, an information processing method, and a computer program.

In addition, according to the technique disclosed in this specification, it is possible to provide an excellent information processing apparatus which can optimally adjust a display mode of movie content at an arbitrary rotation angle in a shifting process thereof when a main body is rotated, an information processing method, and a computer program.

Other purposes, features, and advantages of the technique disclosed in this specification will become apparent by detailed description based on embodiments and accompanying drawing which will be described later.

BRIEF DESCRIPTION OF DRAWINGS

FIG. 2 is a diagram showing another example (Tabletop) of a use state of the information processing apparatus 100 provided with the large screen.

FIG. 4 is a diagram schematically showing a functional configuration of the information processing apparatus 100.

FIG. 9A is a diagram showing a state in which operation target objects #1 to #6 are randomly oriented before a user occupying area A is set.

FIG. 9B is a diagram showing a state in which directions of the operation target objects #1 to #6 are shifted to a direction in which the operation target objects #1 to #6 face a user A by setting the user occupying area A for the user A.

FIG. 24A is a diagram showing, in a table, GUI display optimization processing by a display GUI optimization unit 2310 in accordance with a user position and a user state.

FIG. 24B is a diagram showing screen shift of the information processing apparatus 100 in accordance with a user position and a user state.

FIG. 24C is a diagram showing screen shift of the information processing apparatus 100 in accordance with a user position and a user state.

FIG. 24D is a diagram showing screen shift of the information processing apparatus 100 in accordance with a user position and a user state.

FIG. 24E is a diagram showing screen shift of the information processing apparatus 100 in accordance with a user position and a user state.

FIG. 25B is a diagram showing a display example of a screen in which display positions and sizes of a plurality of operation target objects to be automatically zapped are momentarily changed.

FIG. 26 is a diagram showing a screen display example in a state in which a user does not perform any operations while watching a television.

FIG. 29 is a diagram showing, in a table, distance detection scheme shifting processing by a distance detecting scheme shifting unit 2330 in accordance with a user position.

FIG. 31 is a diagram illustrating a problem in a conventional subject display system.

FIG. 34 is a diagram showing an example in which images of two objects with different real sizes are displayed on a same screen while a mutual magnitude relationship is correctly maintained.

FIG. 35 is a diagram showing an example in which an image of an object is displayed at real size.

FIG. 36 is a diagram showing an example in which an image of an object displayed at real size is rotated or a posture thereof is converted.

FIG. 37B is a diagram showing a state in which real size display processing for an operation target object is performed based on the estimated target real size information.

FIG. 39B is a diagram showing a state in which the sizes and the positions of the figures of the user and the instructor which are displayed on the screen in the parallel manner are adjusted by normalization processing among the plurality of images.

FIG. 40A is a diagram showing a state in which a product sample image is not superimposed at an appropriate position in a correct magnitude relationship with a movie of a user themselves.

FIG. 41 is a diagram showing an internal configuration for the computation unit 120 performing image normalization processing.

DESCRIPTION OF EMBODIMENTS

Hereinafter, detailed description will be given of embodiments of the technique disclosed in this specification with reference to the drawings.

A. System Configuration

Figure 1:
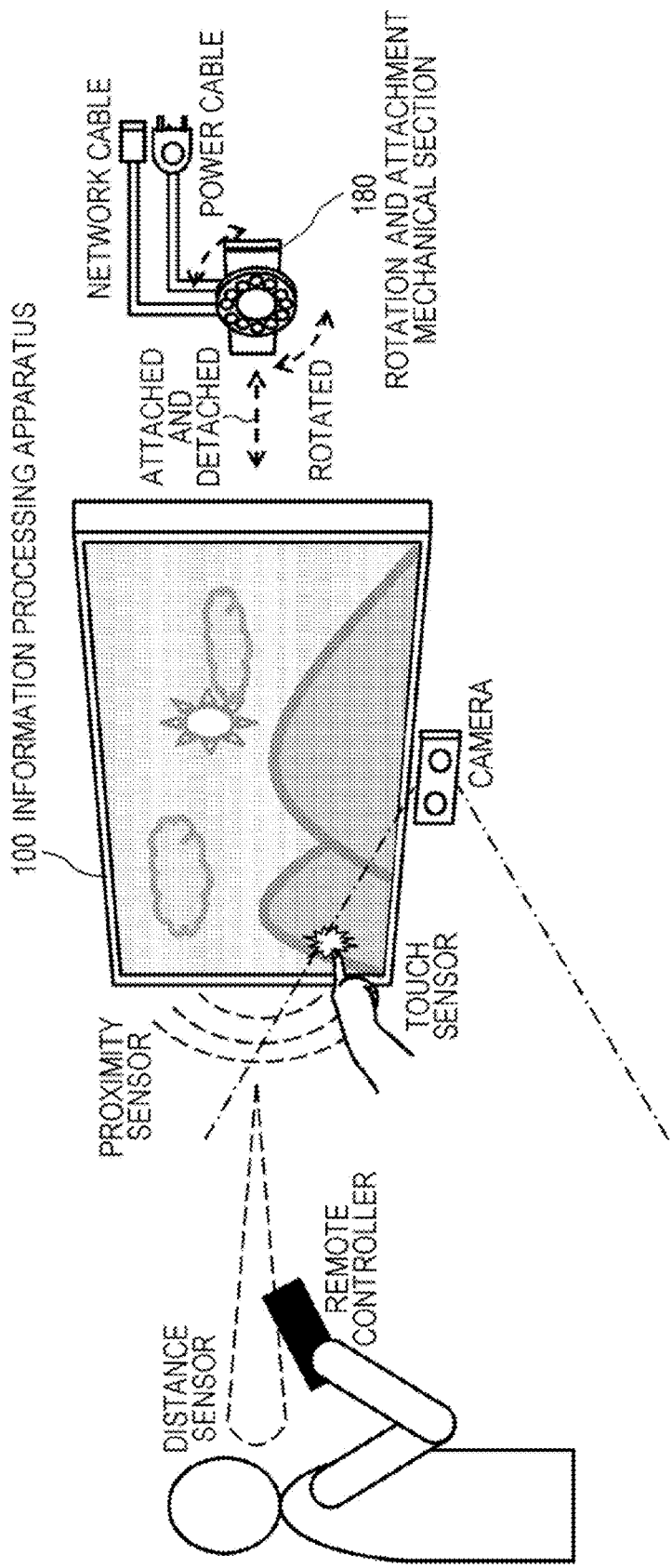
FIG. 1 is a diagram showing an example (Wall) of a use state of an information processing apparatus 100 provided with a large screen.

An information processing apparatus 100 according to the embodiment is provided with a large screen, and as main use states, there may be a "Wall" for hanging the information processing apparatus 100 on the wall as shown in FIG. 1 and a "Tabletop" for installing the information processing apparatus 100 on a table as shown in FIG. 2.

In the "Wall" state shown in FIG. 1, the information processing apparatus 100 is attached in a rotatable and detachable manner on the wall by a rotation and attachment mechanism unit 180, for example. In addition, the rotation and attachment mechanism unit 180 is also used as an electrical contact between the information processing apparatus 100 and the outside, a power cable and a network cable (both of which are not shown in the drawing) are connected to the information processing apparatus 100 through the rotation and attachment mechanism unit 180, and the information processing apparatus 100 can receive drive power from commercial AC power and access various servers on the Internet.

As will be described later, the information processing apparatus 100 is provided with a distance sensor, a proximity sensor, and a touch sensor and can grasp a position (distance, orientation) of a user which faces the screen. When the user has been detected, or in a state in which the user is being detected, it is possible to express a wave-like detection indicator (which will be described later) and perform illumination expression representing a detection state on the screen to give the user visual feedback.

The information processing apparatus 100 is designed to automatically select an optimal interaction in accordance with a user position. For example, the information processing apparatus 100 automatically selects or adjusts a GUI (Graphical User Interface) display of frameworks of operation target objects, information density, and the like in accordance with the user position. In addition, the information processing apparatus 100 can automatically select one of a plurality of input means such as touching the screen, proximity, a gesture using a hand or the like, a remote controller, an indirect operation by a user state, and the like in accordance with a user position or a distance to the user.

In addition, the information processing apparatus 100 is also provided with one or more cameras and can recognize not only the user position but also a person, a subject, or a device from an image captured by the cameras. Moreover, the information processing apparatus 100 is also provided with a very-short-range communication unit and can directly and naturally exchange data with a device owned by a user who approaches a position at a very short range.

Operation target objects as targets to be operated by the user are defined on the large screen in the Wall state. The operation target objects have specific display areas for arbitrary internet sites, applications, functional modules such as widgets as well as video images, stationary images, and text contents. In the operation target objects, content received from television broadcasts, content reproduced from a recording medium, streaming video images obtained by a network, video images obtained by another device such as a mobile terminal owned by the user, stationary image content, and the like are included.

When the rotation position of the information processing apparatus 100 hung on the wall is set such that the large screen is laterally installed as shown in FIG. 1, it is possible to display a movie as an operation target object corresponding to an entire screen size while a world view depicted in the movie is maintained substantially as it is.

Figure 3A:
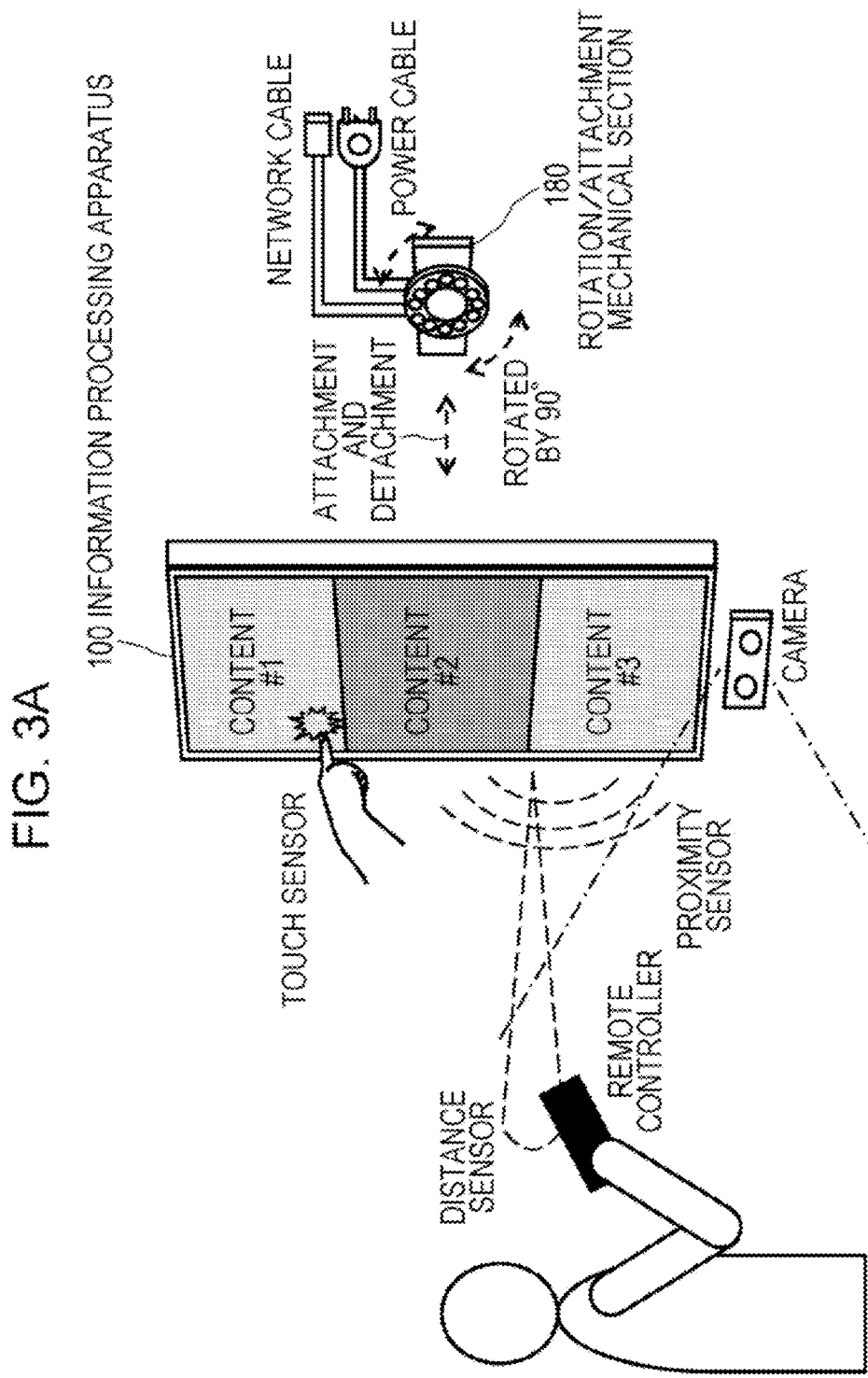
FIG. 3A is a diagram showing another example of a use state of the information processing apparatus 100 provided with the large screen.
Figure 3B:
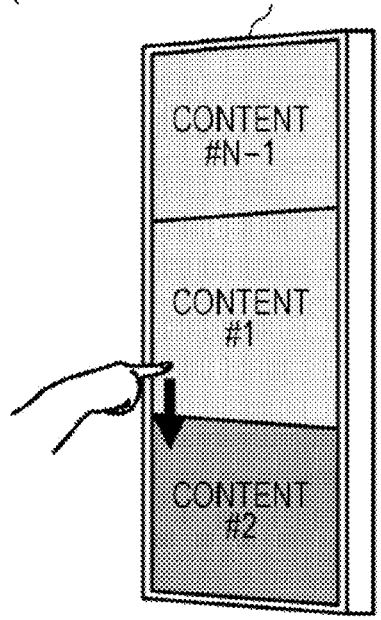
FIG. 3B is a diagram showing another example of a use state of the information processing apparatus 100 provided with the large screen.
Figure 3C:
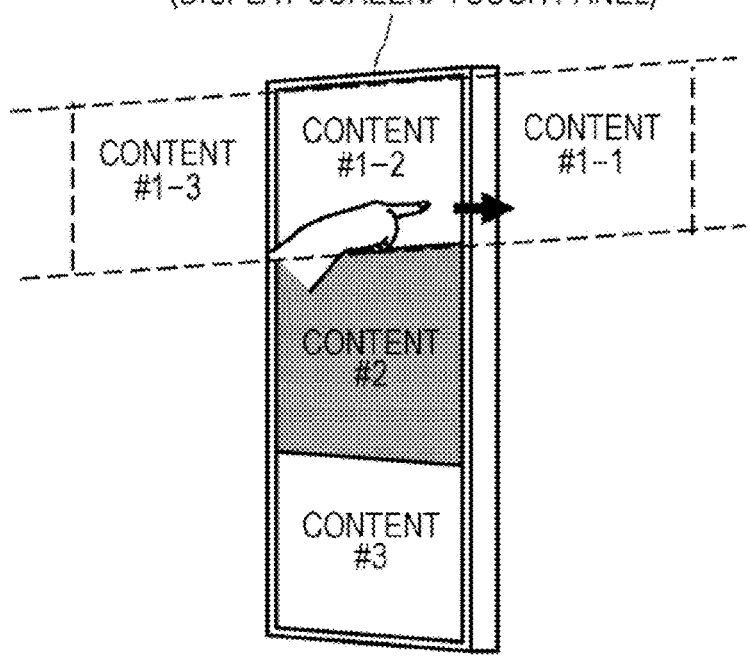
FIG. 3C is a diagram showing another example of a use state of the information processing apparatus 100 provided with the large screen.

Here, when the rotation position of the information processing apparatus 100 hung on the wall is set such that the large screen is in the longitudinal direction, it is possible to arrange three screens with an aspect ratio of 16:9 in the vertical direction as shown in FIG. 3A. For example, three kinds of content #1 to #3 such as broadcast content simultaneously received from different broadcasting stations, content reproduced from a recording medium, streaming video images on a network, or the like can be arranged in the vertical direction and simultaneously displayed. Moreover, when the user performs an operation with a tip of a finger, for example, in the vertical direction on the screen, the content is scrolled in the vertical direction as shown in FIG. 3B. In addition, when the user performs an operation with the tip of the finger in the horizontal direction at any position in the three stages, the screen in the stage is scrolled in the horizontal direction as shown in FIG. 3C.

On the other hand, in the "Tabletop" state shown in FIG. 2, the information processing apparatus 100 is directly installed on the table. While the rotation and attachment mechanism unit 180 is also used as an electrical contact in the use state shown in FIG. 1 (as described above), the electrical contact to the information processing apparatus 100 is not found in the state in which the information processing apparatus 100 is installed on the table as shown in FIG. 2. Thus, the information processing apparatus 100 may be configured to be operable by a built-in battery with no power source in the Tabletop state shown in the drawing. In addition, if the information processing apparatus 100 is provided with a wireless communication unit corresponding to a mobile station function of a wireless LAN (Local Area Network), for example, and the rotation and attachment mechanism unit 180 is provided with a wireless communication unit corresponding to an access point function of the wireless LAN, the information processing apparatus 100 can access various servers on the Internet through wireless communication with the rotation and attachment mechanism unit 180 as an access point even in the Tabletop state.

A plurality of operation target objects as targets to be operated are defined on the screen of the large screen on the Tabletop. The operation objects have specific display areas for arbitrary internet sites, applications, and functional modules such as widgets as well as video images, stationary images, text content.

The information processing apparatus 100 is provided with a proximity sensor for detecting a presence or a state of users at each of four side edge portions of the large screen. In the same manner as described above, a user who has approached the large screen may be imaged by the camera and person recognition may be performed. In addition, the very-short-range communication unit detects whether or not the user, who has been detected to be present, owns a device such as a mobile terminal and detects a request for exchanging data from another terminal owned by the user. When the user or the terminal owned by the user has been detected, or in a state in which the user is being detected, it is possible to express a wave-like detection indicator or perform illumination expression (which will be described later) representing a detection state on the screen to give the user visual feedback.

When presence of a user is detected by the proximity sensor or the like, the information processing apparatus 100 uses the detection result for UI control. It is possible to use the detection result for more detailed UI control if not only whether or not the user is present but also positions of a trunk, both arms and legs, and a head are detected. In addition, the information processing apparatus 100 is also provided with the very-short-range communication unit and can directly and naturally exchange data with a device owned by a user who approaches a position in a very short range (same as above).

Here, as an example of the UI control, the information processing apparatus 100 sets a user occupying area for each user and a common area which is commonly used by the users in the large screen in accordance with the detected user arrangement. Then, a touch sensor input of each user in the user occupying area and the common area is detected. A shape of the screen and an area dividing pattern are not limited to rectangles and can be adapted to a square shape, a circular shape, or a shape including a solid such as a circular cone.

If the screen of the information processing apparatus 100 is enlarged, room for spaces on which a plurality of users simultaneously perform touch inputs is generated in the Tabletop state. As described above, it is possible to realize comfortable and efficient simultaneous operations by the plurality of users by setting the user occupying area for each user and the common area in the screen.

An operation right of an operation target object placed in a user occupying area is given to a corresponding user. The operation right of the operation target object is moved to the user themselves by moving the operation target object from the common area or a user occupying area for another user to their own user occupying area. Moreover, if the operation target object enters to their own user occupying area, display is automatically changed such that the operation target object faces themselves.

When the operation target object is displaced between the user occupying areas, the operation target object is physically displaced in a natural operation in accordance with a touch position on which a displacement operation is performed. In addition, an operation for dividing or copying one operation target object can be performed by mutually pulling the operation target object by users.

FIG. 4 schematically shows a functional configuration of the information processing apparatus 100. The information processing apparatus 100 is provided with an input interface unit 110 to which an information signal from the outside is input, a computation unit 120 which performs computation processing for control of the display screen based on the input information signal, an output interface unit 130 which outputs information to the outside based on the computation result, a high-capacity storage unit 140 configured by a hard disk drive (HDD) or the like, a communication unit 150 which is connected to an external network, a power unit 160 which deals with drive power, and a television tuner unit 170. The storage unit 140 stores thereon various processing algorithms executed by the computation unit 120 and various kinds of database used in computation processing by the computation unit 120.

Figure 5:
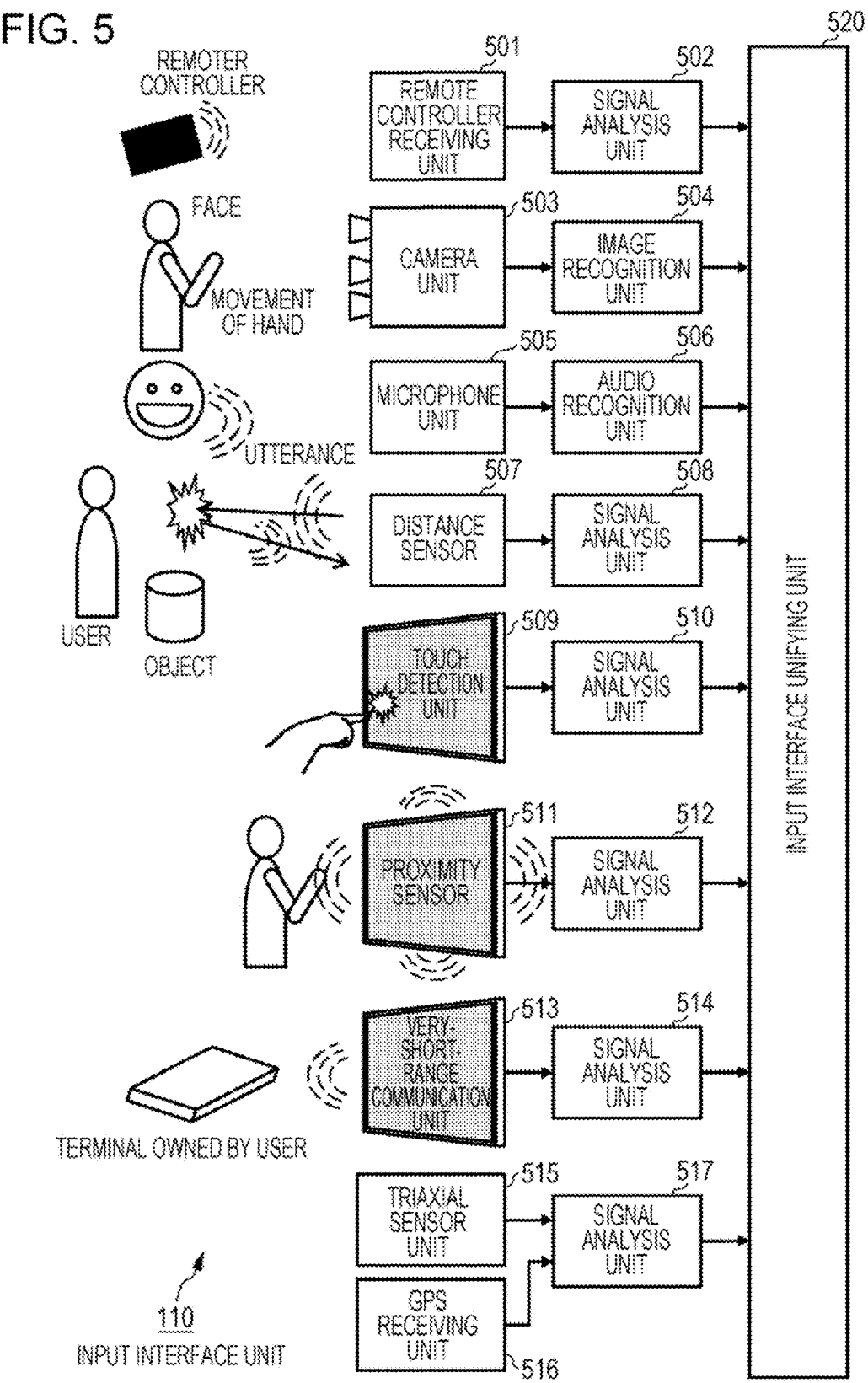
FIG. 5 is a diagram showing an internal configuration of the input interface unit 110.

Main functions of the input interface unit 110 include detection of user presence, detection of a touch operation by the detected user on the screen, namely a touch panel, detection of a device such as a mobile terminal owned by the user, and processing for receiving transmitted data from the device. FIG. 5 shows an internal configuration of the input interface unit 110.

The remote control receiving unit 501 receives a remote control signal from a remote controller or a mobile terminal. A signal analysis unit 502 performs demodulation and decoding processing on the received remote control signal and obtains a remote control command.

As a camera unit 503, a monocular type or one or both of a two-lens type and an active type is employed. The camera unit 503 is configured by an imaging element such as a CMOS (Complementary Metal Oxide Semiconductor) or a CCD (Charge Coupled Device). In addition, the camera unit 503 is provided with a camera control unit for panning, tilting, zooming, and the like. The camera unit 503 informs the computation unit 120 of camera information relating to panning, tilting, zooming, and the like and control panning, tilting, and panning, tilting, and zooming of the camera unit 503 can be controlled in accordance with camera control information from the computation unit 120.

An image recognition unit 504 performs recognition processing on an image captured by the camera unit 503. Specifically, a user face or a hand motion is detected by background differencing, a user face included in a captured image or a human body is recognized, and a distance to a user is recognized.

A microphone unit 505 performs audio input of sound or conversation generated by users. An audio recognition unit 506 performs audio recognition on the input audio signal.

A distance sensor 507 is configured by a PSD (Position Sensitive Detector), for example, and detects a signal replied from a user or another subject. A signal analysis unit 508 analyzes the detection signal and measures a distance to the user or the substance. A pyroelectric sensor or a simple camera can be used as the distance sensor 507 as well as the PDS sensor. The distance sensor 507 constantly monitors whether or not a user is present within a radius of 5 to 10 meters, for example, from the information processing apparatus 100. For this reason, it is preferable that a low power consumption sensor element be used for the distance sensor 507.

A touch detection unit 509 is configured by a touch sensor superimposed on the screen and outputs a detection signal from a position, which a tip of a user's finger touches, on the screen. A signal analysis unit 510 analyzes the detection signal and obtains position information.

A proximity sensor 511 is installed at each of four side edge portions of the large screen to detect that a user body has approached the screen based on an electrostatic capacitance scheme. A signal analysis unit 512 analyzes the detection signal.

A very-short-range communication unit 513 receives a non-contact communication signal from a device or the like owned through a user by NFC (Near Field Communication). A signal analysis unit 514 performs demodulation and decoding processing on the received signal to obtain received data.

A triaxial sensor unit 515 is configured by a gyro and detects a posture of the information processing apparatus 100 about each of x, y, and z axes. A GPS (Global Positioning System) receiving unit 516 receives a signal from a GPS satellite. A signal analysis unit 517 analyzes signals from the triaxial sensor unit 515 and the GPS receiving unit 516 to obtain position information and posture information of the information processing apparatus 100.

An input interface unifying unit 520 unifies inputs of the above information signals and passes the unified input to the computation unit 120. In addition, the input interface unifying unit 520 unifies analysis results of the signal analysis units 508, 510, 512, and 514, obtains position information of the users who are present in the surroundings of the information processing apparatus 100, and passes the position information to the computation unit 120.

Main functions of the computation unit 120 includes computation processing such as UI screen generation processing based on a user detection result by the input interface unit 110, a screen touch detection result, and data received from the device owned by the user and outputs of the computation result to the output interface unit 130. The computation unit 120 can realize computation processing for each application by loading and executing an application program installed on the storage unit 140, for example. A functional configuration of the computation unit 120 corresponding to each application will be described later.

Figure 6:
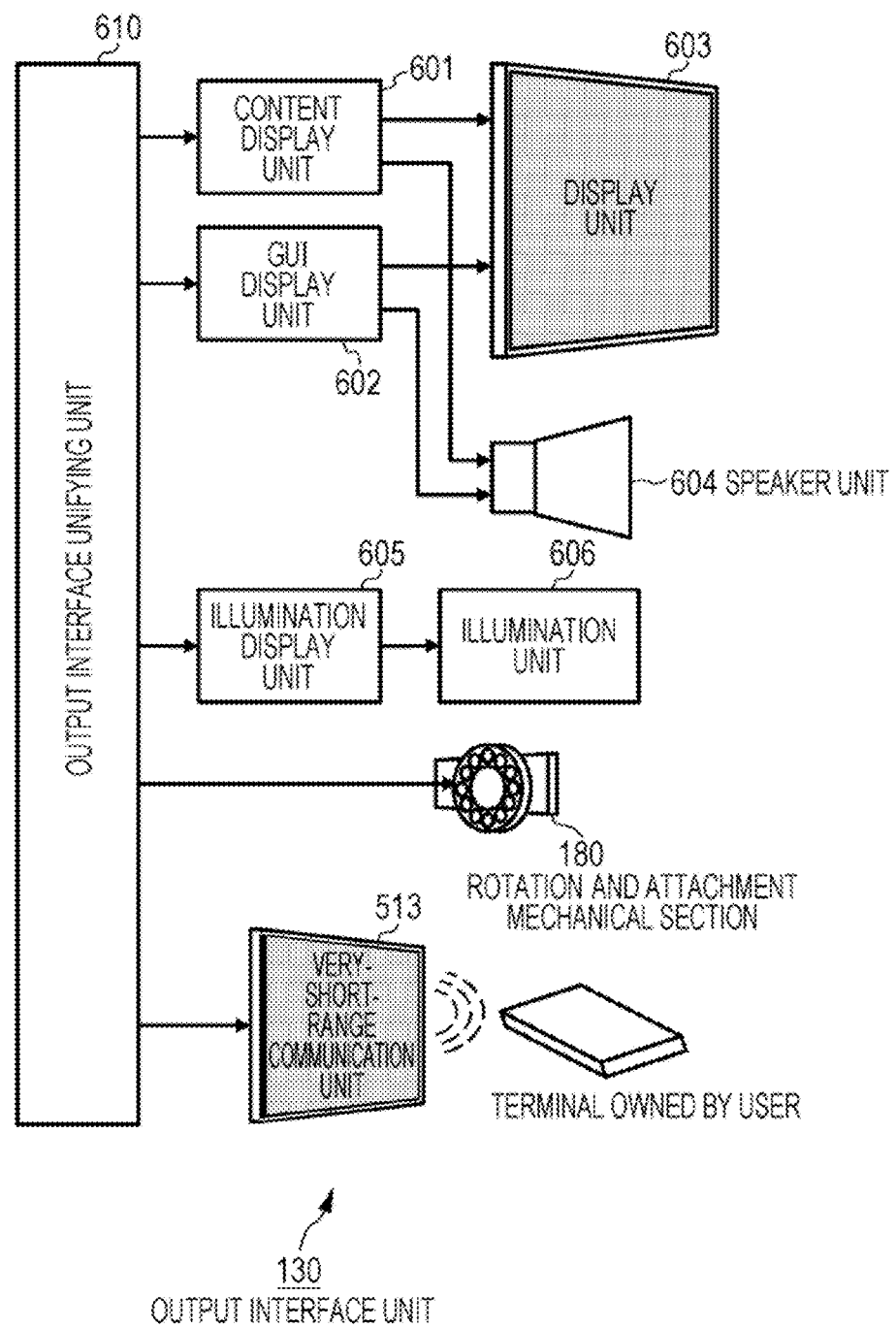
FIG. 6 is a diagram showing an internal configuration of an output interface unit 130.

Main functions of the output interface unit 130 includes UI display on the screen based on the computation result by the computation unit 120 and transmission of data to the device owned by the user. FIG. 6 shows an internal configuration of the output interface unit 130.

An output interface unifying unit 610 collectively deals with information output based on computation results of monitor division processing by the computation unit 120, object optimal processing, equipment coordination data exchange processing, and the like.

The output interface unifying unit 610 instructs a content display unit 601 to output an image and audio to a display unit 603 and a speaker unit 604 for video image or stationary image content such as content received from television broadcasts, content reproduced from a recording medium such as a Blu-ray disc.

In addition, the output interface unifying unit 610 instructs a GUI display unit 602 to display a GUI of an operation target object and the like on the display unit 603.

In addition, the output interface unifying unit 610 instructs an illumination display unit 605 to output and display illumination, which represents a detection state, from an illumination unit 606.

In addition, the output interface unifying unit 610 instructs the very-short-range communication unit 513 to transmit data through non-contact communication to the device owned by the user.

The information processing apparatus 100 can detect a user based on recognition of an image captured by the camera unit 503 and detection signals by the distance sensor 507, the touch detection unit 509, the proximity sensor 511, the very-short-range communication unit 513, and the like. In addition, it is possible to identify who the detected user is by face recognition of the image captured by the camera unit 503 and by causing the very-short-range communication unit 513 to recognize the device owned by the user. The identified user can log in the information processing apparatus 100. It is a matter of course that accounts which can be logged in can be limited to specific users. In addition, the information processing apparatus 100 can separately use the distance sensor 507, the touch detection unit 509, and the proximity sensor 511 depending on a user position and a user state and receive an operation from the user.

In addition, the information processing apparatus 100 is connected to an external network through the communication unit 150. The connection state to the external network may be wired or wireless connection. The information processing apparatus 100 can communicate with other devices such a mobile terminal including a smartphone, a tablet terminal, and the like owned by the user through the communication unit 150. A so-called "three screens" can be configured by a combination of three types of apparatuses, namely the information processing apparatus 100, the mobile terminal, and the tablet terminal. The information processing apparatus 100 can provide a UI for causing the three screens to cooperate on a large screen than the other two screens.

Data such as a video image, a stationary image, text content, or the like as an entity of the operation target object is exchanged between the information processing apparatus 100 and a corresponding owned terminal in the background in that the user is performing a touch operation on the screen or the user is performing an action such as causing the owned terminal to approach the information processing apparatus 100, for example. Furthermore, a cloud server or the like is installed on the external network, and the three screens can benefit from cloud computing through the information processing apparatus 100 such that the three screens can use a computation ability of the cloud server, for example.

Hereinafter, some applications of the information processing apparatus 100 will be described in order.

B. Simultaneous Operations by a Plurality of Users on Large Screen

The information processing apparatus 100 can be simultaneously operated by a plurality of users on the large screen. Specifically, the proximity sensor 511 for detecting user presence or a user state is provided at each of the four side edge portions of the large screen, and user occupying areas and a common area are set in the screen in accordance with the user arrangement to make it possible for the plurality of users to comfortably and efficiently perform simultaneous operations.

If the screen of the information processing apparatus 100 is enlarged, room for spaces on which the plurality of users simultaneously perform touch inputs is generated in the Tabletop state. It is possible to realize comfortable and efficient simultaneous operations by the plurality of users by setting the user occupying area for each user and the common area in the screen as described above.

An operation right of the operation target object placed in a user occupying area is given to a corresponding user. When the user displaces the operation target object from the common area or a user occupying area of another user to their own user occupying area, the operation right of the operation target object is moved to the user. In addition, when the operation target object enters their own user occupying area, the display is automatically changed such that the operation target object is in the direction in which the operation target object faces the user themselves.

In a case in which an operation target object is displaced between user occupying areas, the operation target object is physically displaced in a natural operation in accordance with a touch position at which a displacement operation is performed. In addition, users can perform an operation for dividing or copying one operation target object by mutually pulling the operation target object by users.

Figure 7:
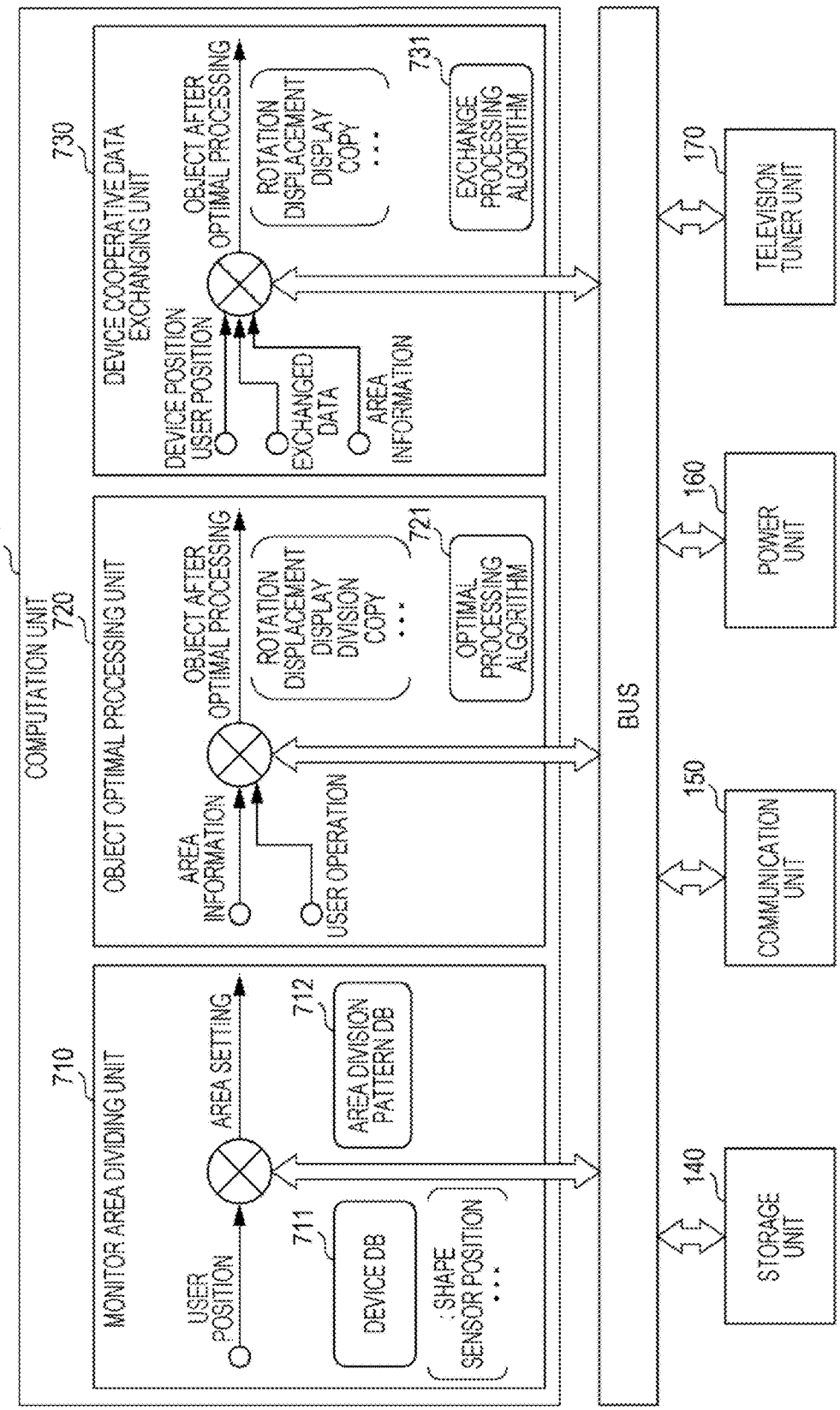
FIG. 7 is a diagram showing an internal configuration for a computation unit 120 performing processing on an operation target object.

Main functions of the computation unit 120 when the application is implemented includes optimization of an operation target object and UI generation based on a user detection result by the input interface unit 110, a screen touch detection result, and data received from the device owned by the user. FIG. 7 shows an internal configuration for the computation unit 120 performing processing on an operation target object. The computation unit 120 is provided with a monitor area dividing unit 710, an object optimal processing unit 720, and an equipment coordination data exchange processing unit 630.

When user position information is obtained from the input interface unifying unit 520, the monitor area dividing unit 710 refers to device database 711 relating to shapes, sensor arrangement, and the like and area pattern database 711 stored on the storage unit 140 and sets the aforementioned user occupying areas and the common area on the screen. Then, the monitor area setting unit 710 passes the set area information to the object optimal processing unit 720 and the equipment coordination data exchanging unit 730. A processing procedure for monitor area division will be described in detail later.

The object optimal processing unit 720 inputs information on operations which the user performs on the operation target object on the screen from the input interface unifying unit 520. Then, the object optimal processing unit 720 performs optimal processing on the operation target object, that is, rotates, displaces, displays, divides, or copies the operation target object, on which the user has performed an operation, corresponding to the user operation based on an optimal processing algorithm 721 loaded from the storage unit 140, and outputs the operation target object, on which the optimal processing has been performed, to the screen of the display unit 603. The optimal processing for the operation target object will be described in detail later.

The equipment coordination data exchanging unit 730 inputs position information of the user and the device owned by the user and data exchanged with the device from the input interface unifying unit 520. Then, the equipment coordination data exchanging unit 730 performs data exchange processing in cooperation with the device owned by the user based on an exchange processing algorithm 731 loaded from the storage unit 140. In addition, the object optimal processing unit 720 performs optimal processing on the operation target object corresponding to the data exchange processing. For example, the object optimal processing unit 720 performs optimal processing of the operation target object accompanying the data exchange in cooperation with the device owned by the user, that is, rotates, displaces, displays, or copies the operation target object relating to the exchanged data, and outputs the operation target object, on which the optimal processing has been performed, to the screen of the display unit 603. The optimal processing for the operation target object accompanying the device cooperation will be described in detail later.

Subsequently, detailed description will be given of monitor area division processing. Although the monitor area division is assumed to be processing mainly in a use state in which the information processing apparatus 100 is commonly used by a plurality of users in the Tabletop state, it is a matter of course that the processing may be performed in a use state in which the information processing apparatus 100 is commonly used by a plurality of users in the Wall state.

Figure 8:
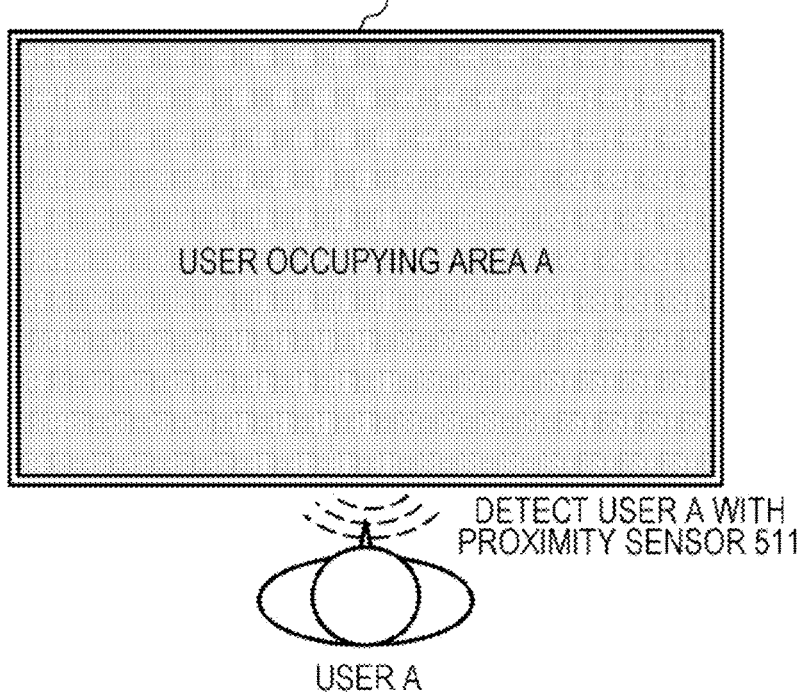
FIG. 8 is a diagram showing a state in which a user occupying area is set in the screen.

When user presence is detected through the input interface unifying unit 520, the monitor area dividing unit 710 allocates a user occupying area for the user in the screen. FIG. 8 shows a state in which the monitor area dividing unit 710 sets a user occupying area A for the user A in the screen in response to detecting presence of the user A by a detection signal from the proximity sensor 511 (or the distance sensor 507) installed at the side edge portion of the screen. When presence of only one user has been detected, the entire screen may be set to the user occupying area for the user as shown in the drawing.

Here, when the user occupying area A is set, the object optimal processing unit 720 shifts a direction of each operation target object in the user occupying area A so as to face the user based on the position information of the user A obtained through the input interface unifying unit 520. FIG. 9A shows a state in which each of the operation target objects #1 to #6 is randomly oriented before the user occupying area A is set. In the drawing, it should be understood that inclination of each character "#1", "#2", . . . in the object represents a direction of the object in the drawing. In addition, FIG. 9B shows a state in which directions of all operation target objects #1 to #6 in this area are shifted to a direction in which the operation target objects #1 to #6 face a user A by setting the user occupying area A for the user A.

When the presence of only the user A has been detected, the entire screen may be set to the user occupying area A for the user A. On the other hand, when the presence of two or more users has been detected, it is preferable to set a common area which can be commonly used by the users in order that the users perform cooperative work (collaborative action).

Figure 10:
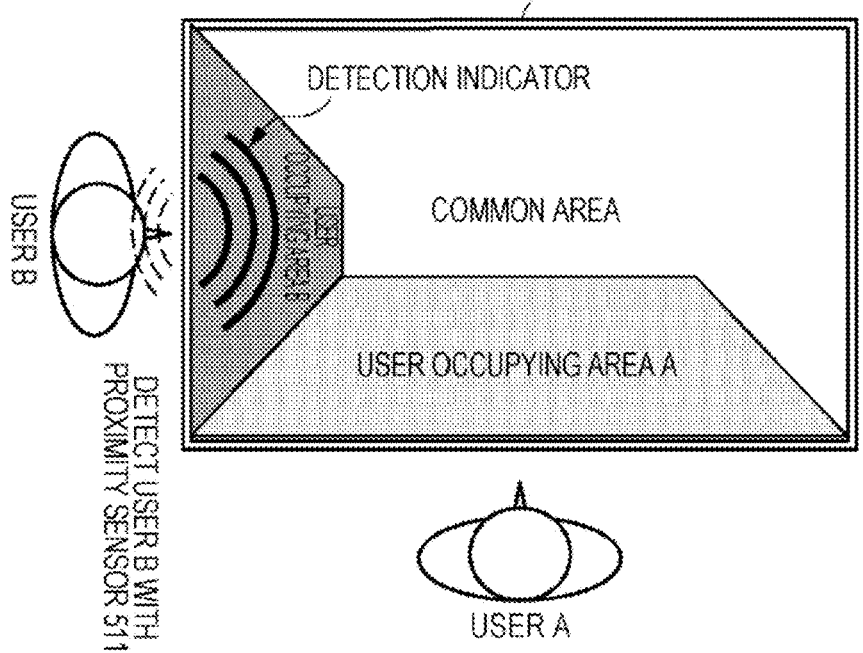
FIG. 10 is a diagram showing a state in which a user occupying area B for a user B and a common area are additionally set in the screen since it has been detected that the user B is present as well as the user A.

FIG. 10 shows a state in which the monitor area dividing unit 710 additionally sets a user occupying area B for the user B and a common area in the screen since presence of user B has been detected at an adjacent side edge of the screen by a detection signal of the proximity sensor 511 or the distance sensor 507, in addition to the user A. The user occupying area A for the user A retreats to a position where the user A is present, and the user occupying area B for the user B appears near a position where the user B is present, based on position information of the users A and B. In addition, since the presence of the user B has been newly detected, a wave-like detection indicator is also displayed in the user occupying area B. Then, all area other than the user occupying area A and the user occupying area B in the screen becomes the common area. The user occupying area B may be enabled at a timing at which an arbitrary operation target object in the user occupying area B is touched for the first time after the user occupying area B is newly set in the screen when the user B approaches the information processing apparatus 100. Although not shown in FIG. 10, a direction of each operation target object in the area which has newly become the user occupying area B is shifted so as to face the user B at timing at which the user occupying area B is set or at timing at which the user occupying area B is enabled.

Figure 11:
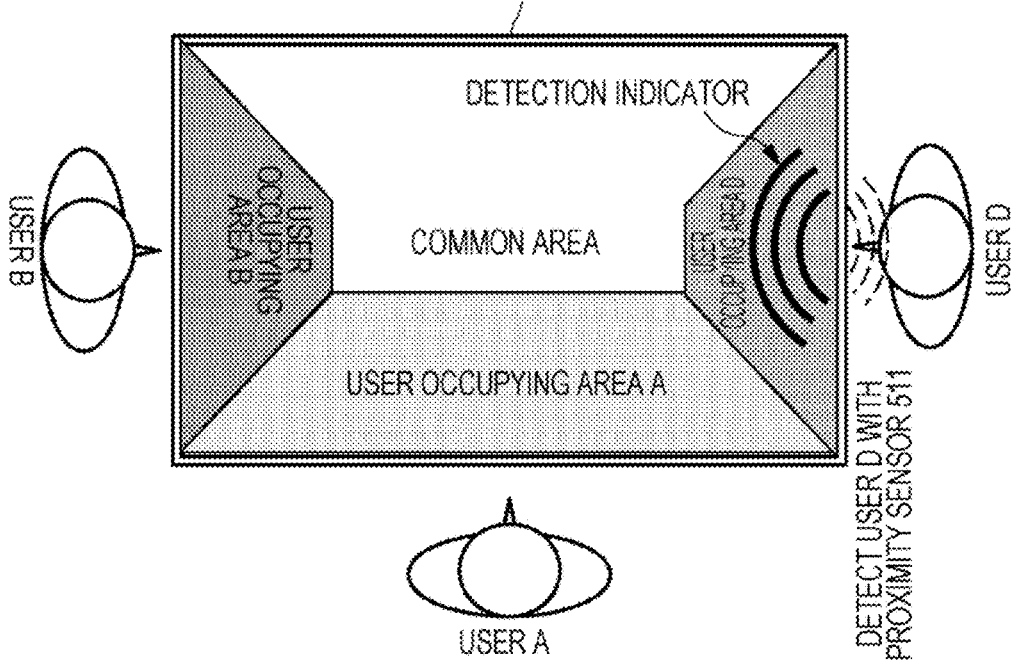
FIG. 11 is a diagram showing a state in which a user occupying area D for the user B and the common area are additionally set in the screen since it has been detected that a user D is present as well as the users A and B.
Figure 12:
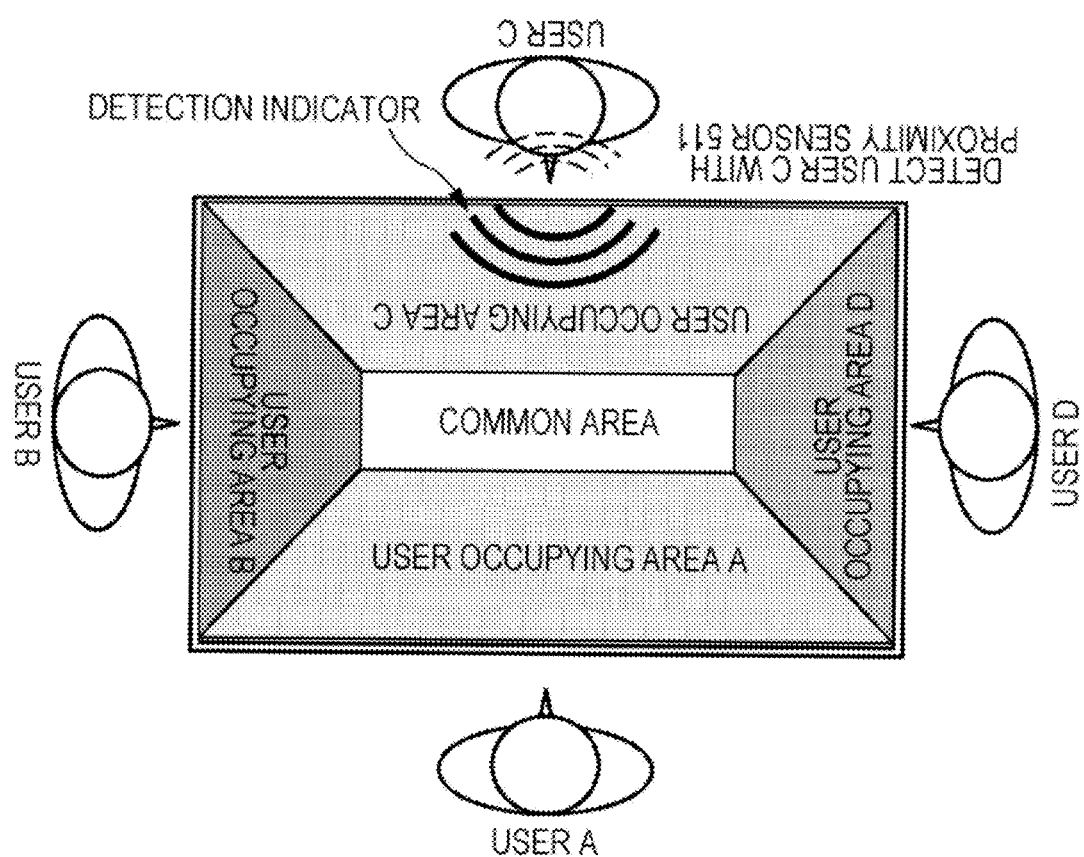
FIG. 12 is a diagram showing a state in which a user occupying area C for the user B and the common area are additionally set in the screen since it has been detected that a user C is present as well as the users A, B, and D.
Figure 13A:
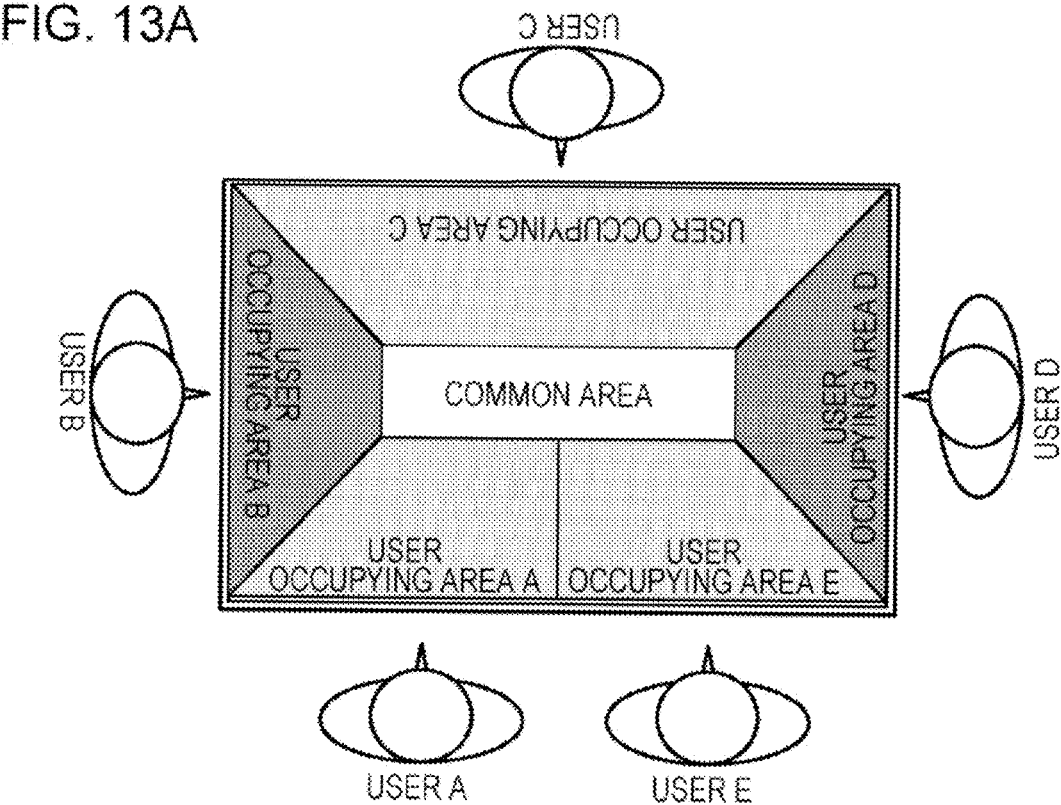
FIG. 13A is a diagram showing an example of an area division pattern in which the screen is divided into the user occupying area for each user in accordance with a shape and a size of the screen and a number of the users.
Figure 13B:
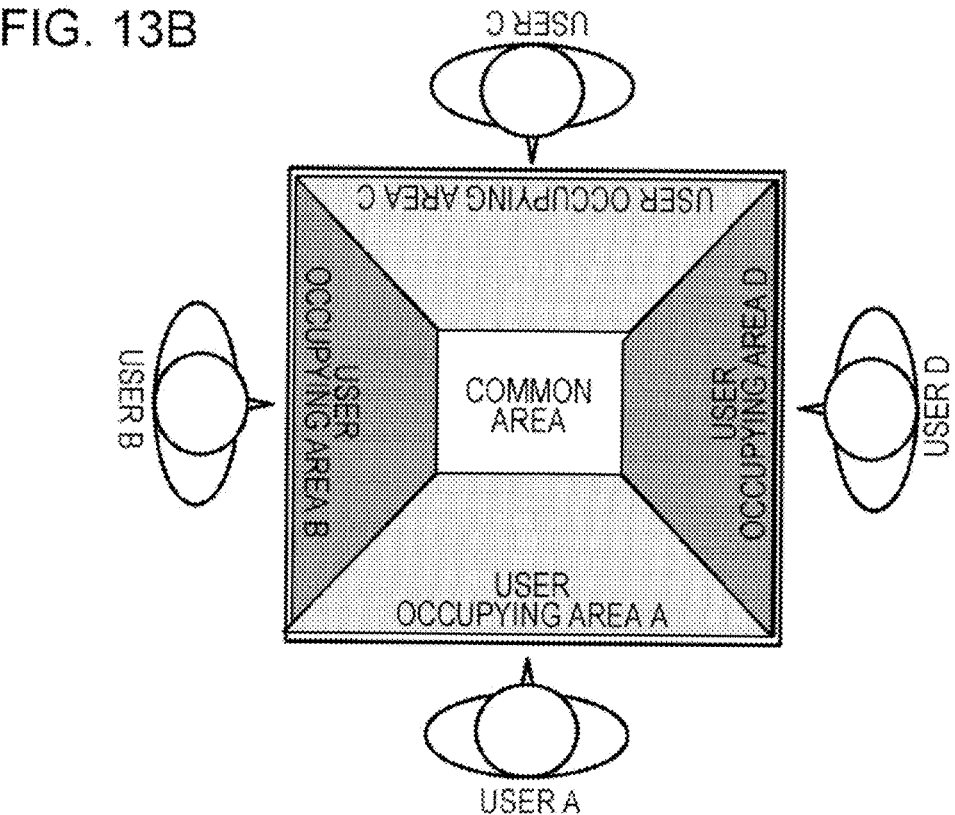
FIG. 13B is a diagram showing an example of an area division pattern in which the screen is divided into the user occupying area for each user in accordance with a shape and a size of the screen and a number of the users.
Figure 13C:
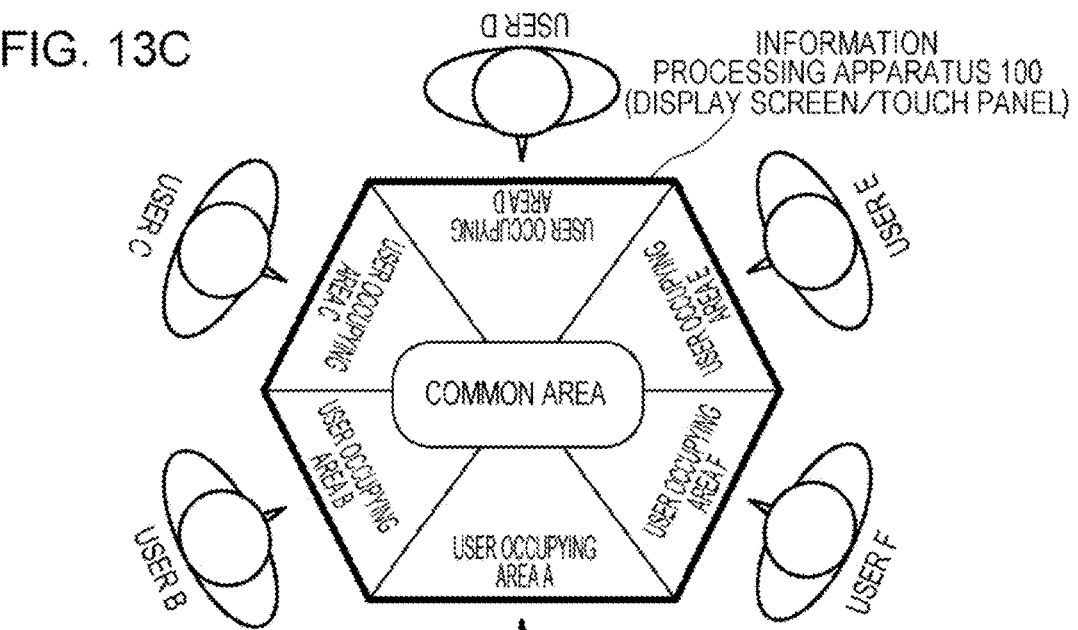
FIG. 13C is a diagram showing an example of an area division pattern in which the screen is divided into the user occupying area for each user in accordance with a shape and a size of the screen and a number of the users.
Figure 13D:
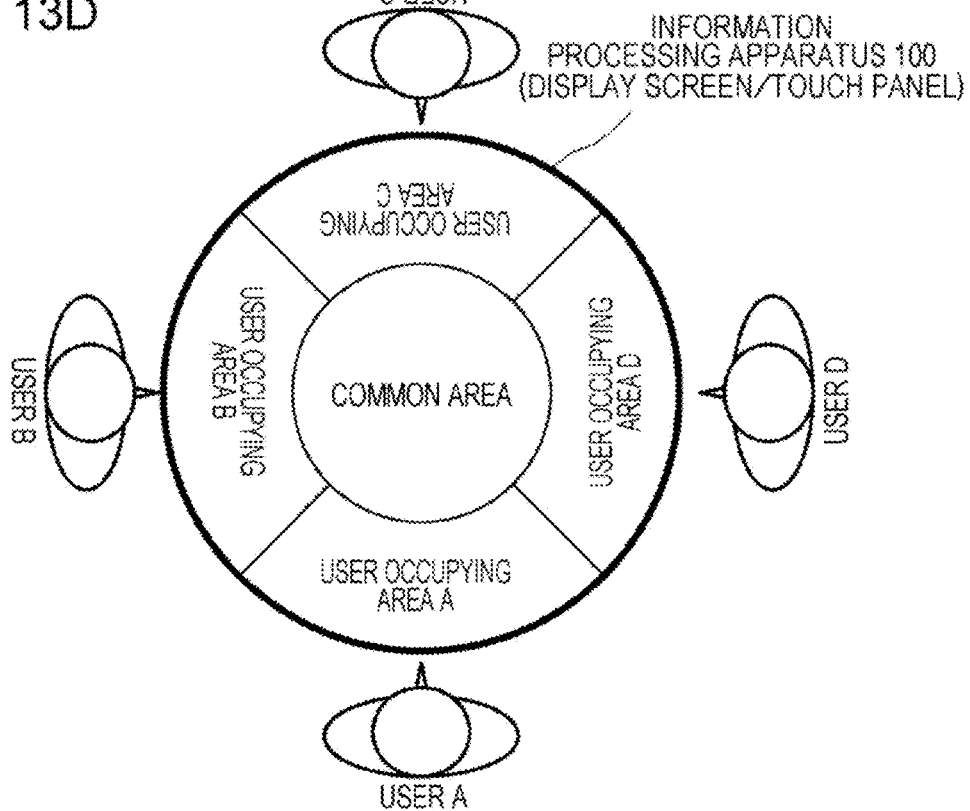
FIG. 13D is a diagram showing an example of an area division pattern in which the screen is divided into the user occupying area for each user in accordance with a shape and a size of the screen and a number of the users.
Figure 13E:
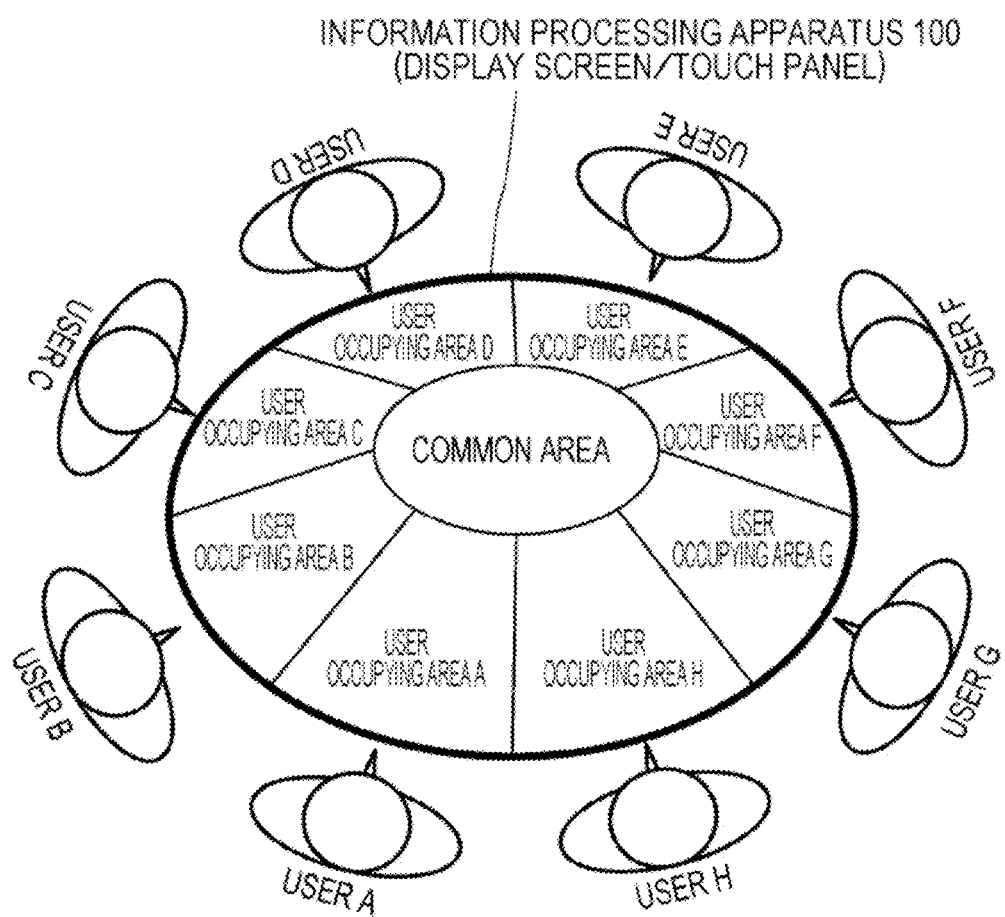
FIG. 13E is a diagram showing an example of an area division pattern in which the screen is divided into the user occupying area for each user in accordance with a shape and a size of the screen and a number of the users.

FIG. 11 shows a state in which the monitor area dividing unit 710 additionally sets a user occupying area D for a user D in the screen near a position where the D is present since presence of the user D has been detected at still another side edge of the screen in addition to the users A and B. In the user occupying area D, a wave-like detection indicator is displayed to express that presence of the user D has been newly detected. In addition, FIG. 12 shows a state in which the monitor area dividing unit 710 additionally sets a user occupying area C for a user C in the screen near a position where the user C is present since presence of the user C has been detected at still another side edge of the screen in addition to the users A, B, and D. In the user occupying area C, a wave-like detection indicator is displayed to express that the presence of the user C has been newly detected.

In addition, area division patterns for the user occupying areas and the common areas in FIGS. 8 to 12 are shown only for illustrative purposes. The area division pattern depends on a shape of the screen, a number of users which have been detected to be present, and arrangement thereof. Area division pattern database 611 accumulates information relating to area division patterns in accordance with a shape and a size of the screen and a number of users. In addition, device database 711 accumulates information on a shape and a size of the screen used in the information processing apparatus 100. Then, when position information on a detected user is input through the input interface unifying unit 520, the monitor area dividing unit 710 reads the shape and the size of the screen from the device database 711 and refers to an area division pattern database 712 about a corresponding area division pattern. FIGS. 13A to 13E show examples of the area division patterns in which the screen is divided into user occupying areas for users in accordance with a shape and a size of the screen and a number of the users.

Figure 14:
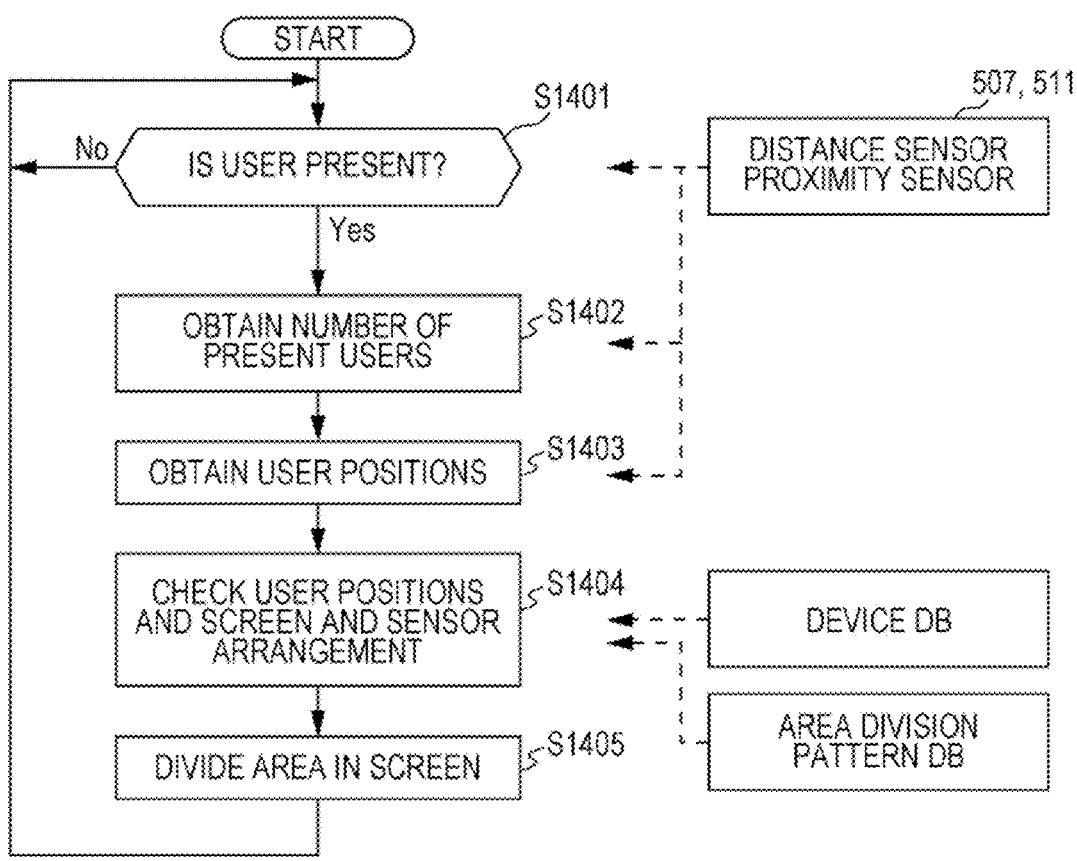
FIG. 14 is a flowchart showing a processing procedure for monitor area division executed by a monitor area dividing unit 710.

FIG. 14 shows a processing procedure for the monitor area division executed by the monitor area dividing unit 710 in the form of a flowchart.

First, the monitor area dividing unit 710 checks whether or not users are present near the screen based on a signal analysis result of a detection signal by the proximity sensor 511 or the distance sensor 507 (Step S1401).

When it has been detected that the users are present (Yes in Step S1401), the monitor area dividing unit 710 subsequently obtains a number of the present users (Step S1402) and further obtains positions where the users are present (Step S1403). The processing in Steps S1401 to S1403 is implemented based on user position information passed from the input interface unifying unit 520.

Subsequently, the monitor area dividing unit 710 refers to the device database 711 to obtain device information such as a shape of the screen of the display unit 603 used in the information processing apparatus 100 and arrangement of the proximity sensors 511, combines this with the user position information, and refers to the area division pattern database 712 about a corresponding area division pattern (Step S1404).

Then, the monitor area dividing unit 710 sets a user occupying area for each user and a common area on the screen (Step S1405) based on the obtained area division pattern and completes this processing routine.

Next, detailed description will be given of object optimal processing by the object optimal processing unit 720.

When information on an operation which a user has performed on the operation target object on the screen is input through the input interface unifying unit 520, the object optimal processing unit 720 performs display processing, that is, rotates, displaces, displays, divides, or copies the operation target object on the screen in response to the user operation. The processing for rotating, displacing, displaying, dividing, or copying the operation target object in response to a user operation such as dragging or throwing is similar to a GUI operation on a desktop screen on a computer.

According to this embodiment, the user occupying areas and the common area are set on the screen, and the object optimal processing unit 720 performs optimal processing on the display in accordance with areas where operation target objects are present. A representative example of the optimal processing is processing for shifting a direction of each operation target object in a user occupying area so as to face a user thereof.

Figure 15:
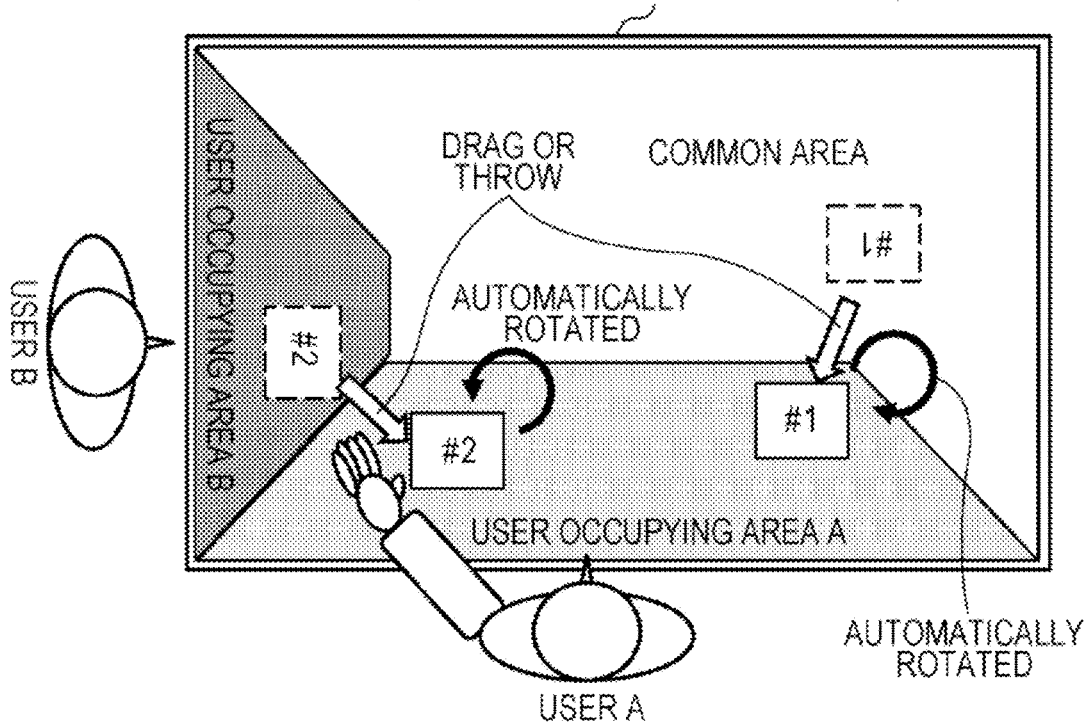
FIG. 15 is a diagram showing a state in which an operation target object is automatically rotated in a direction in which the operation target object faces the user by performing dragging or throw displacement of the operation target object to a user occupying area.

FIG. 15 shows a state in which the object optimal processing unit 720 performs processing for automatically rotating an operation target object #1 in a direction in which the object faces the user A at a moment at which the object in the common area is dragged or thrown toward the user occupying area A for the user A and a part or a center coordinate of the object enters to the user occupying area A. In addition, FIG. 15 also shows a state in which processing is performed for automatically rotating an operation target object #2 in a direction in which the object faces the user A at a moment at which the object in the user occupying area B for the user B is dragged or thrown toward the user occupying area A for the user A and a part or a center coordinate of the object enters to the user occupying area A.

Figure 16A:
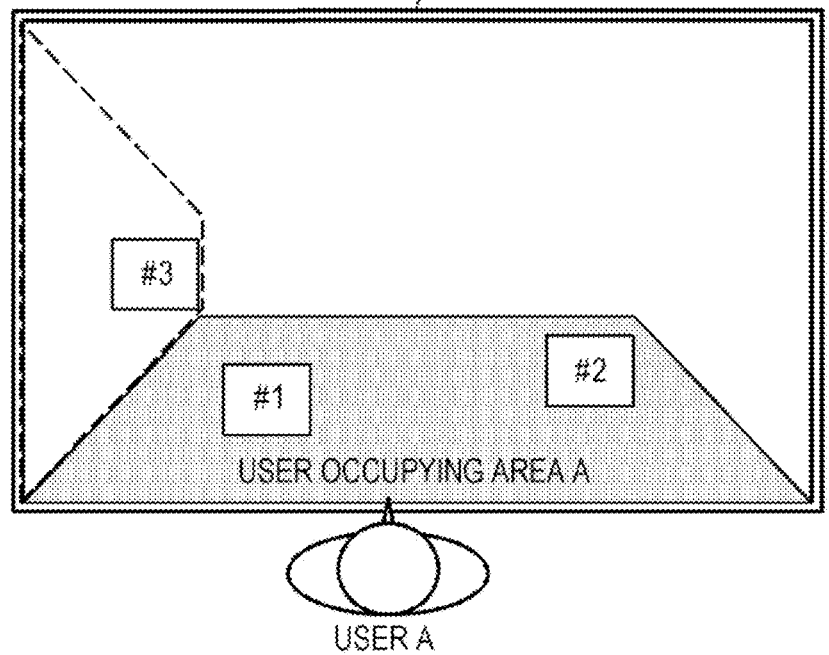
FIG. 16A is a diagram showing a state in which an operation target object newly appearing in a user occupying area is automatically rotated in a direction in which the operation target object faces a user.
Figure 16B:
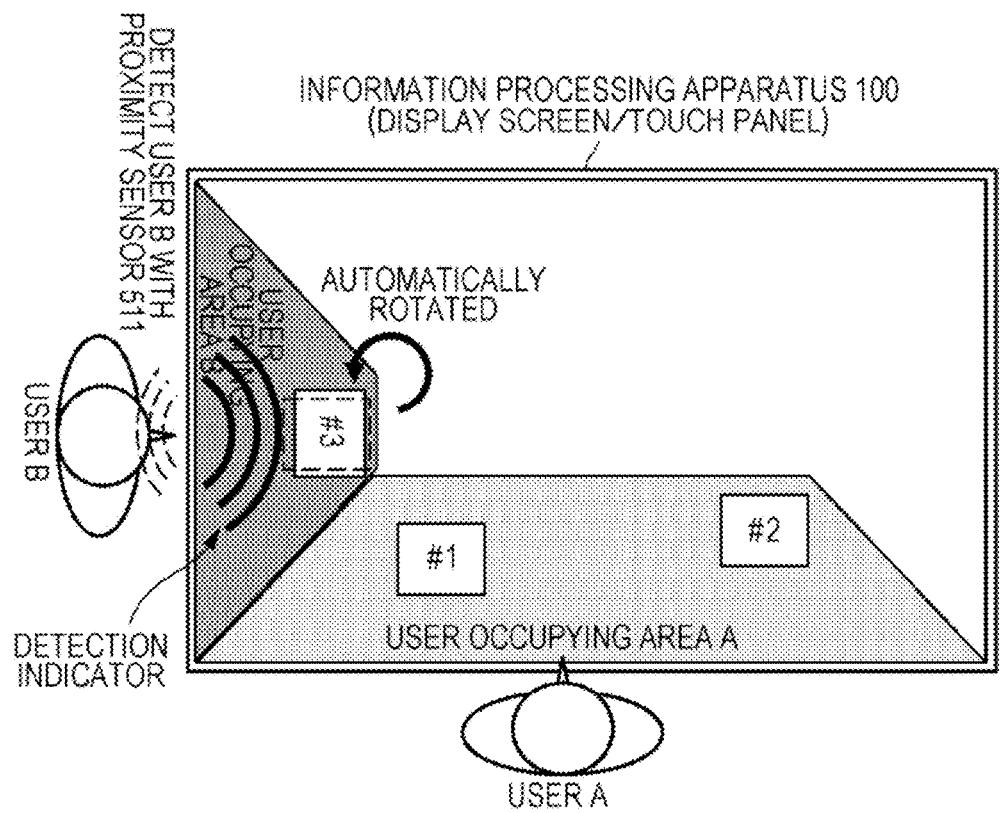
FIG. 16B is a diagram showing a state in which an operation target object newly appearing in a user occupying area is automatically rotated in a direction in which the operation target object faces a user.

As shown in FIG. 10, when the user B approaches the information processing apparatus 100, the user occupying area B is newly set on the screen near the user B. If an operation target object #3 which has originally faced the user A is present in the area which becomes the user occupying area B (see FIG. 16A), the object optimal processing unit 720 immediately performs processing for automatically rotating the operation target object #3 in a direction in which the operation target object #3 faces the user B when the user occupying area B newly appears (see FIG. 16B).

Alternatively, the user occupying area B may be enabled at a timing at which an arbitrary operation target object in the user occupying area B is touched for the first time after the user occupying area B is newly set when the user B approaches the information processing apparatus 100, instead of immediately performing the processing for rotating the operation target object. In such a case, processing may be performed for simultaneously rotating all operation target objects in the user occupying area B in a direction in which the operation target objects face the user B at timing at which the user occupying area B is enabled.

Figure 17:
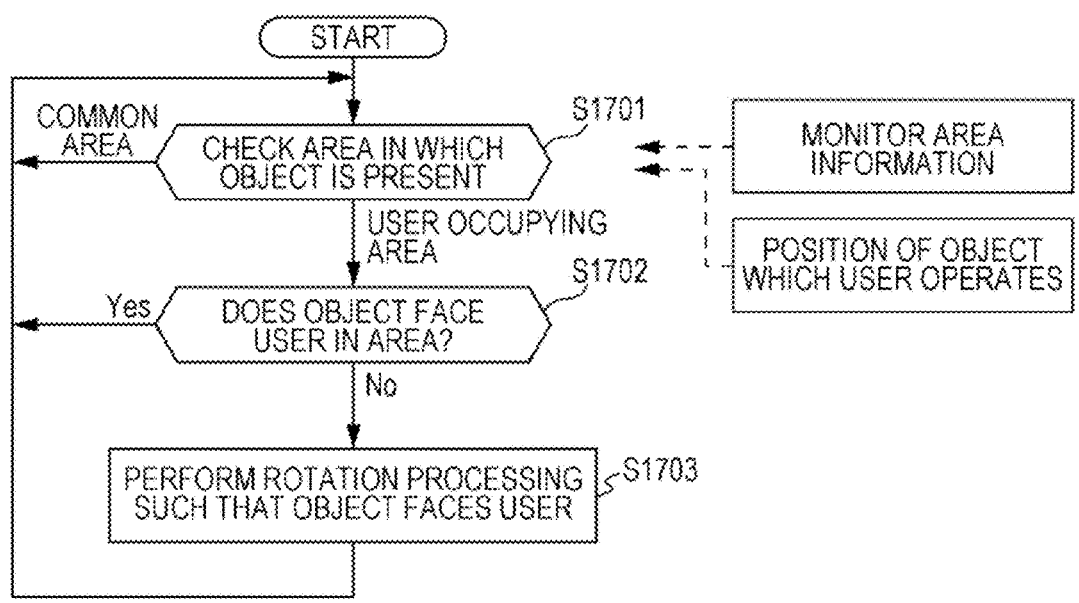
FIG. 17 is a flowchart showing a procedure optimization processing for an operation target object executed by an object optimal processing unit 720.

The object optimal processing unit 720 can perform the optimal processing for the operation target object based on user operation information obtained through the input interface unifying unit 520 and area information passed from the monitor area dividing unit 710. FIG. 17 shows an optimal processing procedure for the operation target object executed by the object optimal processing unit 720 in the form of a flowchart.

When the position information of an operation target object which the user has operated is passed from the input interface unifying unit 520, and the divided monitor area information is obtained from the monitor area dividing unit 710, the object optimal processing unit 720 checks in which area the operation target object operated by the user is present (Step S1701).

Here, when the operation target object operated by the user is present in the user occupying area, the object optimal processing unit 720 checks whether the operation target object is oriented in a direction in which the operation target object faces the user in the user occupying area (Step S1702).

Then, when the operation target object is not oriented in the direction in which the operation target object faces the user (No in Step S1702), the object optimal processing unit 720 performs rotation processing on the operation target object so as to be in the direction in which the operation target object faces the user in the user occupying area (Step S1703).

Figure 18:
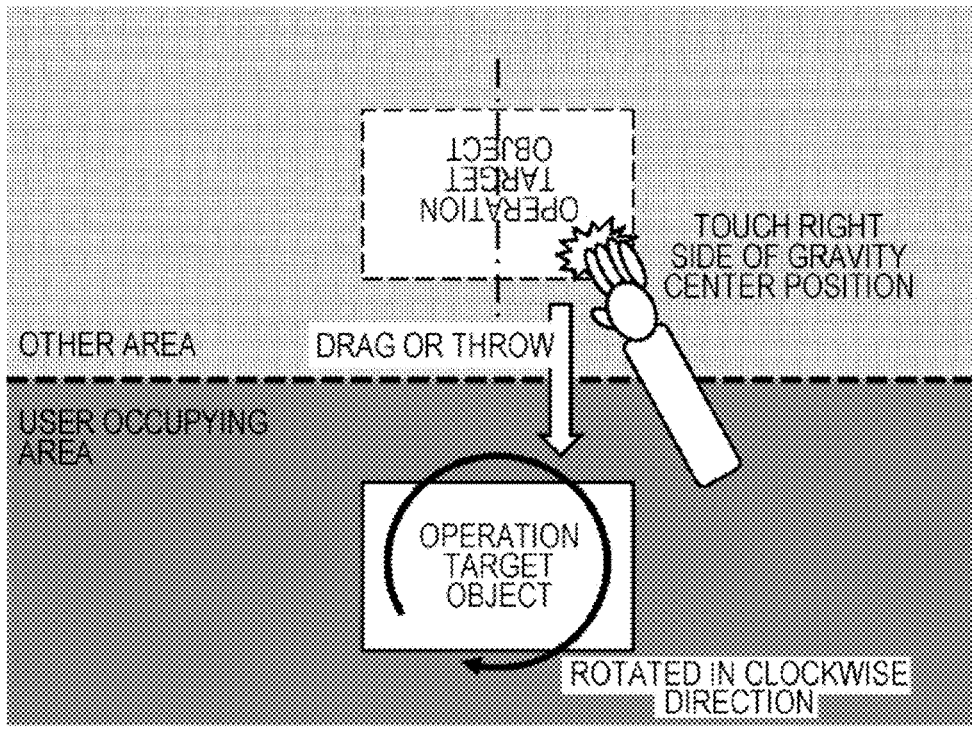
FIG. 18 is a diagram showing a state in which a rotation direction is controlled in accordance with a position at which the user performs a touch operation on an operation target object.

The rotation direction may be controlled in accordance with a position at which the user performs a touch operation on the operation target object when the user displaces the operation target object from the common area or a use occupying area for another user to their own user occupying area by dragging or throwing. FIG. 18 shows a state in which an operation target object is rotated about a position of the center of gravity in a clockwise direction so as to be in the direction in which the operation target object faces the user at a timing at which the user touches the operation target object on the right side of the position of the center of gravity and displaces the operation target object by dragging or throwing to cause the operation target object to enter to the user occupying area. In addition, FIG. 19 shows a state in which the operation target object is rotated about the position of the center of gravity in a counterclockwise direction so as to be in the direction in which the operation target object faces the user when the user touches the operation target object on the left side of the position of the center of gravity and displaces the operation target object by dragging or throwing.

Figure 19:
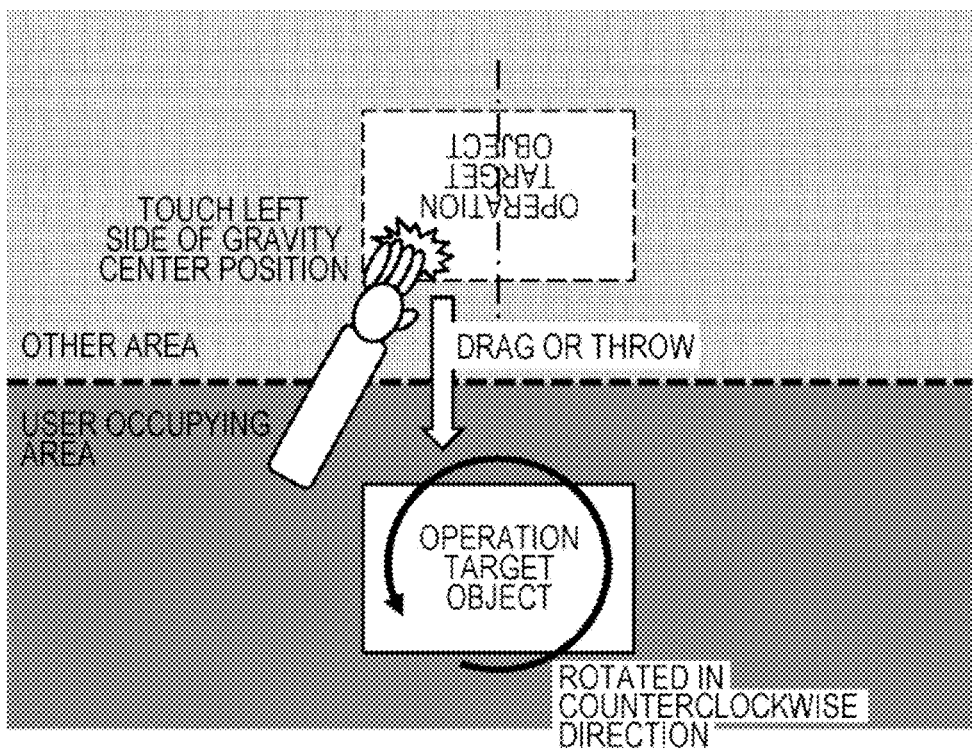
FIG. 19 is a diagram showing a state in which the rotation direction is controlled in accordance with a position at which the user performs a touch operation on an operation target object.

As shown in FIGS. 18 and 19, it is possible to provide a natural operational feeling to the user by shifting the rotation directions of the operation target object with reference to the position of the center of gravity.

Next, description will be given of equipment coordination data exchange processing by the equipment coordination data exchanging unit 730.

As shown in FIG. 4, the information processing apparatus 100 can communicate with other devices such as a mobile terminal owned by a user through the communication unit 150. For example, data such as a video image, a stationary image, or text content as an entity of an operation target object is exchanged between the information processing apparatus 100 and the owned terminal in background in which the user is performing a touch operation on the screen or the user performs an action such as causing the owned terminal to approach the information processing apparatus 100.

Figure 20:
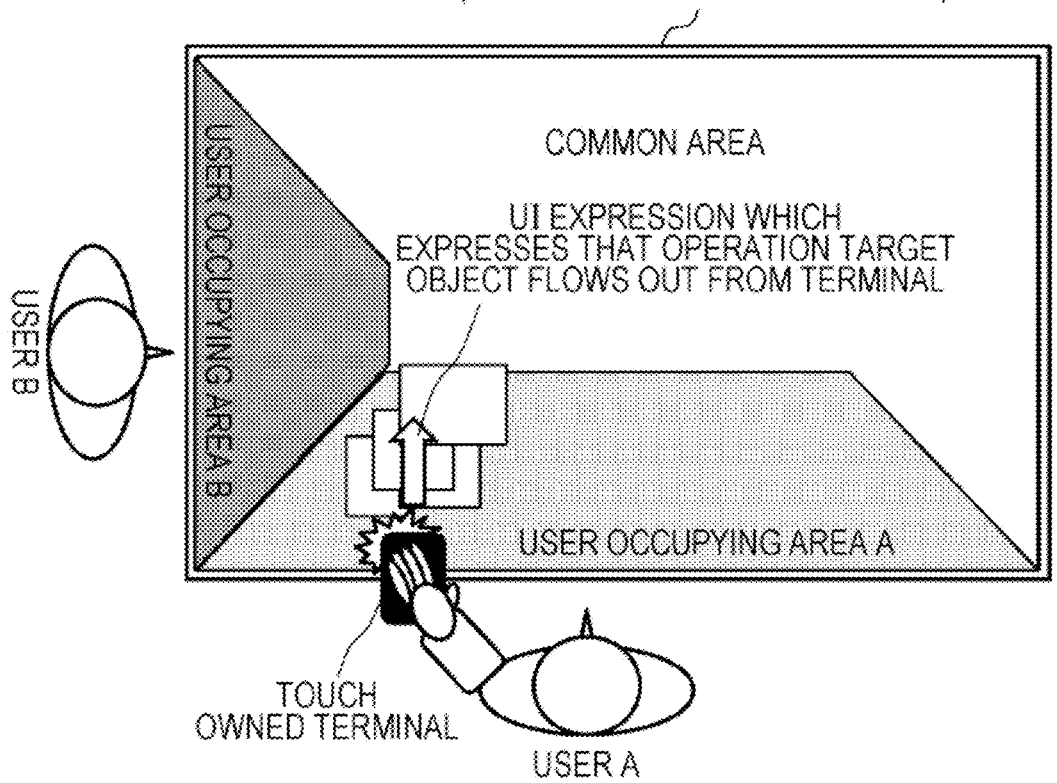
FIG. 20 is a diagram showing an example of an interaction for exchanging an operation target object between the information processing apparatus 100 and a terminal owned by a user.

FIG. 20 shows an example of an interaction in which an operation target object is given and received between the information processing apparatus 100 and the terminal owned by the user. In the example shown in the drawing, a UI expression in which an operation target object appears from the vicinity of the terminal and flows into the user occupying area A in response to the user A causing the terminal owned by themselves to approach the periphery of the user occupying area A allocated to the user themselves.

The information processing apparatus 100 can detect that the terminal owned by the user has approached the vicinity of the user occupying area A based on a signal analysis result of a detection signal by the very-short-range communication unit 513 and a recognition result of a user image captured by the camera unit 503. In addition, the equipment coordination data exchanging unit 730 may be designed to specify whether or not the user has data to be transmitted to the information processing apparatus 100 and what the data to be transmitted is, based on context between the user A and the information processing apparatus 100 (or communication between the user A and other users through the information processing apparatus 100). Then, when there is data to be transmitted, the equipment coordination data exchanging unit 730 exchange data such as a video image, a stationary image, or text content as an entity of the operation target object between the information processing apparatus 100 and the corresponding owned terminal in background of an action that the terminal owned by the user is made to approach the vicinity of the user occupying area A.

While the equipment coordination data exchanging unit 730 exchanges data with the terminal owned by the user in the background, the UI expression that the operation target object appears from the device owned by the user is performed on the screen of the display unit 603 by object optimal processing by the object optimal processing unit 720. FIG. 20 shows an example of UI expression that the operation target object flows from the terminal owned by the user A into the corresponding user occupying area A.

Figure 21:
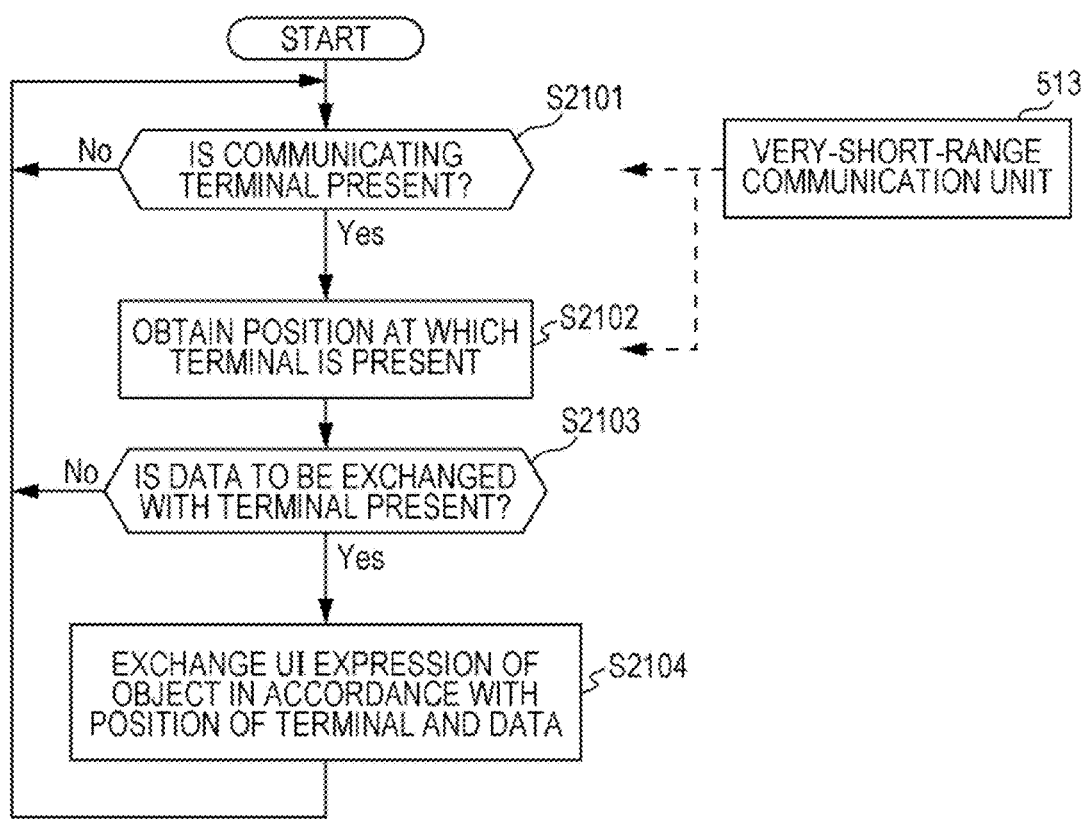
FIG. 21 is a flowchart showing a processing procedure for equipment coordination data exchange executed by an equipment coordination data exchanging unit 730.

FIG. 21 shows a processing procedure for equipment coordination data exchange executed by the device data exchanging unit 730 in the form of a flowchart. The processing by the equipment coordination data exchanging unit 730 is activated when a terminal owned by a certain user is made to approach the vicinity of their own user occupying area, based on a signal analysis result of a detection signal by the very-short-range communication unit 513.

The equipment coordination data exchanging unit 730 checks whether or not a communicating terminal owned by a user is present based on a signal analysis result of a detection signal by the very-short-range communication unit 513 (Step S2101).

When a communicating terminal owned by a user is present (Yes in Step S2101), the equipment coordination data exchanging unit 730 obtains a position where the terminal is present based on the signal analysis result of the detection signal by the very-short-range communication unit 513 (Step S2102).

Then, the equipment coordination data exchanging unit 730 checks whether or not there is data exchanged with the terminal owned by the user (Step S2103).

When there is data exchanged with the terminal owned by the user (Yes in Step S2103), the equipment coordination data exchanging unit 730 performs UI display (see FIG. 20) of the operation target object in accordance with the terminal position based on the exchange processing algorithm 731. In addition, the equipment coordination data exchanging unit 730 exchanges data as entity of the operation target object with the terminal in background of the UI display (Step S2104).

Figure 22:
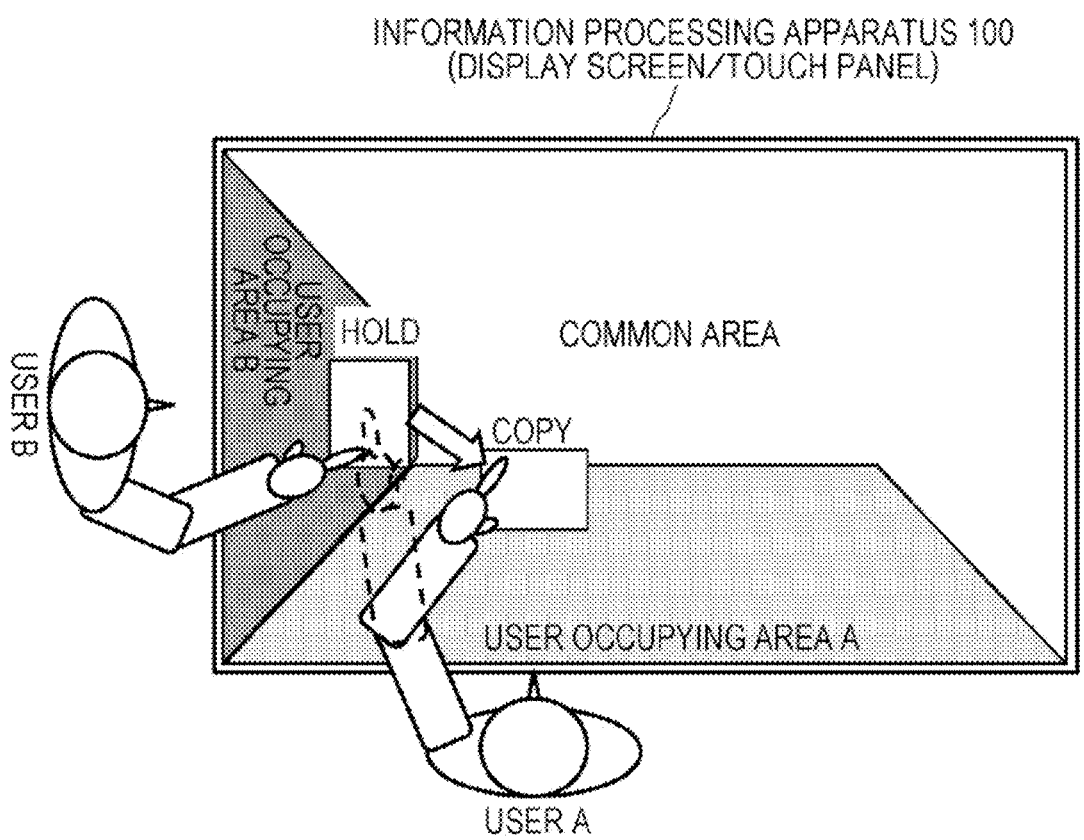
FIG. 22 is a diagram showing a state in which an operation target object is displaced between user occupying areas to copy the operation target object.

As shown in FIGS. 20 and 21, the operation target object obtained by the information processing apparatus 100 from the terminal owned by the user is arranged in a user occupying area for a corresponding user. Furthermore, when data communication is performed between users, an operation for displacing the operation target object may be performed between mutual user occupying areas. FIG. 22 shows a state in which an operation target object maintained by the user B in the user occupying area B is copied by the user A to their own user occupying area A. Alternatively, the operation target object may not be copied and may be divided.

When the operation target object copied on the screen is content such as a video image or a stationary image, other independent data is simply created. In addition, when the copied operation target object is a window of an application, another window of an application which can be commonly operated by the user who originally holds the operation target object and a user of a destination of the copying is created.

C. Optimal Selection of Input Means and Display GUI in Accordance with User Position The information processing apparatus 100 is provided with the distance sensor 507 and the proximity sensor 511 and can detect a distance from the main body of the information processing apparatus 100, namely the screen to a user while hung on the wall and used as shown in FIGS. 1 and 3, for example.

In addition, the information processing apparatus 100 is provided with the touch detection unit 509, the proximity sensor 511, the camera unit 503, and the remote control receiving unit 501 and can provide a plurality of input means such as touching the screen, proximity, gesture using a hand or the like, a remote controller, and an indirect operation depending on a user state to the user. The operation by each input means can be applied or cannot be applied in accordance with the distance from the main body of the information processing apparatus 100, namely the screen to the user. For example, a user within a range of cm or closer from the main body of the information processing apparatus 100 can reliably operate an operation target object by directly touching the screen. In a case of a user within a range of 2 m or closer from the main body of the information processing apparatus 100, it is possible to precisely capture motions of a face and a hand by performing recognition processing on an image captured by the camera unit 503 while the user is located too far to directly touch the screen, and therefore, a gesture input can be made. In a case of a user who is distant away from the main body of the information processing apparatus 100 by 2 m or more, a remote control signal reliably reaches while precision of image recognition is lowered, and therefore, a remote control operation can be made. Furthermore, GUI display with optimal frameworks of operation target objects to be displayed on the screen, optimal information density, and the like is also changed depending on the distance to the user.

According to the embodiment, the information processing apparatus 100 is designed such that one of the plurality of input means is automatically selected depending on the user position or the distance to the user and the GUI display is automatically selected or adjusted in accordance with the user position, which enhances user convenience.

Figure 23:
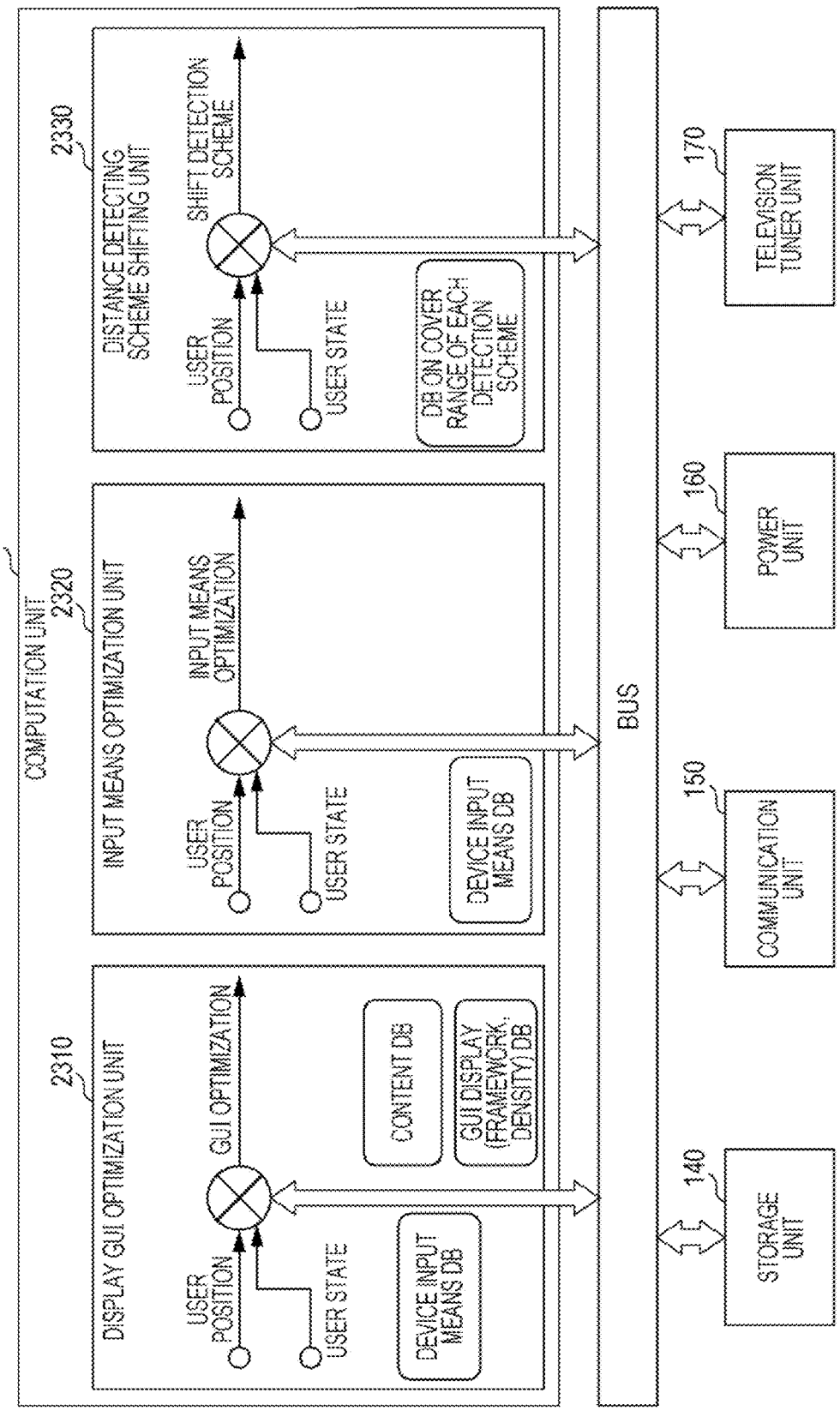
FIG. 23 is a diagram showing an internal configuration for the computation unit 120 performing optimization processing in accordance with a user distance.

FIG. 23 shows an internal configuration for the computation unit 120 performing optimization processing in accordance with a distance to a user. The computation unit 120 is provided with a display GUI optimization unit 2310, an input means optimization unit 2320, and a distance detecting scheme shifting unit 2330.

The display GUI optimization unit 2310 performs optimization processing for GUI display with optimal frameworks of operation target objects to be displayed on the screen of the display unit 603 and optimal information density in accordance with a user position and a user state.

Here, the user position is obtained based on a distance detecting scheme shifted by the distance detecting scheme shifting unit 2330. When the user position approach, personal authentication through face recognition of an image captured by the camera unit 503, proximity communication with the terminal owned by the user, or the like can be performed. In addition, the user state is specified based on image recognition of an image captured by the camera unit 503 or signal analysis by the distance sensor 507. The user states are roughly classified into two states, namely a state in which "there is a user (present)" and a state in which "there is no user (not present)". The state in which "there is a user" is broadly classified into two states, namely a state in which "the user is watching the television (the screen of the display unit 603) (watching)" and a state in which "the user is not watching the television (not watching)". Furthermore, the state in which "the user is watching the television" is broken down into two states, namely a state in which "the user is operating the television (operating)" and a state in which "the user is not operating the television (not operating)".

In determining the user state, the display GUI optimization unit 2310 refers to the device input means database in the storage unit 140. In addition, in optimizing the display GUI in accordance with the determined user position and the user state, GUI display (frameworks, density) database and content database in the storage unit 140 are referred to.

FIG. 24A is a diagram showing, in a table, GUI display optimization processing by a display GUI optimization unit 2310 in accordance with a user position and a user state. In addition, FIGS. 24B to 24E show screen shift of the information processing apparatus 100 in accordance with the user position and the user state.

In the state in which "there is no user", the display GUI optimization unit 2310 stops screen display by the display unit 603 and waits until the presence of a user is detected (see FIG. 24B).

In the state in which "there is a user" but "the user is not watching the television", the display GUI optimization unit 2310 selects "automatic zapping" as an optimal display GUI (see FIG. 24C). The automatic zapping is for randomly displaying various operation target objects to attract the interest of the user to encourage the user to view the television. The operation target object used in zapping includes a plurality of operation target objects such as network content obtained from the communication unit 150 through the Internet and e-mails and messages from other users as well as television broadcasting program content received by the television tuner unit 170 which the display GUI optimization unit 2310 selects based on the content database.

Figure 25A:
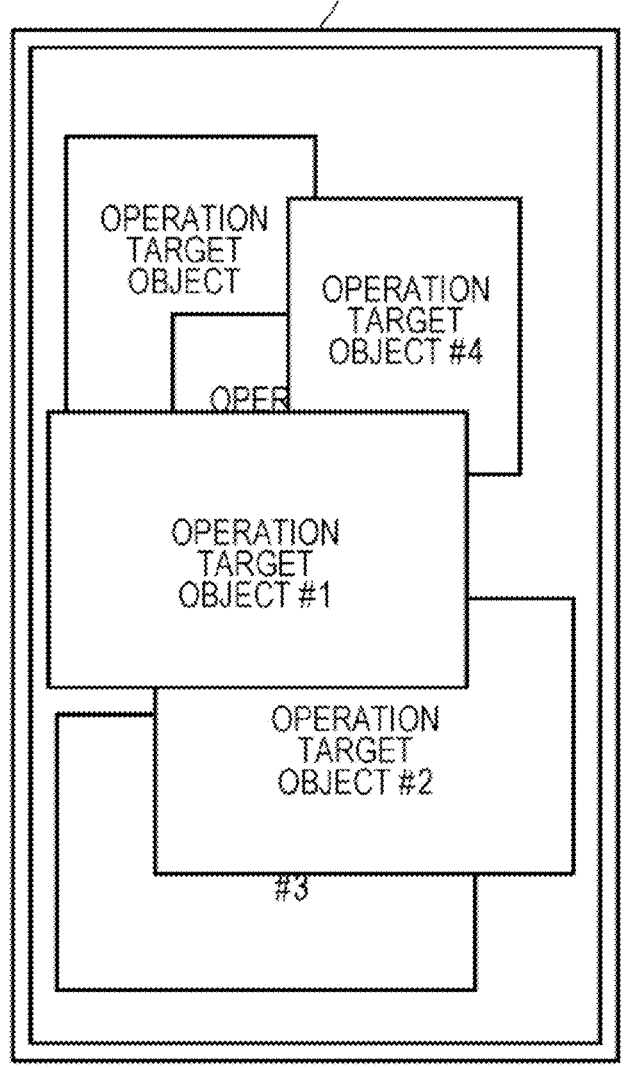
FIG. 25A is a diagram showing a display example of a screen for randomly displaying and automatically zapping various operation target objects.

FIG. 25A shows an example of a display GUI being automatically zapped. In addition, the display GUI optimization unit 2310 may momentarily change a position and a size (that is, a degree of exposure) of each operation target object displayed on the screen as shown in FIG. 25B to work on subconscious awareness of the user. In addition, when the user position approaches and personal authentication can be performed, the display GUI optimization unit 2310 may use information on the recognized person to sort out the operation target objects to be automatically zapped.

Even in the state in which "the user is watching the television" but "the user is not operating the television", the display GUI optimization unit 2310 selects the "automatic zapping" as an optimal display GUI (see FIG. 24D). Unlike the above, however, a plurality of operation target objects selected based on the content database are regularly arranged in a column format or the like as shown in FIG. 26 to make it easy to check the display contents of individual operation target objects. In addition, when the user position approaches and personal authentication can be performed, the display GUI optimization unit 2310 may use information on the recognized person to sort out operation target objects to be automatically zapped. In addition, the GUI optimization unit 2310 may control information density of the display GUI in accordance with the user position such that the information density of the GUI is suppressed when the user is present at a distant place and the information density of the GUI is enhanced when the user approaches.

Figure 27A:
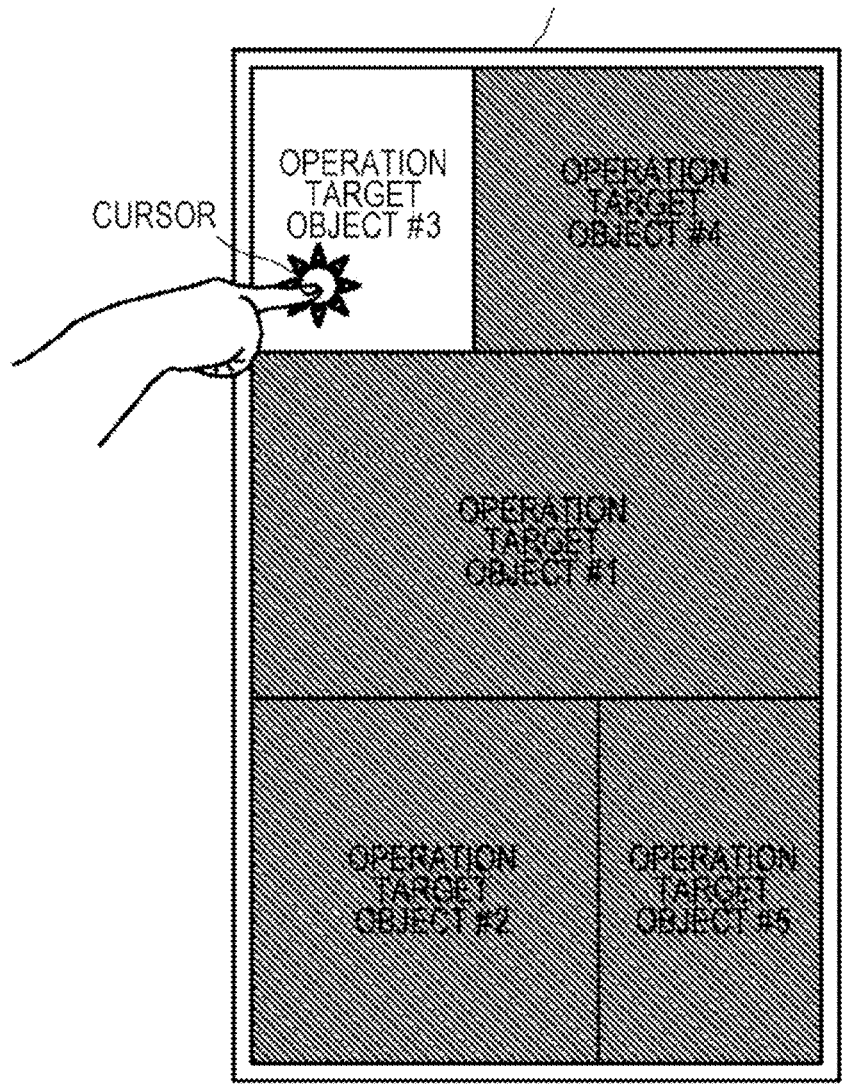
FIG. 27A is a diagram showing a screen display example in a state in which the user is performing an operation on the television.
Figure 27B:
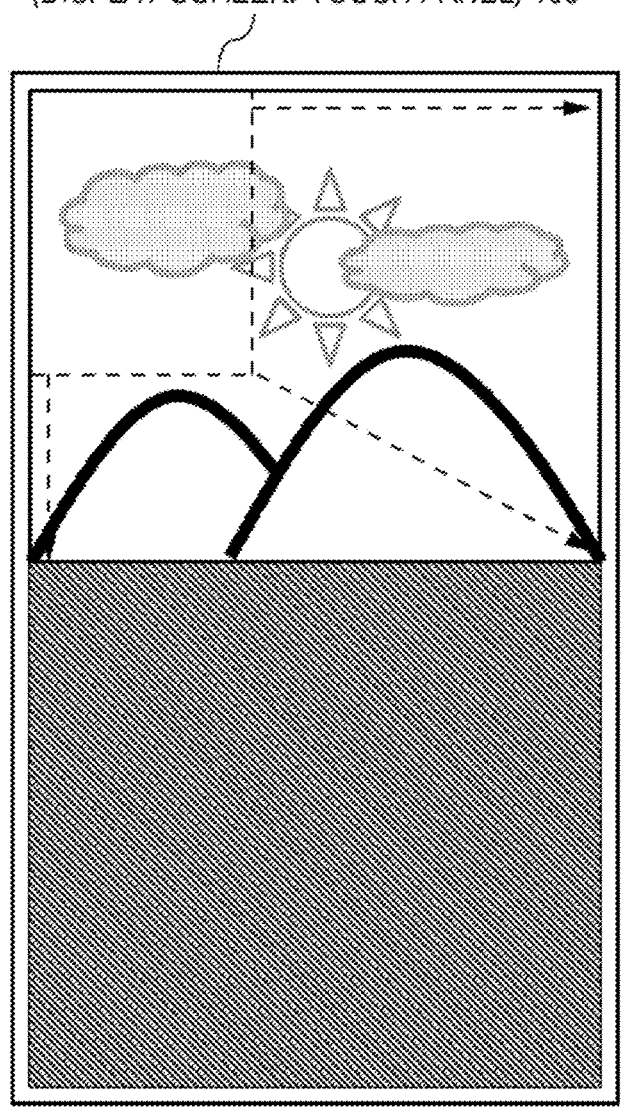
FIG. 27B is a diagram showing a screen display example in which the user is performing an operation on the television.

On the other hand, in the state in which "the user is watching the television" and "the user is operating the television", the user is operating the information processing apparatus 100 with the use of the input means optimized by the input means optimization unit 2320 (see FIG. 24E). The optimal input means in this state is transmission of a remote control signal to the remote control receiving unit 501, gesture to the camera unit 503, contact to the touch panel detected by the touch detection unit 509, audio input to the microphone 505, proximity input to the proximity sensor 511, and the like, for example. The display GUI optimization unit 2310 displays operation target objects in the column format as an optimal display GUI in accordance with a user input operation and makes it possible to perform scrolling or a selection operation of an operation target object in response to a user operation. A cursor is displayed at a position, which is designated by the input means, on the screen as shown in FIG. 27A. Since operation target objects on which the cursor is not placed can be considered that the user is not paying attention thereto, an illumination level may be lowered as shown by hatching in the drawing to express contract with respect to the focused operation target object (in the drawing, the cursor is placed on an operation target object #3 which the user touches with a tip of a finger). In addition, entire screen display (or enlarged display to an available maximum size) of the operation target object may be performed when the user selects the operation target object on which the cursor is placed as shown in FIG. 27B (in the drawing, the selected operation target object #3 is enlarged and displayed).

The input means optimization unit 2320 performs optimization of the input means with which the user performs an operation on the information processing apparatus 100 in accordance with the user position and the user state.

As described above, the user position can be obtained based on the distance detecting scheme shifted by the distance detecting scheme shifting unit 2330. When the user position approaches, personal authentication through face recognition of an image captured by the camera unit 503, proximity communication with the terminal owned by the user, or the like can be performed. In addition, the user state is specified by image recognition of an image captured by the camera unit 503 or signal analysis by the distance sensor 507.

The input means optimization unit 2320 refers to the device input means database in the storage unit 140 in determining the user state.

Figure 28:
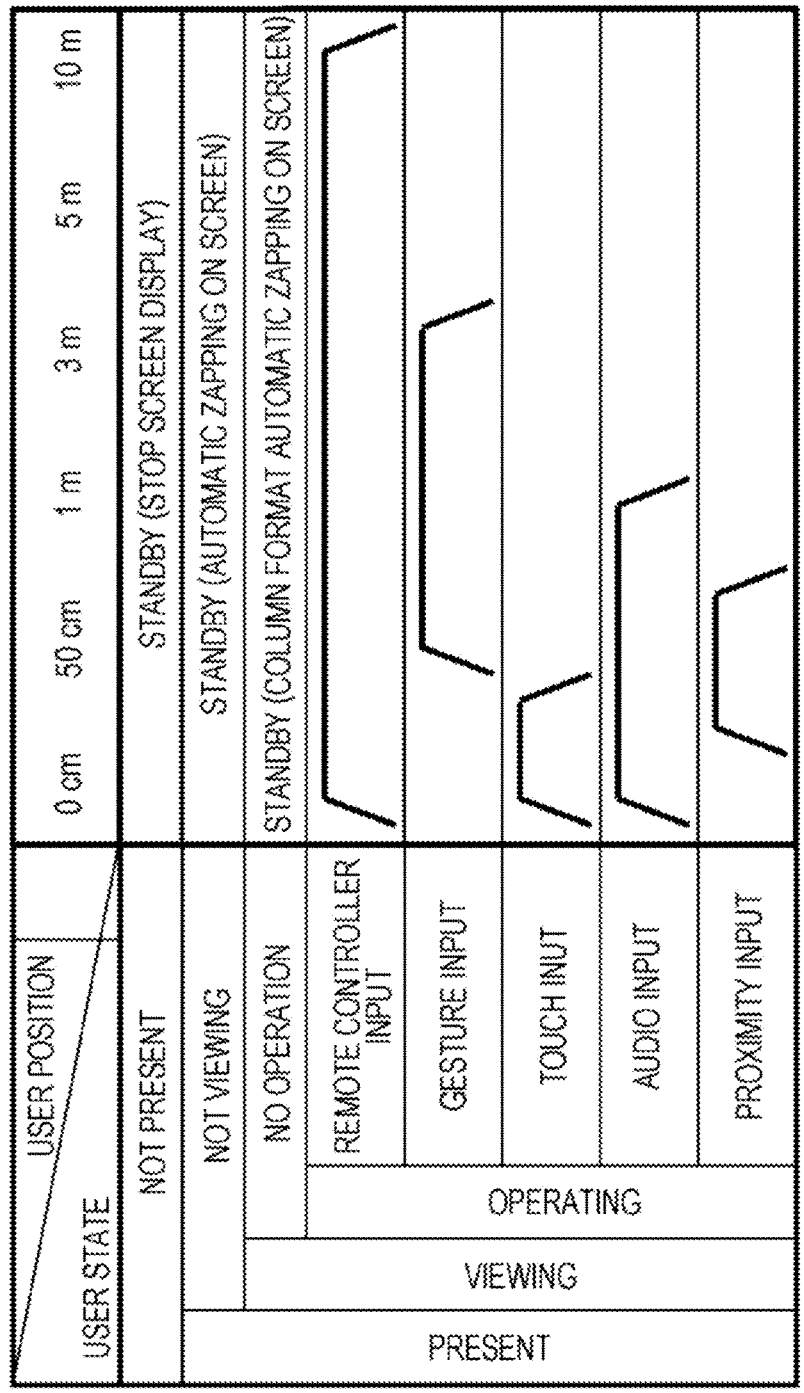
FIG. 28 is a diagram showing, in a table, input means optimization processing by an input means optimization unit 2320 in accordance with a user position and a user state.

FIG. 28 shows, in a table, input means optimization processing by the input means optimization unit 2320 in accordance with the user position and the user state.

In the state in which "there is no user", the state in which "there is a user" but "the user is not watching the television", and in the state in which "the user is watching the television" but "the user is not operating the television", the input means optimization unit 2320 waits until a user operation is started.

Then, in the state in which "the user is watching the television" and also "the user is operating the television", the input means optimization unit 2320 optimizes each input means mainly in accordance with the user position. The input means includes a remote control input to the remote control receiving unit 501, a gesture input to the camera unit 503, a touch input detected by the touch detection unit 509, an audio input to the microphone 505, a proximity input to the proximity sensor 511, and the like.

The remote control receiving unit 501 activates all user positions (that is, nearly all the time) and waits for receiving the remote control signal.

Recognition precision of an image captured by the camera unit 503 is gradually lowered as the user is positioned at a further place. In addition, when the user excessively approaches, the figure of the user is easily deviated from a field of view of the camera unit 503. Thus, the input means optimization unit 2320 turns on the gesture input to the camera unit 503 within a range of the user position from several tens centimeters to several meters.

Touching the touch panel superimposed on the screen of the display unit 603 is limited to a range which a hand of the user can reach. Thus, the input means optimization unit 2320 turns on the touch input to the touch detection unit 509 within a range of the user position up to several tens of centimeters. In addition, the proximity sensor 511 can detect the user at several tens of centimeters even without touching. Accordingly, the input means optimization unit 2320 turns on the proximity input up to a user position which is further than the position for the touch input.

Recognition precision on the input audio to the microphone unit 505 is gradually lowered as the user is positioned at a further place. Thus, the input means optimization unit 2320 turns on the gesture input to the camera unit 503 within a range of the user position up to several meters.

The distance detecting scheme shifting unit 2330 performs processing for shifting a scheme, based on which the information processing apparatus 100 detects the distance to the user and the user position, in accordance with the user position.

The distance detecting scheme shifting unit 2330 refers to coverage database for each detection scheme in the storage unit 140 in determining the user state.

FIG. 29 shows, in a table, distance detection scheme shifting processing by the distance detecting scheme shifting unit 2330 in accordance with the user position.

The distance sensor 507 is configured by a simple low power consumption sensor element such as a PSD sensor, a pyroelectric sensor, or a simple camera. The distance detecting scheme shifting unit 2330 constantly turns on the distance sensor 507 to constantly monitor whether a user is present in a radium from 5 to 10 meters, for example, from the information processing apparatus 100.

When a monocular type is employed for the camera unit 503, the image recognition unit 504 performs user motion recognition, face recognition, human body recognition by background differencing. The distance detecting scheme shifting unit 2330 turns on a recognition (distance detection) function by the image recognition unit 504 within a range of the user position from 70 centimeters to 6 meters in which sufficient recognition prevision can be obtained based on a captured image.

In addition, when a two-lens type or an active type is employed for the camera unit 503, the image recognition unit 504 can have sufficient recognition precision from 60 centimeters to 5 meters, which is slightly closer, and the distance detecting scheme shifting unit 2330 turns on the recognition (distance detection) function by the image recognition unit 504 within the range of the user position.

In addition, when the user excessively approaches, the figure of the user is easily deviated from the field of view of the camera unit 503. Thus, the distance detecting scheme shifting unit 2330 may turn off the camera unit 503 and the image recognition unit 504 when the user excessively approaches.

Touching the touch panel superimposed on the screen of the display unit 603 is limited to a range which a hand of the user can reach. Thus, the distance detecting scheme shifting unit 2330 turns on the distance detecting function by the touch detection unit 509 within a range of the user position up to several tens of centimeters. In addition, the proximity sensor 511 can detect a user up to several tens of centimeters even without touching. Accordingly, the distance detecting scheme shifting unit 2330 turns on the distance detecting function by the proximity sensor 511 up to a user position which is further than the position for the touch input.

As a design argument of the information processing apparatus 100 provided with a plurality of distance detecting schemes, it is preferable to use a low power consumption device since a distance detecting scheme for detecting a distant place at several meters or over ten meters is for the purpose of checking for the presence of a user and should be constantly turned on. On the other hand, since a distance detecting scheme for detecting in a close distance within one meter significantly consumes power for recognition processing although it is possible to obtain high density information and have a recognition function such as face recognition and human body recognition, it is preferable to turn off the function at a distance at which sufficient recognition prevision cannot be obtained.

D. Real Size Display of Object in Accordance with Monitor Performance

Figure 30:
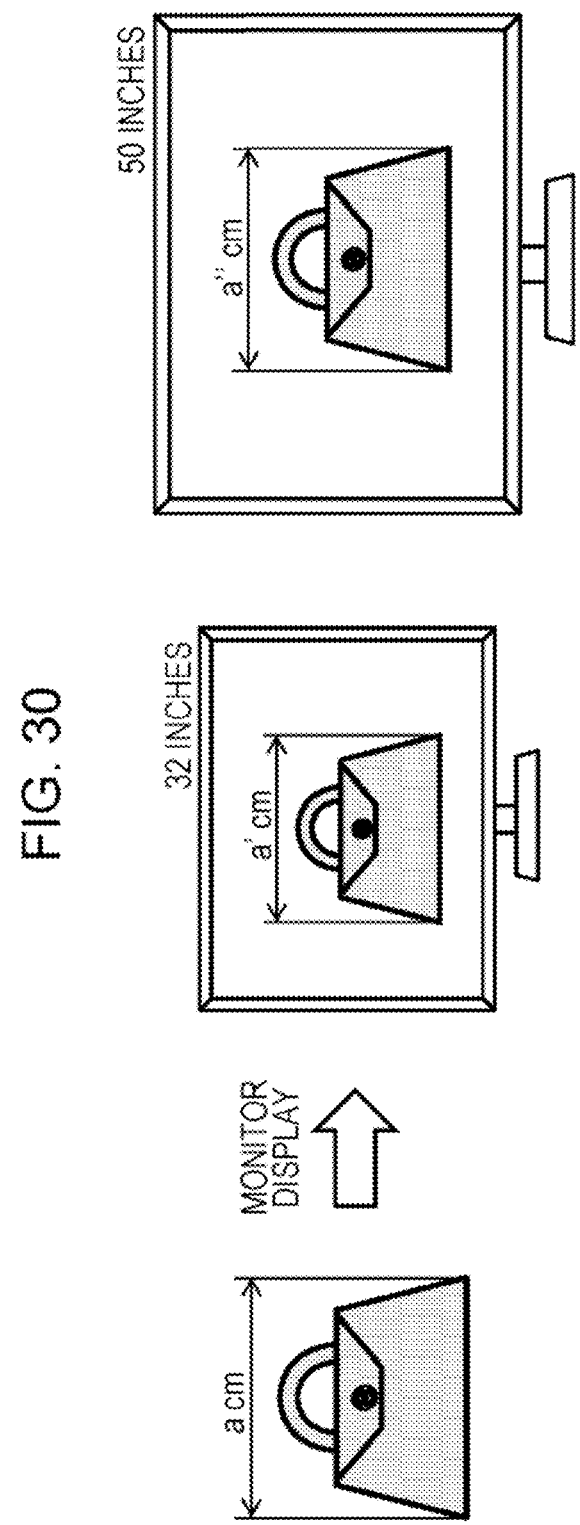
FIG. 30 is a diagram illustrating a problem in a conventional subject display system.

According to a conventional subject display system, an image of an actual object is displayed on the screen without considering real size information. For this reason, the size of the object displayed varies in accordance with a size or resolution (dpi) of the screen. For example, a horizontal width a' when a bag whose horizontal width is a centimeters is displayed on a 32-inch monitor and a horizontal width a" when the bag is displayed on a 50-inch monitor are different from each other (a≠a'≠a") (see FIG. 30).

In addition, images of a plurality of objects are simultaneously displayed on a same monitor screen, then magnitude relationship of the objects are not correctly displayed without considering the real size information of the objects. For example, when a bag has a horizontal width of a centimeters and a pouch has a horizontal width of b centimeters are simultaneously displayed on a same monitor screen, the bag is displayed at a size of a' centimeters while the pouch is displayed at a size of b' centimeters, and the mutual magnitude relationship is not correctly displayed (a:b≠a':b') (see FIG. 31).

For example, if a sample image of a product is not reconstructed in a real size when the product is purchased online, a user cannot accurately fit the product to the own figure, and there is a concern in that the user may erroneously purchase the product. In addition, if magnitude relationships of sample images are not correctly displayed when a user tries to simultaneously purchase a plurality of products on line and the sample images of the products are simultaneously displayed on the screen, the user cannot accurately combine and fit the products, and there is a concern in that the user may purchase the products in an improper combination.

On the other hand, the information processing apparatus 100 is designed to manage real size information of an object to be displayed and information in a size and resolution (pixel pitch) of the screen of the display unit 603 and always display an image of the object at a real size on the screen even if the sizes of the objects and the screen are changed.

Figure 32:
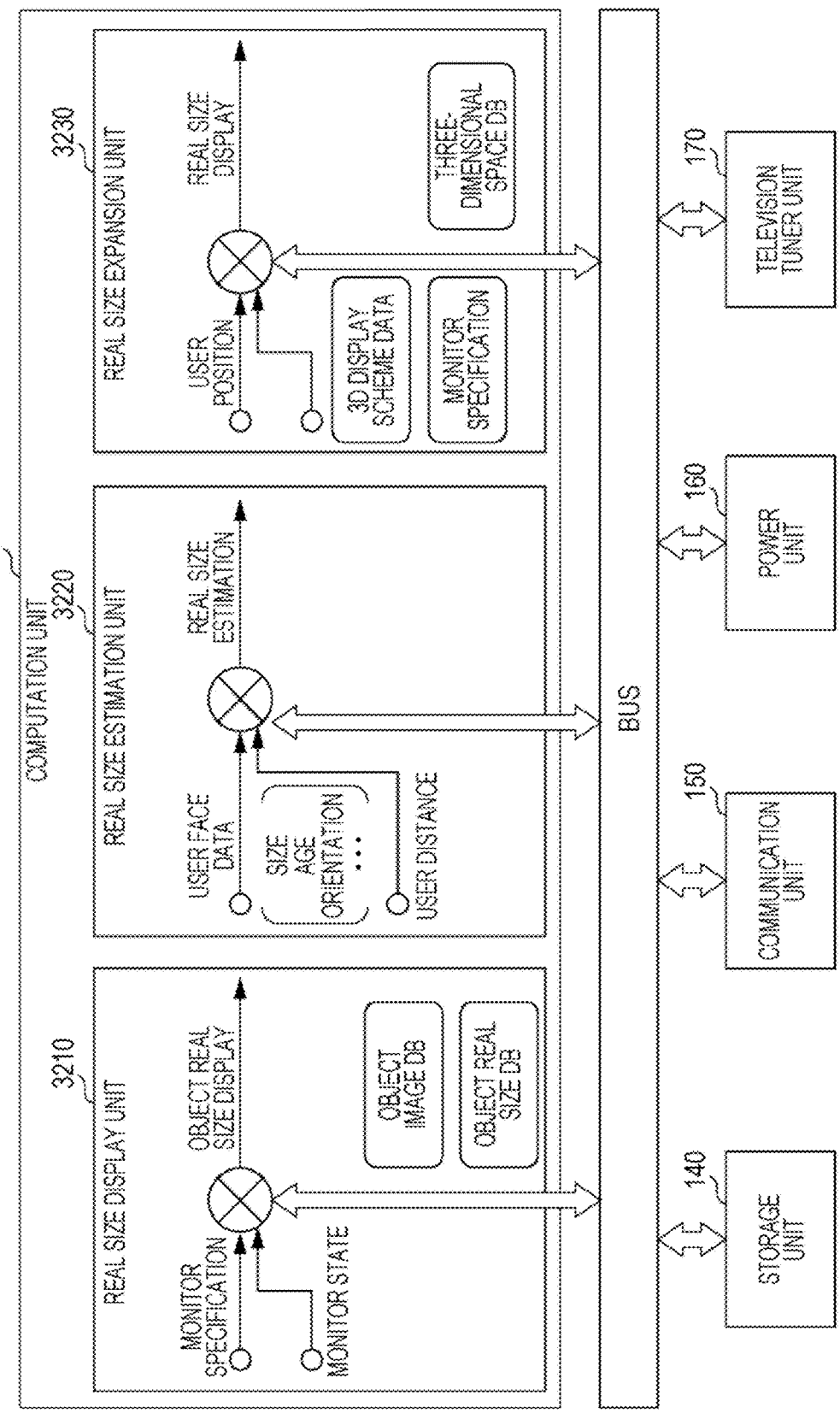
FIG. 32 is a diagram showing an internal configuration for the computation unit 120 performing object real size display processing in accordance with monitor performance.

FIG. 32 shows an internal configuration for the computation unit 120 performing object real size display processing in accordance with a monitor performance. The computation unit 120 is provided with a real size display unit 3210, a real size estimation unit 3220, and a real size expansion unit 3230. However, there may also be a case in which at least one functional block among the real size display unit 3210, the real size estimation unit 3220, and the real size expansion unit 3230 is implemented on the cloud server connected via the communication unit 150.

In simultaneously displaying images of a plurality of objects on a same monitor screen, the real size display unit 3210 constantly displays the images at real sizes in accordance with a size and resolution (pixel pitch) of the screen of the display unit 603 in consideration of the real size information of each object. In simultaneously displaying the images of the plurality of objects on the screen of the display unit 603, the real size display unit 3210 correctly displays the magnitude relationships of the objects.

The real size display unit 3210 reads monitor specifications such as a size and a resolution (pixel pitch) of the screen of the display unit 603 from the storage unit 140. In addition, the real size display unit 3210 obtains monitor states such as a direction and inclination of the screen of the display unit 603 from the rotation and attachment mechanism unit 180.

In addition, the real size display unit 3210 reads an image of an object to be displayed from an object image database in the storage unit 140 and reads real size information of the object from the object real size database. However, there may also be a case in which the object image database and the object real size database are on a database server connected through the communication unit 150.

Figure 33:
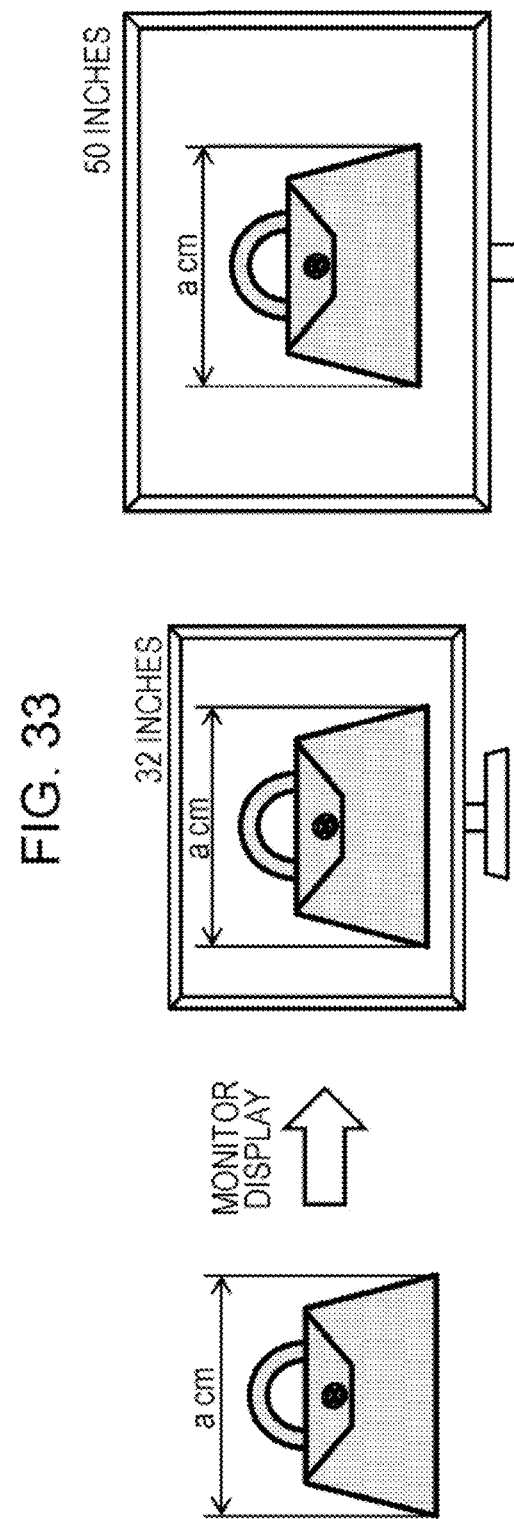
FIG. 33 is a diagram showing an example in which an image of a same object is displayed at an actual size on screens with different monitor specifications.

Then, the real size display unit 3210 performs conversion processing on the image of the object based on the monitor performance and the monitor state such that the object to be displayed is displayed at a real size on the screen of the display unit 603 (or mutual magnitude relationships of a plurality of objects are correct). That is, a=a'=a" is satisfied as shown in FIG. 33 even when an image of a same object is displayed on screens with different monitor specifications.

In addition, when the real size display unit 3210 simultaneously displays two objects with different real sizes on a same screen, a:b=a':b', that is, the mutual magnitude relationship is correctly displayed as shown in FIG. 34.

For example, when a user purchases a product on line through display of a sample image, the information processing apparatus 100 can implement real size display of an object and display a plurality of sample images in correct magnitude relationships as described above, and therefore, the user can accurately fit the product, and there is less concern in that the user may erroneously select the product.

An example in which real size display of an object image by the real size display unit 3210 is applied to an application for online shopping will be additionally described. In response to a user touching an image of a desired product on a display screen of a brochure, the image of the product is shifted to real size display (see FIG. 35). In addition, it is possible to change a direction of the object in the real size and display the object by rotating or performing posture conversion on the image displayed in the real size in response to the touch operation by the user (see FIG. 36).

In addition, the real size estimation unit 3220 performs processing for estimating a real size of an object, for which real size information cannot be obtained even by referring to the object real size database, such as a person imaged by the camera unit 503. For example, when an object for which a real size is estimated is a user's face, a real size of the user is estimated based on user face data such as the size of the user's face, age, and a direction which have been obtained by the image recognition unit 504 performing image recognition on the image captured by the camera unit 503 and a user position obtained by the distance detecting scheme shifted by the distance detecting scheme shifting unit 2330.

The estimated user real size information is feedback to the real size display unit 3210 and stored on the object image database, for example. Then, the real size information estimated from the user face data is used for real size display in accordance with the later monitor performance by the real size display unit 3210.

Figure 37A:
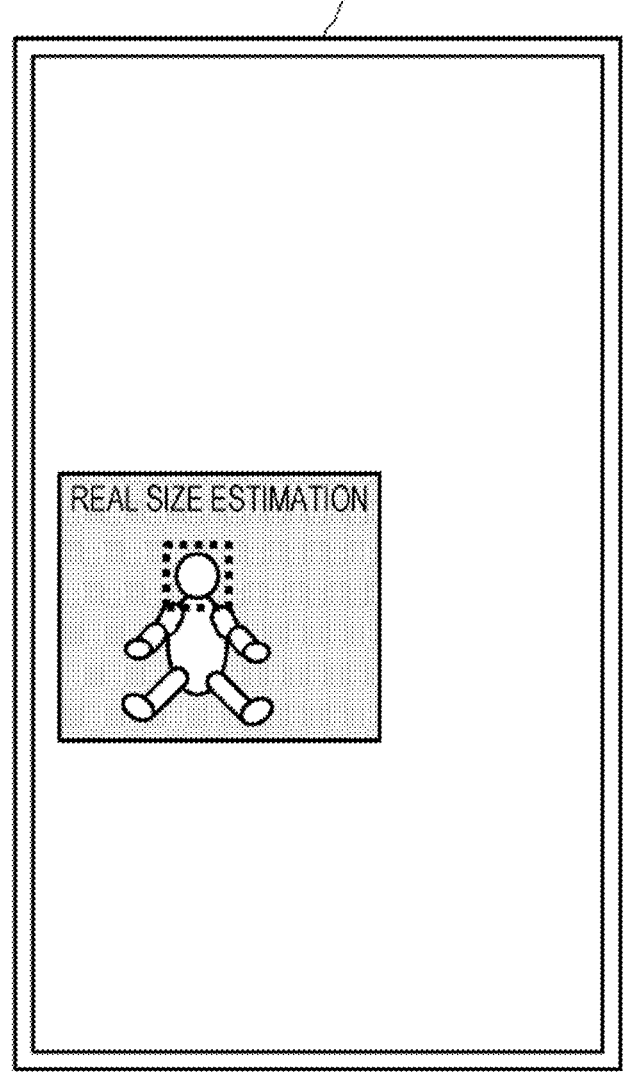
FIG. 37A is a diagram inviting a state in which target real size information is estimated.

For example, when an operation target object including a captured image of a target (baby) is displayed as shown in FIG. 37A, the real size estimation unit 3220 estimates the real size based on face data. Thereafter, the target is not enlarged to a size which exceeds the real size of the target as shown in FIG. 37B even if the user tries to enlarge and display the operation target object by a touch operation or the like. That is, the image of the baby is not enlarged to an unnatural size, and reality of the movie is maintained.

In addition, when network content and content captured by the camera unit 503 are displayed on the screen of the display unit 603 in a parallel manner or in a superimposed manner, it is possible to implement balanced parallel display or superimposed display by performing normalization processing on the movie of the content based on the estimated real sizes.

Furthermore, the real size expansion unit 3230 implements real size display of an object, which is implemented on the screen of the display unit 603 by the real size display unit 3210, even in a 3D direction, that is a depth direction.

In a case of performing 3D display based on a binocular scheme or a light beam reconstruction scheme, a desired effect can be achieved only at a viewing position assumed in generating the 3D movie. Based on an omnidirectional light beam reconstruction scheme, actual size display can be performed at an arbitrary position.

In addition, the real size expansion unit 3230 can achieve the same real size display at an arbitrary position even in the binocular scheme and the light beam reconstruction scheme only in the horizontal direction by detecting a position of an observing point of the user and correcting the 3D movie with respect to the position.

See Japanese Unexamined Patent Application Publication No. 2002-300602, Japanese Unexamined Patent Application Publication No. 2005-149127, and Japanese Unexamined Patent Application Publication No. 2005-142957, all of which have already been assigned to the applicant, for example.

E. Simultaneous Display of Image Group

There is a case in which movie content of a plurality of sources is simultaneously displayed on a same screen in a parallel manner or in a superimposed manner in a display system. For example, it is possible to exemplify (1) a case in which a plurality of users perform a video chat, (2) a case in which a movie of an instructor reproduced from a recording medium such as a DVD (or streaming-reproduced through a network) and a movie of a user themselves captured by the camera unit 503 are simultaneously displayed in a lesson of yoga or the like, and (3) a case in which a sample image of a product and a movie of a user themselves captured by the camera unit 503 are superimposed and displayed for fitting in online shopping.

Figure 38A:
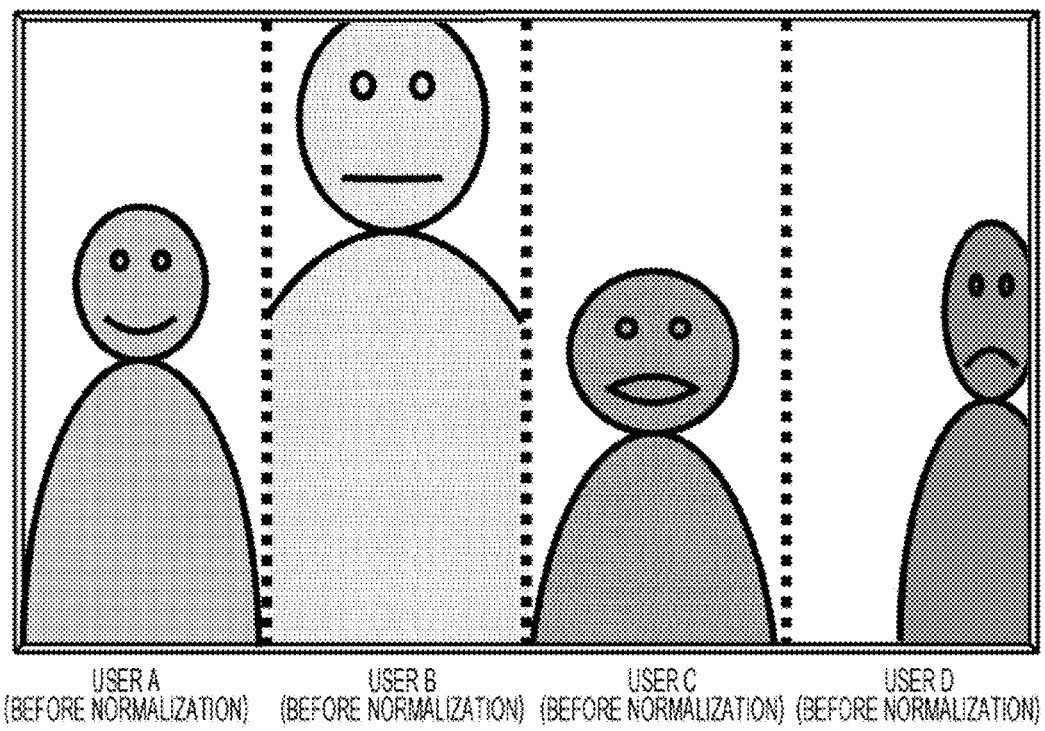
FIG. 38A is a diagram showing a state in which sizes and positions of faces of users who are performing a video chat are not adjusted.
Figure 39A:
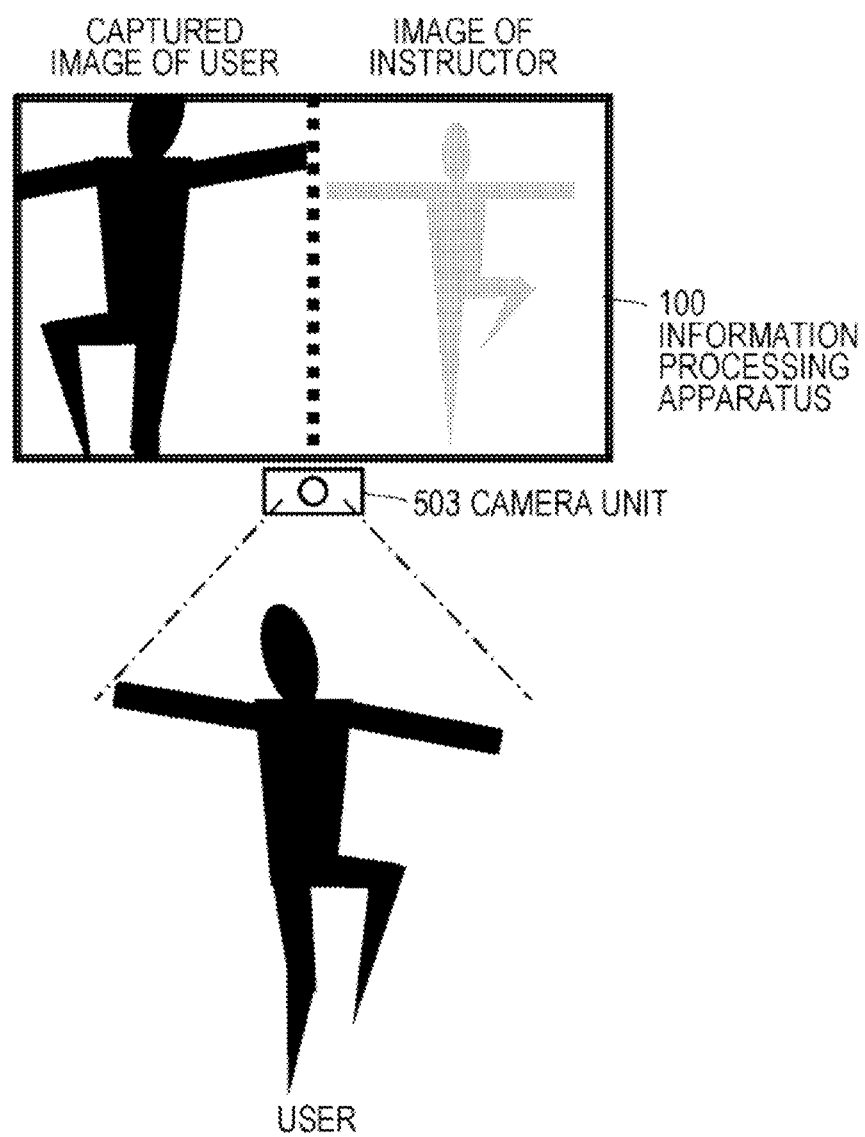
FIG. 39A is a diagram showing a state in which sizes and positions of figures of a user and an instructor which are displayed on the screen in a parallel manner are not adjusted.

In any of the above cases (1) to (3), the user cannot appropriately use the displayed movie if a magnitude relationship of the simultaneously displayed images is not correctly displayed. For example, if sizes and the positions of the users who perform a video chat are not adjusted (FIG. 38A), face-to-face contact with the counterpart of the chat is degraded, and the users cannot enjoy the conversation. In addition, when sizes and positions of the figures of the user and the instructor are not adjusted (FIG. 39A), it is difficult for the user to find a difference between their own motion and motion of the instructor, and the user cannot know a point to be modified or improved and cannot attain sufficient progress in the lesson. In addition, if the sample image of the product is not superimposed on an appropriate position in a correct magnitude relationship with the movie of the user themselves who hold a pose of picking up the product with a hand, it is difficult for the user to determine whether the product suits the user themselves, and the user cannot accurately perform fitting (FIG. 40A).

On the other hand, the information processing apparatus 100 according to the embodiment is designed to normalize images with the use of information on a scale of an image, a corresponding area, and the like and display the images in a parallel manner or in a superimposed manner when movie content of a plurality of sources is arranged in parallel or superimposed. In the normalization, image retouch including digital zooming processing on digital image data such as a stationary image or a video image is performed. In addition, when one of the images arranged in parallel or superimposed is an image captured by the camera unit 503, optical control for panning, tilting, zooming, and the like are performed on the actual camera.

It is possible to simply implement the image normalization processing with the use of information on a size of a face obtained by face recognition, age, a direction, and the like and information on a body shape and a size obtained by person recognition. In addition, mirroring and rotation processing are automatically performed on one of the images to easily find a correspondence relationship with the other image in displaying a plurality of images in a parallel manner or in a superimposed manner.

Figure 38B:
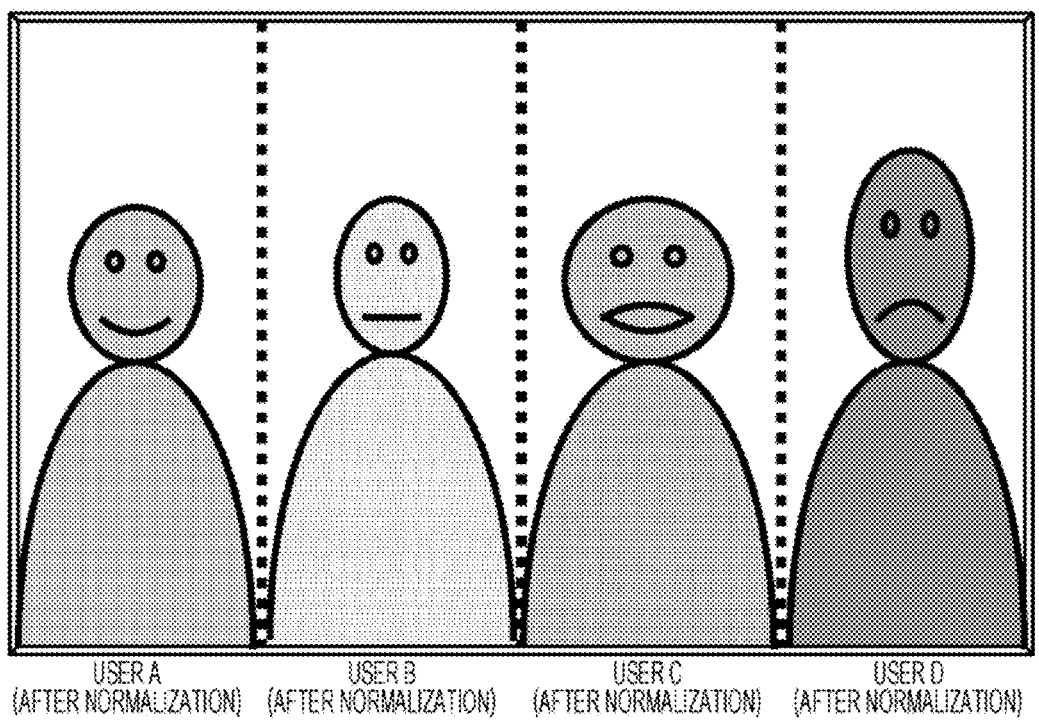
FIG. 38B is a diagram showing a state in which the sizes and the positions of the faces of the users who are performing video chatting are adjusted by normalization processing among a plurality of images.
Figure 39C:
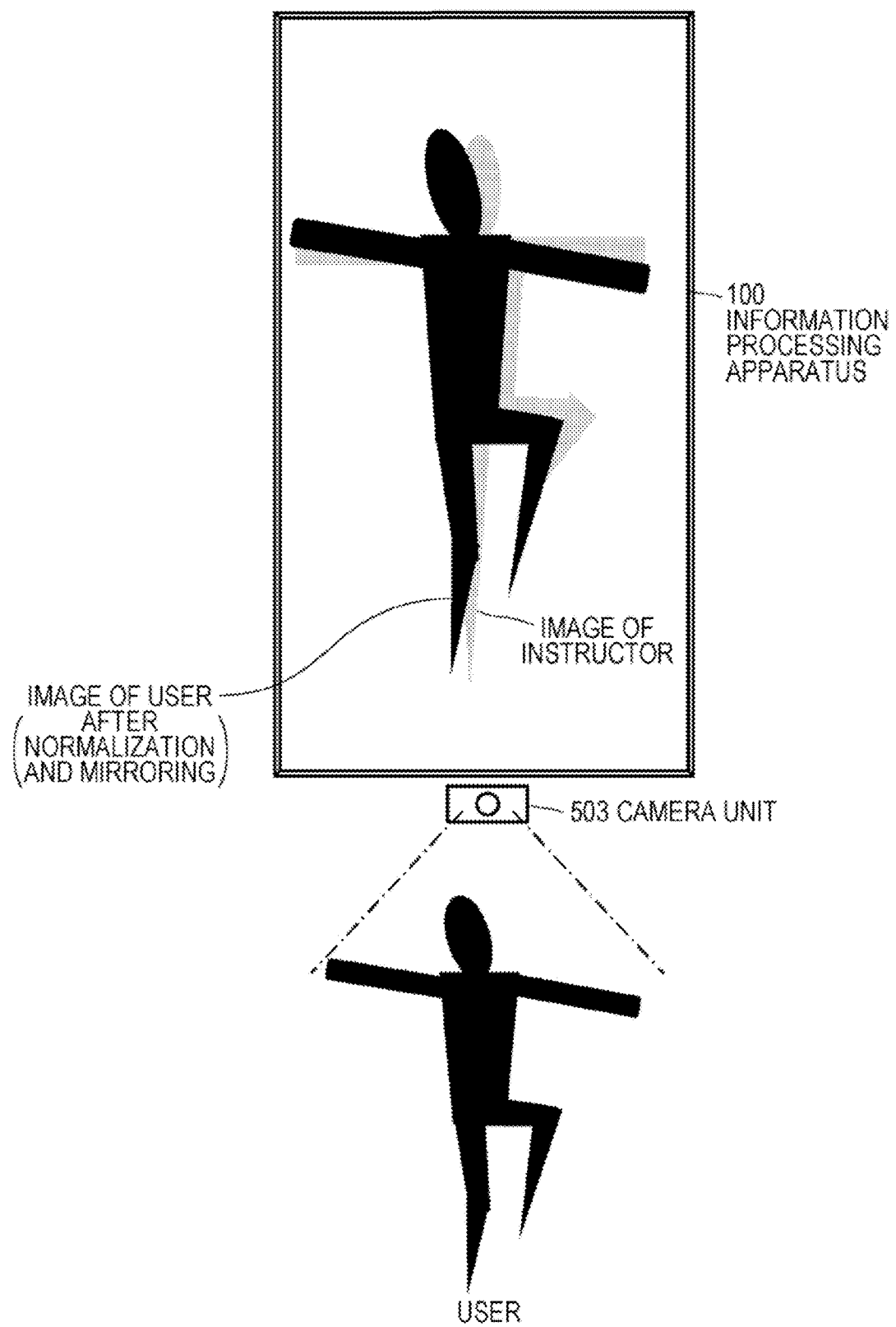
FIG. 39C is a diagram showing a state in which the figures of the user and the instructor which have been normalized by the normalization processing among the plurality of images are displayed in a superimposed manner.
Figure 40B:
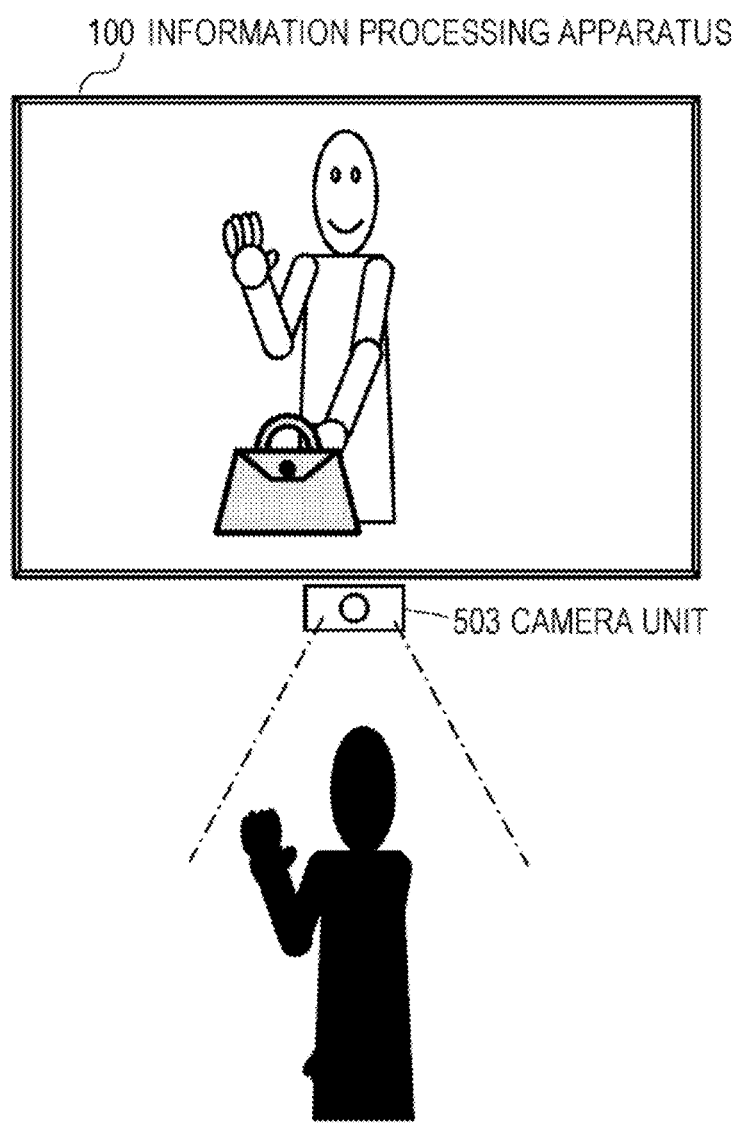
FIG. 40B is a diagram showing a state in which the product sample image is displayed in a superimposed manner at the appropriate position in the correct relationship with the movie of the user themselves by normalization processing among a plurality of images.

FIG. 38B shows a state in which sizes and positions of faces of the users performing video chatting are adjusted by normalization processing among the plurality of images. In addition, FIG. 39B shows a state in which the sizes and the positions of the figures of the user and the instructor displayed in parallel on the screen are adjusted by normalization processing among a plurality of images. In addition, FIG. 40B shows a state in which the sample image of the product is superimposed and displayed at an appropriate position in a correct magnitude relationship with the movie of the user themselves who holds a pose of picking up the product by normalization processing among a plurality of images. In addition, not only the magnitude relationship normalization processing but also mirroring is performed in FIGS. 39B and 40B in order that the user can easily correct their own posture from the image captured by the camera unit 503. In addition, there is also a case in which rotation processing is performed as necessary. In addition, if the normalization processing can be performed on the figures of the user and the instructor, the figures can be also displayed in the superimposed manner as shown in FIG. 39C instead of being displayed in the parallel manner as shown in FIG. 39B, and the user can further easily and visually recognize a difference between their own posture and the posture of the instructor.

FIG. 41 shows an internal configuration for the computation unit 120 performing image normalization processing. The computation unit 120 is provided with an inter-image normalization processing unit 4110, a face normalization processing unit 4120, and a real size expansion unit 4130. However, there may also be a case in which at least one functional block among the inter-image normalization processing unit 4110, the face normalization processing unit 4120, and the real size expansion unit 4130 is implemented on the cloud server connected through the communication unit 150.

The inter-image normalization processing unit 4110 performs normalization processing such that a magnitude relationship between a face image of a user and other objects is correctly displayed among a plurality of images.

The inter-image normalization processing unit 4110 inputs a user image captured by the camera unit 503 through the input interface unifying unit 520. On this occasion, camera information for panning, tilting, zooming, and the like of the camera unit 503 in imaging the user is also obtained. In addition, the inter-image normalization processing unit 4110 obtains an image of another object to be displayed with the user image in a parallel manner or in a superimposed manner and obtains a pattern in which the user image and the image of another object are arranged in parallel or superimposed from image database. The image database is present in the storage unit 140 in some cases and is present on the database server which is accessed through the communication unit 150 in other cases.

Then, the inter-image normalization processing unit 4110 performs image retouching such as enlargement, rotation, and mirroring on the user image based on a normalization algorithm such that a magnitude relationship with other objects and a posture become correct, and generates camera control information for controlling panning, tilting, zooming, and the like of the camera unit 503 so as to appropriately capture the user image. By the processing of the inter-image normalization processing unit 4110, the user image is displayed so as to maintain a correct magnitude relationship with the images of other objects as shown in FIG. 40B, for example.

The face normalization processing unit 4120 performs normalization processing such that a user face image captured by the camera unit 503 is correctly displayed so as to maintain a magnitude relationship with a face image in other operation target objects (for example, a face of an instructor in an image reproduced from a recording medium or a face of a counterpart user in a video chat).

The face normalization processing unit 4120 inputs a user image captured by the camera unit 503 through the input interface unifying unit 520. On this occasion, camera information on panning, tilting, zooming, and the like of the camera unit 503 in imaging the user is also obtained. In addition, the face normalization processing unit 4120 obtains face images in other operation target objects, which is to be displayed with the captured user image in a parallel manner or in a superimposed manner, through the storage unit 140 or the communication unit 150.

Then, the face normalization processing unit 4120 performs image retouching such as enlargement, rotation, and mirroring on the user image such that a magnitude relationship of mutual face images become correct, and generates camera control information for controlling panning, tilting, zooming, and the like of the camera unit 503 so as to appropriately capture the user image. By the processing of the face normalization processing unit 4120, the user image is displayed so as to maintain a correct magnitude relationship with other face images as shown in FIGS. 38B, 39B, and 39C, for example.

Furthermore, the real size expansion unit 4130 implements parallel or superimposed display of a plurality of images, which is implemented on the screen of the display unit 603 by the inter-image normalization processing unit 4110 or the inter-image normalization processing unit 4110, even in a 3D direction, namely a depth direction. In addition, in a case of performing 3D display based on a binocular scheme or a light beam reconstruction scheme only in the horizontal direction, a desired effect can be achieved only at a viewing position assumed in generating a 3D movie. Based on an omnidirectional light beam reconstruction scheme, actual size display can be performed at an arbitrary position.

In addition, the real size expansion unit 4130 can achieve the same real size display at an arbitrary position even in the binocular scheme and the light beam reconstruction scheme only in the horizontal direction by detecting a position of an observing point of the user and correcting the 3D movie with respect to the position.

See Japanese Unexamined Patent Application Publication No. 2002-300602, Japanese Unexamined Patent Application Publication No. 2005-149127, and Japanese Unexamined Patent Application Publication No. 2005-142957, all of which have already been assigned to the applicant, for example.

F. Movie Content Display Method in Rotated Screen

As described above, the main body of the information processing apparatus 100 according to the embodiment is attached to a wall face in a rotatable and detachable manner by the rotation and attachment mechanism unit 180, for example. If a rotation operation is performed on the main body while the power of the information processing apparatus 100 is on, that is, while the display unit 603 displays operation target objects, rotation processing is performed on the operation target objects along with the rotation operation such that a user can observe the operation target object in correct postures.

Hereinafter, description will be given of a method for optimally adjusting a movie content display mode at an arbitrary rotation angle of the main body of the information processing apparatus 100 in a shifting process thereof.

As movie content display modes at arbitrary rotation angles of the screen in the shifting process thereof, it is possible to exemplify three modes, namely (1) a display mode for allowing the movie content to be completely on the screen at an arbitrary rotation angle, (2) a display mode for maximizing focused content in the movie content at each rotation angle, and (3) a display mode for rotating the movie content so as not to generate an invalid area.

Figure 42:
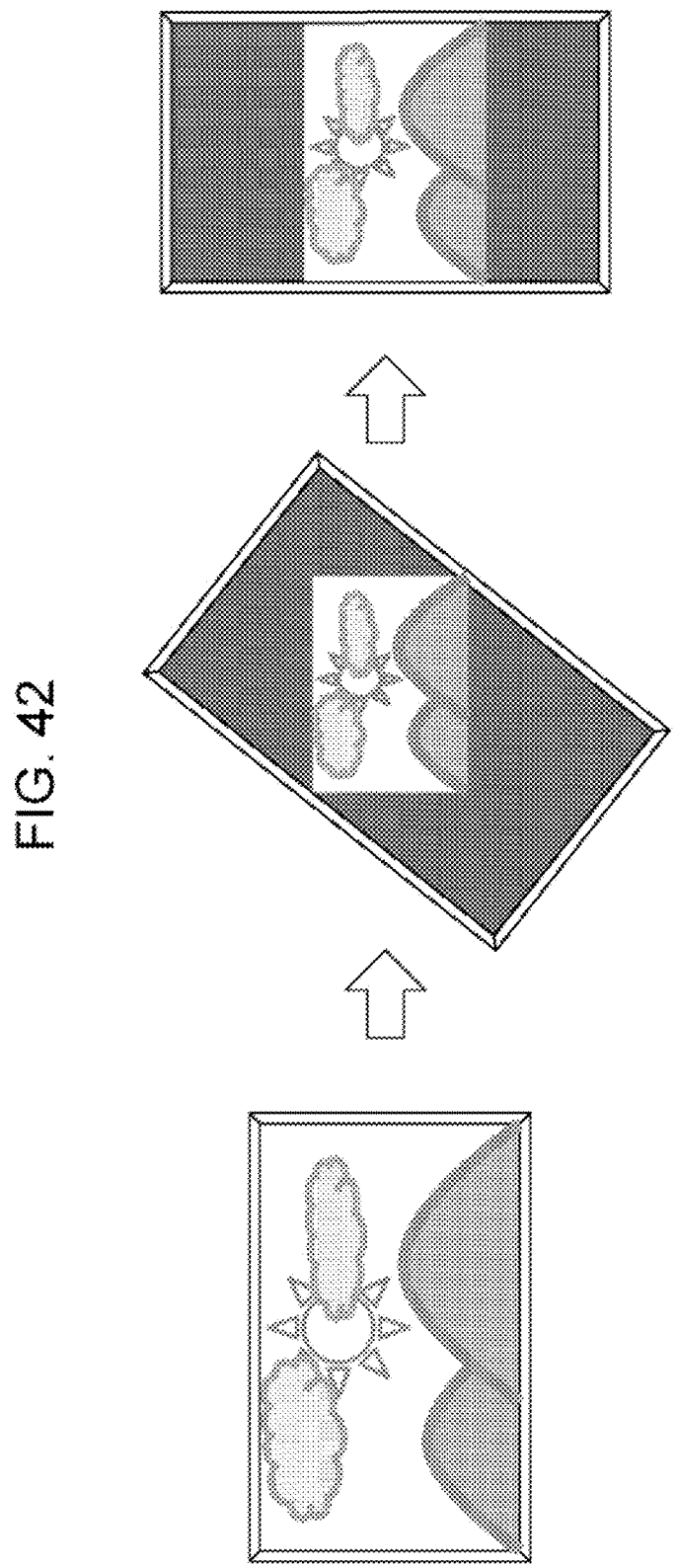
FIG. 42 is a diagram showing a display mode in which an entire area of movie content is displayed such that the movie content is completely in the screen at an arbitrary rotation angle.

FIG. 42 is a diagram showing the display mode in which an entire area of movie content is displayed such that the movie content is completely on the screen at an arbitrary rotation angle while the information processing apparatus 100 (screen) is rotated in the counterclockwise direction by 90°. In rotating the information processing apparatus 100 in the counterclockwise direction by 90° to longitudinally install the information processing apparatus 100 while laterally long movie content is displayed on the laterally installed screen as shown in the drawing, the movie content is downsized, and an invalid area shown in black on the screen appears. In addition, in the shifting process of the screen from the lateral installation to the longitudinal installation, the movie content is minimized.

If at least a part of the movie content is not on the screen, there is a problem in that the movie content as a copyrighted work loses identity. In the display mode as shown in FIG. 42, the identity as a copyrighted work is always secured at an arbitrary rotation angle in the shifting process thereof. That is, it can be said that the display mode suits protected content.

Figure 43:
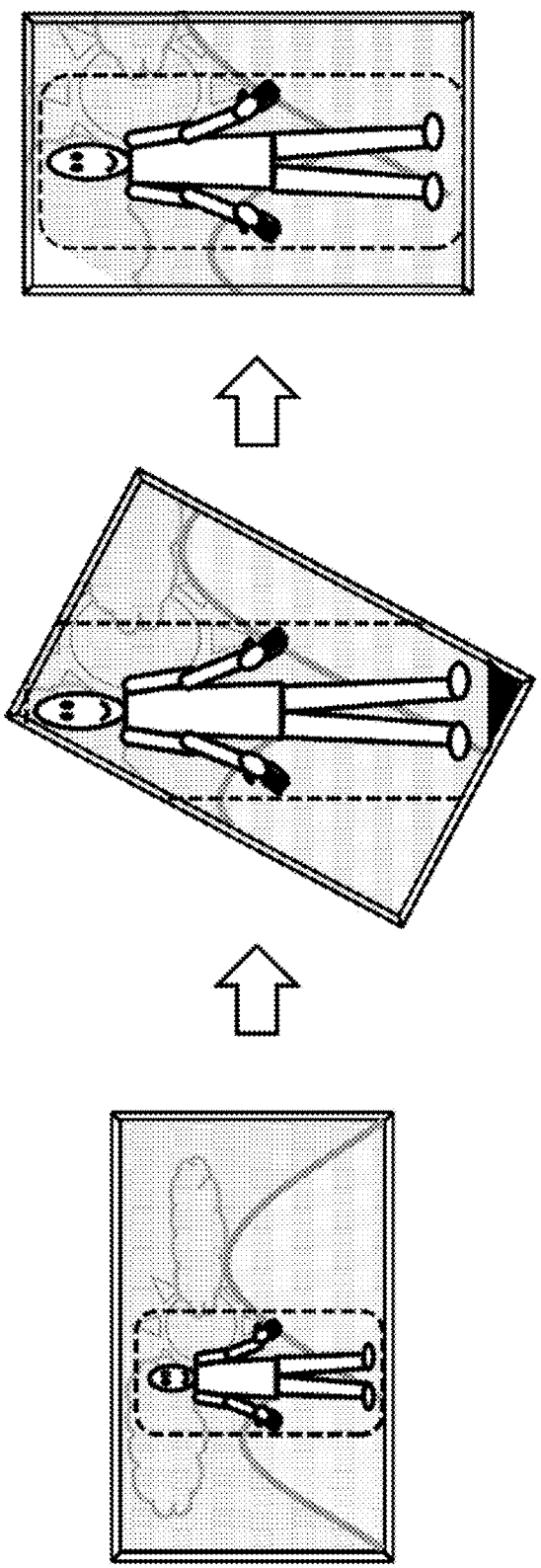
FIG. 43 is a diagram showing a display mode in which a focused area in the movie content is maximized at each rotation angle.

In addition, FIG. 43 is a diagram showing the display mode in which a focused area in the movie content is maximized at each rotation angle while the information processing apparatus 100 (screen) is rotated in the counterclockwise direction by 90°. In the drawing, an area including the target surrounded by a dotted line in the movie content is set as a focused area, and the focused area is maximized at each rotation angle. Since the focused area is vertically long, the movie content is enlarged when the lateral installation is changed into the longitudinal installation. In addition, the focused area is maximized in a direction of a diagonal of the screen in the shifting process from the lateral installation to the longitudinal installation. In addition, an invalid area shown in black appears on the screen in the shifting process from the lateral installation to the longitudinal installation.

As a display mode focusing on a focused area in the movie content, a modified example can also be considered in which the movie content is rotated while the size of the focused area is constantly maintained. Although the focused area appears to be smoothly rotated during the rotation of the screen, the invalid area is enlarged.

Figure 44:
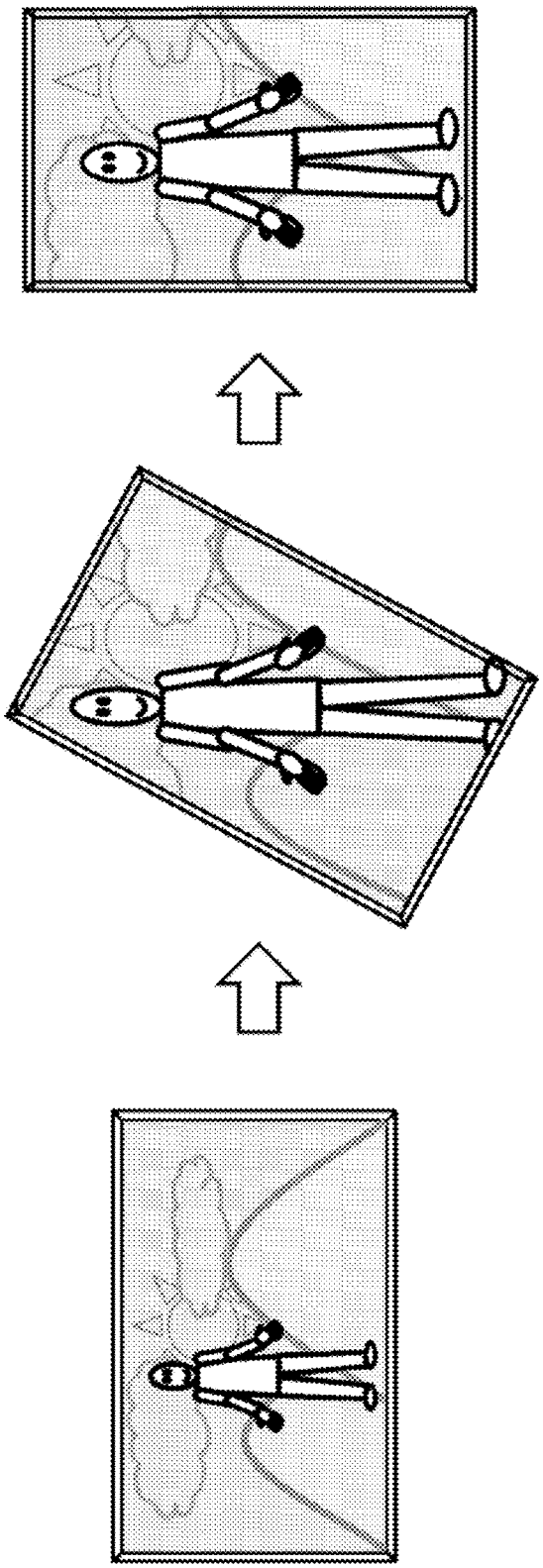
FIG. 44 is a diagram showing a display mode in which the movie content is rotated such that an invalid area does not appear.

In addition, FIG. 44 is a diagram showing the display mode in which the movie content is rotated such that an invalid area does not appear while the information processing apparatus 100 (screen) is rotated in the counterclockwise direction by 90°.

Figure 45:
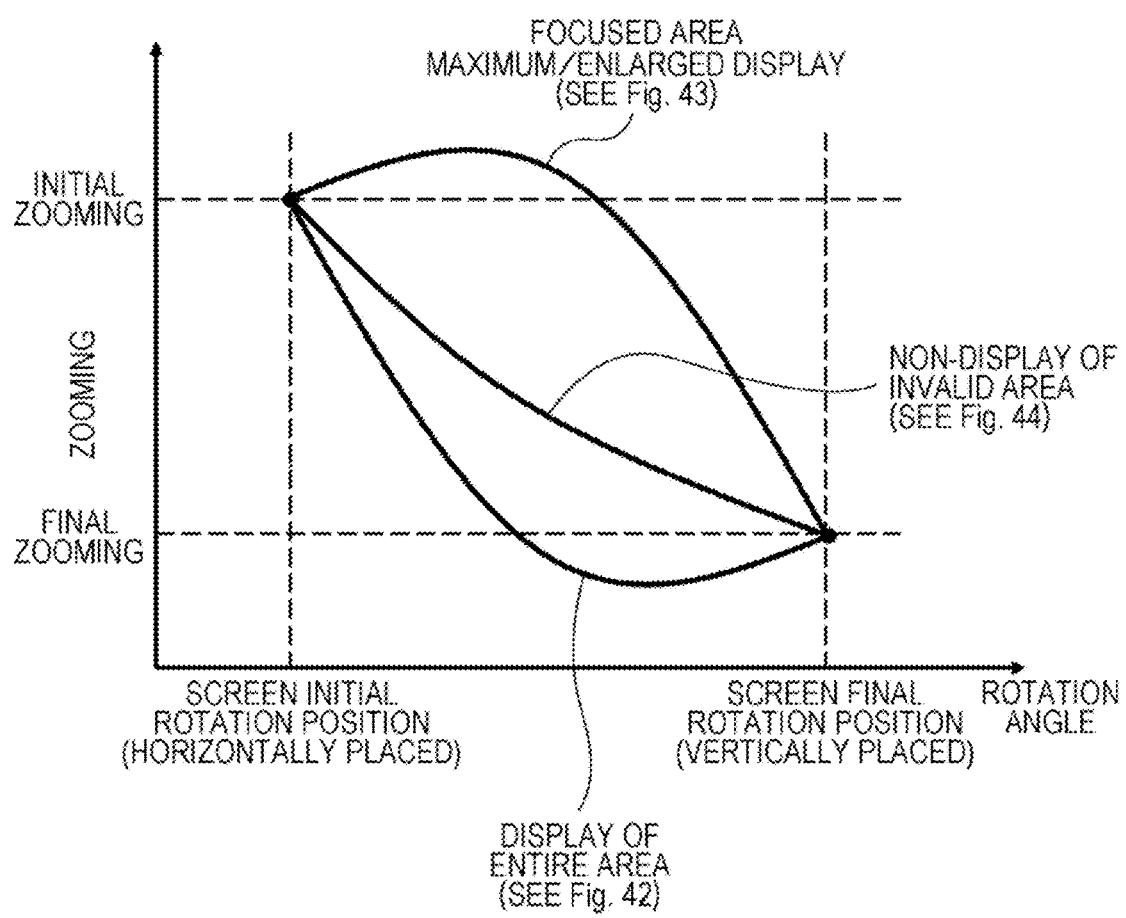
FIG. 45 is a diagram showing a relationship of a zooming rate of the movie content with respect to a rotation position in the display modes shown in FIGS. 42 to 44.

FIG. 45 shows a relationship of a zooming rate of the movie content with respect to a rotation position in the display modes shown in FIGS. 42 to 44. In the display mode for allowing the movie content to be completely in the screen at an arbitrary rotation angle shown in FIG. 42, a large invalid area is generated in the shifting process although the content can be protected. In addition, there is a concern in that feeling of strangeness is given to the user since the movie is downsized in the shifting process. In the display mode for maximizing a focused area in the movie content at each rotation angle shown in FIG. 43, an invalid area is generated in the shifting process although it is possible to more smoothly display the focused area in the shifting process during which the screen is rotated. In addition, in the display mode shown in FIG. 44, the movie content is significantly enlarged in the shifting process although an invalid area is not generated in the shifting process, and there is a concern in that unnatural impression is given to an observing user.

Figure 46:
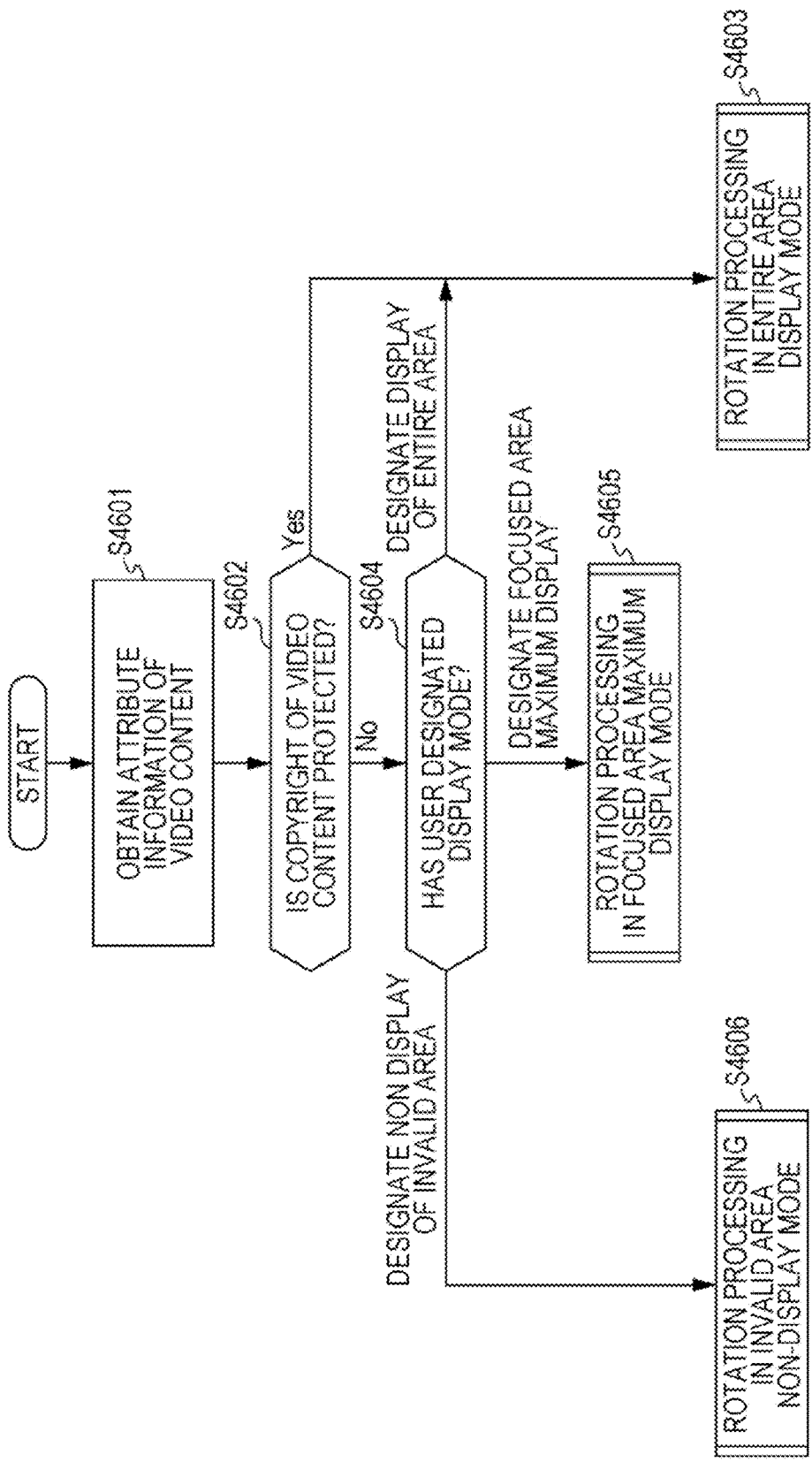
FIG. 46 is a flowchart showing a processing procedure for controlling a display mode of movie content by the computation unit 120 when the information processing apparatus 100 is rotated.

FIG. 46 shows a processing procedure for controlling a display mode of movie content by the computation unit 120 when the information processing apparatus 100 (the screen of the display unit 603) in the form of a flowchart. The processing procedure is activated in response to detection by the rotation and attachment mechanism unit 180, for example, that the main body of the information processing apparatus 100 is being rotated or detected by the triaxial sensor 515 a variation in the rotation position of the main body of the information processing apparatus 100.

In rotating the information processing apparatus 100 (the screen of the display unit 603), the computation unit 120 first obtains attribute information of the movie content being displayed on the screen (Step S4601). Then, it is checked whether the movie content being displayed on the screen is content protected by a copyright or the like (Step S4602).

Here, when the movie content being displayed on the screen is content protected by a copyright or the like (Yes in Step S4602), the computation unit 120 selects the display mode for displaying the entire area of the movie content such that the movie content is completely in the screen at an arbitrary rotation angle as shown in FIG. 42 (Step S4603).

In addition, when the movie content being displayed on the screen is not content protected by a copyright or the like (No in Step S4602), it is subsequently checked whether or not the display mode is a display mode designated by the user (Step S4604).

When the user has selected the display mode for displaying the entire area of the movie content, the processing proceeds to Step S4603. In addition, when the user has selected the display mode for maximizing and displaying a focused area, the processing proceeds to Step S4605. In addition, when the user has selected the display mode for not displaying an invalid area, the processing proceeds to Step S4606. Moreover, when the user has not selected any of the display modes, a display mode set as a default value is selected among the above three display modes.

Figure 47:
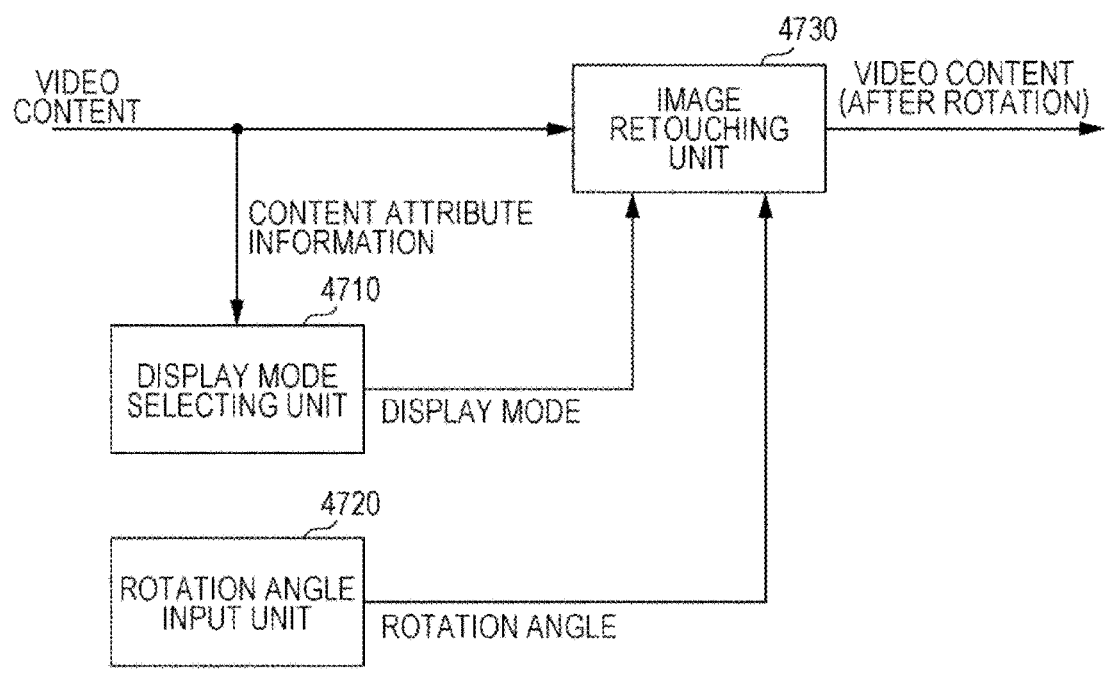
FIG. 47 is a diagram showing an internal configuration for the computation unit 120 performing processing for adjusting a display mode of movie content at an arbitrary rotation angle of a main body of the information processing apparatus 100 in a shifting process thereof.

FIG. 47 shows an internal configuration for the computation unit 120 performing processing for adjusting a display mode of movie content at an arbitrary rotation angle of the main body of the information processing apparatus 100 in the shifting process. The computation unit 120 is provided with a display mode selecting unit 4710, a rotation position input unit 4720, and an image retouching unit 4730 and adjusts received television broadcasts or movie content reproduced from a medium.

The display mode selecting unit 4710 selects a display mode for rotating the movie content at an arbitrary rotation angle of the main body of the information processing apparatus 100 in the shifting process based on the processing procedure shown in FIG. 46.

The rotation position input unit 4720 inputs a rotation position of the main body of the information processing apparatus 100 (or the screen of the display unit 602), which is obtained by the rotation and attachment mechanism unit 180 or the triaxial sensor 515, through the input interface unifying unit 520.

The image retouching unit 4730 performs image retouching based on the display mode selected by the display mode selecting unit 4710 such that the received television broadcasts or the movie content reproduced from the medium suits the screen of the display unit 603 which is inclined at a rotation angle input to the rotation position input unit 4720.

G. Technique Disclosed in this Specification

The technique disclosed in this specification can be configured as follows.

(1)
An information processing apparatus including:
a control unit to control processing on an operation object, wherein an operation right of the operation object is given to a user, displayed on a display unit based on detection of a user from at least one information signal input to the apparatus from outside of the apparatus.

(2)
The apparatus according to (1), wherein the control unit sets a user occupying area in a screen of the display unit for each user detected from the at least one information signal.

(3)
The apparatus according to (1), wherein the control unit sets a common area in a screen of the display unit usable by each user detected from the at least one information signal.

(4)
The apparatus according to (1), wherein the control unit sets (i) a user occupying area in a screen of the display unit for each user detected from the at least one information signal, and (ii) all area of the screen other than the user occupying area of the each user detected as a common area usable by the each user detected.

(5)
The apparatus according to (1) further comprising:
at least one proximity sensor disposed at each of four side edge portions of a screen of the display unit and at which the at least one information signal is input.

(6)
The apparatus according to (1), wherein the control unit automatically rotates the operation object, when present in a user occupying area set for the user in a screen of the display unit, to face the user.

(7)
The apparatus according to (6), wherein the operation object is automatically rotated in accordance with a predetermined timing.

(8)
The apparatus according to (1), wherein the control unit rotates the operation object in accordance with a position, at which the user has performed an operation with respect to a position of a center of gravity of the operation object, when the user displaces the operation object between set first and second areas in a screen of the display unit.

(9)
The apparatus according to (8), wherein the user displaces the operation object by dragging or throwing.

(10)
The apparatus according to (1) further comprising: a data exchange unit to exchange data with a terminal owned by the user.

(11)
The apparatus according to (10), wherein the control unit displays the operation object on a screen of the display unit, based on the data exchanged with the terminal.

(12)
The apparatus according to (1), wherein the control unit controls at least one of copying or dividing of the operation object, in response to an operation for displacing the operation object.

(13)
The apparatus according to (1) further comprising:
an input interface unit to which the at least one information signal from the outside is input.

(14)
The apparatus according to (1), wherein the control unit controls the processing on the operation object based on at least one of a screen touch detection result or data received from a terminal owned by the user.

(15)
The apparatus according to (1), wherein the control unit controls the processing on the operation object by selecting one of a plurality of input units of the apparatus.

(16)
The apparatus according to (15), wherein the selecting is in accordance with position of or distance to the user.

(17)
The apparatus according to (1), wherein the apparatus includes the display unit.

(18)
The apparatus according to (1), wherein the processing on the operation object is based on a state of the user.

(19)
An information processing method including:
controlling, by a processor, of processing on an operation object, wherein an operation right of the operation object is given to a user, displayed on a display unit based on detection of a user from at least one information signal input to an information processing apparatus from outside of the apparatus.

(20)
A non-transitory recording medium recorded with a program executable by a computer, the program including:
controlling processing on an operation object, wherein an operation right of the operation object is given to a user, displayed on a display unit based on detection of a user from at least one information signal input to an information processing apparatus from outside of the apparatus.

(101)
An information processing apparatus including: a display unit; a user detection unit which detects a user who is present in the periphery of the display unit; and a computation unit which performs processing on an operation target object displayed on the display unit in response to detection of the user by the user detection unit.

(102)
The information processing apparatus according to (101), wherein the user detection unit is provided with a proximity sensor which is disposed at each of four side edge portions of a screen of the display unit and detects a user who is present near each side edge.

(103)
The information processing apparatus according to (101), wherein the computation unit sets a user occupying area for each of the detected users and a common area which is commonly used by the users in the screen of the display unit in accordance with user arrangement detected by the user detection unit.

(104)
The information processing apparatus according to (103), wherein the computation unit displays one or more operation target objects as targets to be operated by the user on the screen of the display unit.
(105)
The information processing apparatus according to (104), wherein the computation unit optimizes the operation target object in a user occupying area.
(106)
The information processing apparatus according to (104), wherein the computation unit performs rotation processing such that the operation target object in a user occupying area is in a direction in which the operation target object faces a corresponding user.
(107)
The information processing apparatus according to (104), wherein the computation unit performs rotation processing such that an operation target object which has been displaced from the common area or another user occupying area to the user occupying area is in a direction in which the operation target object faces a corresponding user.
(108)
The information processing apparatus according to (107), wherein the computation unit controls a rotation direction in performing the rotation processing on the operation target object in accordance with a position, at which the user has performed an operation, with respect to a position of the center of gravity of the operation target object when the user drags and displaces the operation target object between areas.
(109)
The information processing apparatus according to (103), wherein the computation unit displays a detection indicator representing that a user has been newly detected when the user detection unit sets a user occupying area for the newly detected user in the screen of the display unit.
(110)
The information processing apparatus according to (104), further including a data exchange unit which exchange data with a terminal owned by a user.
(111)
The information processing apparatus according to (110), wherein the data exchange unit performs data exchange processing with the terminal owned by the user who has been detected by the user detection unit, and wherein the computation unit causes an operation target object corresponding to data received from the terminal owned by the user to appear in a corresponding occupying area.
(112)
The information processing apparatus according to (104), wherein the computation unit copies an operation target object to a user occupying area as a displacement destination or divides the operation target object for the user occupying area as the displacement destination in response to displacement of the operation target object between user occupying areas for users.
(113)
The information processing apparatus according to (112), wherein the computation unit displays a copy of the operation target object created as separate data in the user occupying area as the displacement destination.
(114)
The information processing apparatus according to (112), wherein the computation unit displays a copy of the operation target object as another window of an application, which can be commonly operated by the users, in the user occupying area as the displacement destination.
(115)
An information processing method including: a user detection step in which a user who is present in the periphery is detected; a computation step in which processing is performed on a displayed operation target object in response to detection of the user in the user detection step.
(116)
A computer program described in a computer readable format so as to cause a computer to function as: a display unit; a user detection unit which detects a user who is present in the periphery of the display unit; and a computation unit which performs processing on an operation target object displayed on the display unit in response to detection of the user by the user detection unit.
(201)
An information processing apparatus including: a display unit; a user position detection unit which detects a user position with respect to the display unit; a user state detection unit which detects a user state with respect to a display screen of the display unit; and a computation unit which controls a GUI to be displayed on the display unit in accordance with the user position detected by the user position detection unit and the user state detected by the user state detection unit.
(202)
The information processing apparatus according to (201), wherein the computation unit controls frameworks or information density of one or more operation target objects as targets to be operated by the user, which are displayed on the screen of the display unit, in accordance with the user position and the user state.
(203)
The information processing apparatus according to (201), wherein the computation unit controls a framework of an operation target object to be displayed on the screen in accordance with whether or not the user is in a state of viewing the screen of the display unit.
(204)
The information processing apparatus according to (201), wherein the computation unit controls information density of an operation target object to be displayed on the screen of the display unit in accordance with the user position.
(205)
The information processing apparatus according to (201), wherein the computation unit controls selection of an operation target object to be displayed on the screen of the display unit in accordance with whether or not the user is at a position where personal authentication can be performed.
(206)
The information processing apparatus according to (201), further including one or more input means for allowing the user to operate an operation target object being displayed on the screen of the display unit, wherein the computation unit controls a framework of the operation target object to be displayed on the screen in accordance with whether or not the user is in a state of operating the operation target object with the input means.
(207)
An information processing apparatus including: a display unit, one or more input means for allowing a user to operate an operation target object being displayed on a screen of the display unit; a user position detection unit which detects a user position with respect to the display unit; a user state detection unit which detects a user state with respect to a display screen of the display unit; and a computation unit which optimizes the input means in accordance with the user position detected by the user position detection unit and the user state detected by the user state detection unit.

(208)
The information processing apparatus according to (207), wherein the computation unit controls optimization of the input means in accordance with whether or not the user is in a state of viewing the screen of the display unit.

(209)
The information processing apparatus according to (207), wherein the computation unit optimizes the input means in accordance with the user position detected by the user position detection unit in a state in which the user is viewing the screen of the display unit.

(210)
An information processing apparatus including: a display unit; a user position detection unit which detects a user position with respect to the display unit; and a computation unit which controls a plurality of distance detecting schemes for detecting a distance from the screen of the display unit to the user and shifting of the distance detecting schemes in accordance with the user position detected by the user position detection unit.

(211)
The information processing apparatus according to (210), wherein the computation unit constantly turns on a function of a distance detecting scheme for detecting a distance to a user who is at a distant place.

(212)
The information processing apparatus according to (210), wherein the computation unit turns on a function of a distance detecting scheme for detecting a distance to a user who is at a nearby place and also performing recognition processing only within a distance range in which sufficient recognition accuracy can be obtained.

(213)
An information processing method including: a user position detection step in which a user position with respect to a display screen is detected; a user state detection step in which a user state with respect to the display screen is detected, and a computation step in which a GUI to be displayed on the display screen is controlled based on the user position detected in the user position detection step and the user state detected in the user state detection step.

(214)
An information processing method including: a user position detection step in which a user position with respect to a display screen is detected; a used state detection step in which a used state with respect to the display screen is detected; and a computation step in which one or more input means for allowing the user to operate an operation target object being displayed on the display screen are optimized in accordance with the user position detected in the user position detection step and the user state detected in the user state detection step.

(215)
An information processing method including: a user position detection step in which a user position with respect to a display screen is detected; and a computation step in which shifting of a plurality of distance detecting schemes for detecting a distance from the display screen to the user is controlled in accordance with the user position detected in the user position detection step.

(216)
A computer program described in a computer readable format so as to cause a computer to function as: a display unit; a user position detection unit which detects a user position with respect to the display unit; a user state detection unit which detects a user state with respect to a display screen of the display unit; and a computation unit which controls a GUI to be displayed on the display unit in accordance with the user position detected by the user position detection unit and the user state detected by the user state detection unit.

(217)
A computer program described in a computer readable format so as to cause a computer to function as: a display unit, one or more input means for allowing a user to operate an operation target object being displayed on a screen of the display unit; a user position detection unit which detects a user position with respect to the display unit; a user state detection unit which detects a user state with respect to a display screen of the display unit; and a computation unit which optimizes the input means in accordance with the user position detected by the user position detection unit and the user state detected by the user state detection unit.

(218)
A computer program described in a computer readable format so as to cause a computer to function as: a display unit; a user position detection unit which detects a user position with respect to the display unit; and a computation unit which controls a plurality of distance detecting schemes for detecting a distance from the screen of the display unit to the user and shifting of the distance detecting schemes in accordance with the user position detected by the user position detection unit.

(301)
An information processing apparatus including: a display unit; an object image obtaining unit which obtains an object image to be displayed on a screen of the display unit; a real size obtaining unit which obtains information relating to a real size of the object to be displayed on the screen of the display unit; and a computation unit which processes the object image based on the real size of the object obtained by the real size obtaining unit.

(302)
The information processing apparatus according to (301), further including a display performance obtaining unit which obtains information on display performances including a screen size and resolution of the display unit, wherein the computation unit processes the object image to be displayed at the real size on the screen of the display unit based on the real size of the object obtained by the real size obtaining unit and the display performances obtained by the display performance obtaining unit.

(303)
The information processing apparatus according to (301), wherein in simultaneously displaying a plurality of object images obtained by the object image obtaining unit on the screen of the display unit, the computation unit processes the plurality of object image such that mutual magnitude relationships among the plurality of object images are correctly displayed.

(304)
The information processing apparatus according to (301), further including: a camera unit; and a real size estimation unit which estimates a real size of an object included in an image captured by the camera unit.

(305)
The information processing apparatus according to (301), further including: a camera unit, an image recognition unit which recognizes a user face included in an image captured by the camera unit and obtains face data; a distance detection unit which detects a distance to the user; and a real size estimation unit which estimates a real size of the user face based on the face data of the user and a distance to the user.

(306)
An information processing method including: an object image obtaining step in which an object image to be displayed on a screen is obtained; a real size obtaining step in which information relating to a real size of the object to be displayed on the screen is obtained; and a computation step in which the object image is processed based on the real size of the object obtained in the real size obtaining step.

(307)
A computer program described in a computer readable format so as to cause a computer to function as: a display unit; an object image obtaining unit which obtains an object image to be displayed on a screen of the display unit; a real size obtaining unit which obtains information relating to a real size of the object to be displayed on the screen of the display unit; and a computation unit which processes the object image based on the real size of the object obtained by the real size obtaining unit.

(401)
An information processing apparatus including: a camera unit; a display unit; and a computation unit which normalizes a user image captured by the camera unit in displaying the image on a screen of the display unit.

(402)
The information processing apparatus according to (401), further including: an object image obtaining unit which obtains an object image to be displayed on the screen of the display unit; and a parallel or superimposed pattern obtaining unit which obtains a parallel or superimposed pattern in which the user image and the object image are arranged in parallel or superimposed on the screen of the display unit, wherein the computation unit performs normalization such that a magnitude relationship between the user image and the object is correctly maintained and arranged in parallel or superimposes the user image and the object after the normalization based on the obtained parallel or superimposed pattern.

(403)
The information processing apparatus according to (402), wherein the computation unit controls the camera unit in order to normalize the user image captured by the camera unit.

(404)
The information processing apparatus according to (401), further including: a user face data obtaining unit which obtains user face data captured by the camera unit; and an intra-object face data obtaining unit which obtains face data in an object to be displayed on the screen of the display unit, wherein the computation unit performs normalization such that a magnitude relationship and positions of the user face data and the face data in the object are correctly maintained.

(405)
The information processing apparatus according to (404), wherein the computation unit controls the camera unit in order to normalize the user image captured by the camera unit.

(406)
An information processing method including: an object image obtaining step in which an object image to be displayed on the screen is obtained; a parallel or superimposed pattern obtaining step in which a parallel or superimposed pattern, in which a user image captured by the camera unit and the object image are arranged in parallel or superimposed on the screen of the display unit, is obtained; a normalization step in which normalization is performed such that a magnitude relationship and a position of the user image and the object are correctly maintained; and an image retouching step in which the user image and the object after the normalization are arranged in parallel or superimposed based on the obtained parallel or superimposed pattern.

(407)
An information processing method including: a user face data obtaining step in which user face data captured by the camera unit is obtained; an intra-object face data obtaining step in which face data in an object to be displayed on the screen is obtained; and a normalization step in which normalization is performed such that a magnitude relationship and positions of the user face data and the face data in the object are correctly maintained.

(408)
A computer program described in a computer readable format so as to cause a computer to function as: a camera unit; a display unit; and a computation unit which normalizes a user image captured by the camera unit in displaying the user image on a screen of the display unit.

(501)
An information processing apparatus including: a display unit which displays movie content on a screen; a rotation angle detection unit which detects a rotation angle of the screen; a display mode selecting unit which selects a movie content display mode at an arbitrary rotation angle of the screen in a shifting process thereof; and an image retouching unit which performs image retouch based on the display mode selected by the display mode selecting unit such that the movie content suits the screen inclined at the rotation angle detected by the rotation angle detection unit.

(502)
The information processing apparatus according to (501), wherein the display mode selecting unit selects one of a plurality of display modes including three display modes, namely a display mode for allowing the movie content to be completely displayed on the screen at an arbitrary rotation angle, a display mode for maximizing focused content in the movie content at each rotation angle, and a display mode for rotating the movie content so as not to generate an invalid area.

(503)
The information processing apparatus according to (501), wherein the display mode selecting unit selects a display mode at an arbitrary rotation angle of the screen in a shifting process thereof based on attribute information included in the movie content.

(504)
The information processing apparatus according to (501), wherein the display mode selecting unit selects for protected movie content the display mode for allowing the movie content to be completely displayed on the screen at an arbitrary rotation angle.

(505)
An information processing method including: a rotation angle detection step in which a rotation angle of a screen for displaying movie content is detected; a display mode selecting step in which a movie content display mode is selected at an arbitrary rotation angle of the screen in the shifting process thereof; and an image retouching step in which image retouching is performed based on the display mode selected by the display mode selecting step such that the movie content suits the screen inclined at the rotation angle detected in the rotation angle detection step.

(506)
A computer program described in a computer readable format so as to cause a computer to function as: a display unit which display movie content on a screen; a rotation angle detection unit which detects a rotation angle of the screen; a display mode selecting unit which selects a movie content display mode at an arbitrary rotation angle of the screen in a shifting process thereof; and an image retouch unit which performs image retouching based on the display mode selected by the display mode selecting unit such that the movie content suits the screen inclined at the rotation angle detected by the rotation angle detection unit.

As described above, the technique disclosed in this specification was described in detail with reference to specific embodiments. However, it is obvious that those skilled in the art can make modifications and replacements of the embodiments without departing from a scope of the technique disclosed in the specification.

In the present specification, although the description was mainly given of embodiments on the assumption of a television receiver provided with a large screen as the information processing apparatus 100 to which the technique disclosed in this specification, the scope of the technique disclosed in the specification is not limited thereto. It is possible to similarly apply the technique disclosed in this specification to an information processing apparatus other than the television receiver such as a personal computer and a tablet terminal and an information processing apparatus with a screen which is not large.

In short, the technique disclosed in this specification was described as illustrative examples, and the contents described in this specification should not be exclusively understood. Claims should be taken into account in order to determine the scope of the technique disclosed in this specification.

REFERENCE SIGNS LIST

100 INFORMATION PROCESSING APPARATUS
110 INPUT INTERFACE UNIT
120 COMPUTATION UNIT
130 OUTPUT INTERFACE UNIT
140 STORAGE UNIT
150 COMMUNICATION UNIT
160 POWER UNIT
170 TELEVISION TUNER UNIT
180 ROTATION AND ATTACHMENT MECHANISM UNIT
501 REMOTE CONTROL RECEIVING UNIT
502 SIGNAL ANALYSIS UNIT
503 CAMERA UNIT
504 IMAGE RECOGNITION UNIT
505 MICROPHONE UNIT
506 AUDIO RECOGNITION UNIT
507 DISTANCE SENSOR
508 SIGNAL ANALYSIS UNIT
509 TOUCH DETECTION UNIT
510 SIGNAL ANALYSIS UNIT
511 PROXIMITY SENSOR
512 SIGNAL ANALYSIS UNIT
513 VERY-SHORT-RANGE COMMUNICATION UNIT
514 SIGNAL ANALYSIS UNIT
515 TRIAXIAL SENSOR UNIT
516 GPS RECEIVING UNIT
517 SIGNAL ANALYSIS UNIT
520 INPUT INTERFACE UNIFYING UNIT
601 CONTENT DISPLAY UNIT
602 GUI DISPLAY UNIT
603 DISPLAY UNIT
604 SPEAKER UNIT
605 ILLUMINATION DISPLAY UNIT
606 ILLUMINATION UNIT
710 MONITOR AREA DIVIDING UNIT
711 DEVICE DATABASE
712 AREA PATTERN DATABASE
720 OBJECT OPTIMAL PROCESSING UNIT
721 OPTIMAL PROCESSING ALGORITHM
730 EQUIPMENT COORDINATION DATA EXCHANGING UNIT
731 EXCHANGE PROCESSING ALGORITHM
2310 DISPLAY GUI OPTIMIZATION UNIT
2320 INPUT MEANS OPTIMIZATION UNIT
2330 DISTANCE DETECTING SCHEME SHIFTING UNIT
3210 REAL SIZE DISPLAY UNIT
3220 REAL SIZE ESTIMATION UNIT
3230 REAL SIZE EXPANSION UNIT
4110 INTER-IMAGE NORMALIZATION PROCESSING UNIT
4120 FACE NORMALIZATION PROCESSING UNIT
4130 REAL SIZE EXPANSION UNIT
4710 DISPLAY MODE SELECTING UNIT
4720 ROTATION POSITION INPUT UNIT
4730 IMAGE RETOUCH UNIT

The invention claimed is:

1. An information processing apparatus comprising:
a control configured to (i) set a respective user occupying area in a screen of a display unit of the information processing apparatus for each user detected from at least one information signal input to the apparatus from outside of the apparatus, and (ii) set all areas of the screen other than the user occupying area of the each user detected as a common area usable by the each user detected,
the control unit configured to, when an operation object is present in a first user occupying area set for a first user and is arranged in a first orientation which does not face the first user so as to be an incorrect orientation for the first user while a second user occupying area is set for a second user which is located at a location different from that of the first user occupying area, automatically rotate the operation object from the first orientation to a second orientation which is different from the first orientation so as to correctly face the first user, in which said second orientation being an incorrect orientation for the second user such that the operation object does not face the second user, and
the control unit configured to automatically rotate an operation object to face a user when the operation object is (i) present in an area which becomes a user occupying area immediately upon detecting that the user is within a predetermined distance of the information processing apparatus, and (ii) not facing the user when the area becomes the user occupying area, such that the rotating of the operation object to face the user occurs without the user touching the information processing apparatus.

2. The apparatus of claim 1 further comprising:
at least one proximity sensor disposed at each of four side edge portions of a screen of the display unit and at which the at least one information signal is input.

3. The apparatus of claim 1, wherein the control unit is configured to automatically rotate the operation object in accordance with a predetermined timing after occurrence of a predetermined event.

4. The apparatus of claim 1, wherein the control unit is further configured to rotate the operation object in accordance with the orientation thereof when the operation object is moved between the set first and second areas in a screen of the display unit.

5. The apparatus of claim 4, wherein the control unit is further configured to rotate the operation object when the operation object is moved by dragging or throwing.

6. The apparatus of claim 1 further comprising:
a data exchange unit to exchange data with a terminal owned by the user.

7. The apparatus of claim 6, wherein the control unit is configured to display the operation object on a screen of the display unit, based on the data exchanged with the terminal.

8. The apparatus of claim 1, wherein the control unit is configured to control at least one of copying or dividing of the operation object, in response to an operation for displacing the operation object.

9. The apparatus of claim 1 further comprising:
an input interface unit to which the at least one information signal from the outside is input.

10. The apparatus of claim 1, wherein the control unit is further configured to control processing on the operation object based on at least one of a screen touch detection result or data received from a terminal owned by the user.

11. The apparatus of claim 1, wherein the control unit controls the processing on the operation object by selecting one of a plurality of input units of the apparatus.

12. The apparatus of claim 11, wherein the selecting is in accordance with position of or distance to the user.

13. The apparatus of claim 1, wherein the processing on the operation object is based on a state of the user.

14. An information processing method comprising:
controlling, by a processor, processing including (i) setting a respective user occupying area in a screen of a display unit of an information processing apparatus for each user detected from at least one information signal input to the information processing apparatus from outside of the apparatus, and (ii) setting all areas of the screen other than the user occupying area of the each user detected as a common area usable by the each user detected,
wherein the processing includes, when an operation object is present in a first user occupying area set for a first user and is arranged in a first orientation which does not face the first user so as to be an incorrect orientation for the first user while a second user occupying area is set for a second user which is located at a location different from that of the first user occupying area, automatically rotating the operation object from the first orientation to a second orientation which is different from the first orientation so as to correctly face the first user, in which said second orientation being an incorrect orientation for the second user such that the operation object does not face the second user, and
wherein the processing includes automatically rotating an operation object to face a user when the operation object is (i) present in an area which becomes a user occupying area immediately upon detecting that the user is within a predetermined distance of the information processing apparatus, and (ii) not facing the user when the area becomes the user occupying area, such that the rotating of the operation object to face the user occurs without the user touching the information processing apparatus.

15. A non-transitory recording medium recorded with a program executable by a computer, the program comprising:
controlling processing including (i) setting a respective user occupying area in a screen of a display unit of an information processing apparatus for each user detected from at least one information signal input to the information processing apparatus from outside of the apparatus, and (ii) setting all areas of the screen other than the user occupying area of the each user detected as a common area usable by the each user detected,
wherein said processing includes, when an operation object is present in a first user occupying area set for a first user and is arranged in a first orientation which does not face the first user so as to be an incorrect orientation for the first user while a second user occupying area is set for a second user which is located at a location different from that of the first user occupying area, automatically rotating the operation object from the first orientation to a second orientation which is different from the first orientation so as to correctly face the first user immediately, in which said second orientation being an incorrect orientation for the second user such that the operation object does not face the second user, and
wherein said processing includes automatically rotating an operation object to face a user when the operation object is (i) present in an area which becomes a user occupying area immediately upon detecting that the user is within a predetermined distance of the information processing apparatus, and (ii) not facing the user when the area becomes the user occupying area, such that the rotating of the operation object to face the user occurs without the user touching the information processing apparatus.

16. An information processing apparatus comprising:
a control unit to set a respective user occupying area in a screen of a display unit of the information processing apparatus for each user detected from at least one information signal input to the apparatus from outside of the apparatus and to control processing on an operation object displayed on the display unit,
said processing includes a number of automatically rotating processes, and
said number of automatically rotating processes includes a first automatically rotating process in which when the operation object is present in a first user occupying area set for a first user and is arranged in a first orientation which does not face the first user so as to be an incorrect orientation for the first user while a second user occupying area is set for a second user which is located at a location different from that of the first user occupying area, the operation object is automatically rotated from the first orientation to a second orientation which is different from the first orientation so as to correctly face the first user, in which said second orientation being an incorrect orientation for the second user such that the operation object does not face the second user,
wherein the control unit is configured to automatically rotate an operation object to face a user when the operation object is (i) present in an area which becomes a user occupying area immediately upon detecting that the user is within a predetermined distance of the information processing apparatus, and (ii) not facing the user when the area becomes the user occupying area, such that the rotating of the operation object to face the user occurs without the user touching the information processing apparatus.

17. The apparatus of claim 16 further comprising:
at least one proximity sensor disposed at each of four side edge portions of a screen of the display unit and at which the at least one information signal is input.

18. The apparatus of claim 16, wherein the control unit is configured to automatically rotate the operation object in accordance with a predetermined timing after occurrence of a predetermined event.

19. The apparatus of claim 16, wherein the control unit is further configured to rotate the operation object in accordance with an orientation thereof when the operation object is moved between set third and fourth areas in the screen of the display unit, the set third and fourth areas being mutually exclusive and being areas outside the first user occupying area and the second user occupying area.

20. The apparatus of claim 19, wherein the control unit is further configured to rotate the operation object when the operation object is moved by dragging or throwing.

21. The apparatus of claim 16 further comprising:
a data exchange unit to exchange data with a terminal owned by the user.

22. The apparatus of claim 21, wherein the control unit is configured to display the operation object on the screen of the display unit, based on the data exchanged with the terminal.

23. The apparatus of claim 16, wherein the control unit is configured to control at least one of copying or dividing of the operation object, in response to an operation for displacing the operation object.

24. The apparatus of claim 16 further comprising:
an input interface unit to which the at least one information signal from the outside is input.

25. The apparatus of claim 16, wherein the control unit controls the processing on the operation object based on at least one of a screen touch detection result or data received from a terminal owned by the user.

26. The apparatus of claim 16, wherein the control unit controls the processing on the operation object by selecting one of a plurality of input units of the apparatus.

27. The apparatus of claim 26, wherein the selecting is in accordance with position of or distance to the user.

28. The apparatus of claim 16, wherein the processing on the operation object is based on a state of the user.

* * * * *